US007949992B2

(12) United States Patent
Andreev et al.

(10) Patent No.: US 7,949,992 B2
(45) Date of Patent: May 24, 2011

(54) DEVELOPMENT OF INFORMATION TECHNOLOGY SYSTEM

(75) Inventors: Dmitry Andreev, Port Chester, NY (US); Paul Gregory Greenstein, Croton-on-Hudson, NY (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1339 days.

(21) Appl. No.: 11/475,417

(22) Filed: Jun. 27, 2006

(65) Prior Publication Data

US 2007/0300204 A1 Dec. 27, 2007

(51) Int. Cl.
*G06F 9/44* (2006.01)
*G06F 15/173* (2006.01)
(52) U.S. Cl. ........ 717/104; 717/126; 717/127; 709/223; 709/224; 709/225
(58) Field of Classification Search .......... 717/100–113, 717/124–126, 136–139; 709/223–225
See application file for complete search history.

(56) References Cited

U.S. PATENT DOCUMENTS

| | | | | |
|---|---|---|---|---|
| 5,903,478 A | * | 5/1999 | Fintel et al. | 703/6 |
| 6,249,769 B1 | * | 6/2001 | Ruffin et al. | 705/7 |
| 6,769,113 B1 | * | 7/2004 | Bloom et al. | 717/103 |
| 7,124,413 B1 | * | 10/2006 | Klemm et al. | 719/313 |
| 2002/0194147 A1 | * | 12/2002 | Ricke | 706/53 |
| 2003/0172145 A1 | * | 9/2003 | Nguyen | 709/223 |
| 2009/0276771 A1 | * | 11/2009 | Nickolov et al. | 717/177 |

OTHER PUBLICATIONS

Cooper, Information Technology Development Creativity: A Case Study of Attempted Radical Change, MIS Quarterly, vol. 24, No. 2 (Jun. 2000), Published by: Management Information Systems Research Center, University of Minnesota, pp. 245-276.*

* cited by examiner

*Primary Examiner* — Anna Deng
*Assistant Examiner* — Satish Rampuria
(74) *Attorney, Agent, or Firm* — Schmeiser, Olsen & Watts; William E. Schiesser

(57) ABSTRACT

A method performed in an Information Technology (IT) development environment and an associated computer system. Business requirements are translated into functional requirements. An abstract IT structure is generated by translating the functional requirements into the abstract IT structure.

23 Claims, 29 Drawing Sheets

IT Development Process With verifyConformance()

IT ENTITIES setRelationship() Method addElement() Method deleteElement() Method setAvailable() Method establishInterface() METHOD ensureDependencies() METHOD

IT STRUCTURE COMPOSITION

IT DEVELOPMENT PROCESS

TRANSLATION OF IT STRUCTURE INSTANCE

TRANSLATION ITERATION PROCESS

ADJUSTING CHARACTERISTICS OF IT STRUCTURE INSTANCE

SELECTION OF SUBCLASS
OF IT STRUCTURE

CLASS HIERARCHY EXAMPLE

DELIVERY BINDING

IT Development Environment

Overview of the IT Entity Editor (ITED) Main Panels

Searching For Entities

Creating a Complex IT structure

IT Development Process With verifyConformance()

DEVELOPMENT OF INFORMATION TECHNOLOGY SYSTEM

RELATED APPLICATION

The present patent application is related to copending U.S. patent application Ser. No. 11/011,449, filed Dec. 14, 2004 and entitled "Automation of Information Technology System Development".

FIELD OF THE INVENTION

The present invention relates generally to automation of Information Technology (IT) system development and more particularly to a method performed in an IT development environment and an associated computer system.

BACKGROUND OF THE INVENTION

A number of activities are associated with use of a computer. These activities may be grouped into several categories: development, deployment, operations and maintenance, and productive use. The category of development comprises determination of specific hardware, software, and networking required to satisfy the specific usage needs; planning of a production system.

The category of deployment comprises implementation of the developed production system, ranging from acquisition of the appropriate hardware and software to installation, configuration, and customization of acquired software, hardware and network devices, to verification of correctness of the built system.

The category of operations and maintenance comprises operation of the deployed production system and introduction of changes to it.

The category of productive use comprises application of the deployed production system to activities for which it is intended.

The preceding categories of activities are common to computing systems, be it a stand-alone personal computer, or a geographically dispersed collection of highly complex systems supporting an international corporation. The first three of the preceding categories of activities (i.e., development, deployment, operations) are a liability required in support of the last activity category of productive use of a computer system. While for a single stand-alone personal computer, development, deployment and operations may involve miniscule investment of time and/or money (with the exception of the acquisition of the necessary hardware and software), in large institutions, these preceding three activities occupy armies of technical and administrative personnel and entail high costs, primarily due to complexity of computer systems, exacerbated by constantly evolving technology and business requirements.

Thus, there is a need for a method and system to reduce costs and user effort pertaining to Information Technology (IT) development, including implementation of a method performed in an IT development environment and an associated computer system.

SUMMARY OF THE INVENTION

The present invention provides a method performed in an Information Technology (IT) development environment, said method comprising:
 translating business requirements into functional requirements; and
 generating an abstract IT structure, said generating the abstract IT structure comprising translating the functional requirements into the abstract IT structure.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method in an Information Technology (IT) development environment, said method comprising:
 translating business requirements into functional requirements; and
 generating an abstract IT structure, said generating the abstract IT structure comprising translating the functional requirements into the abstract IT structure.

The present invention provides a computer program product, comprising a computer usable medium having a computer readable program code embodied therein, said computer readable program code comprising an algorithm adapted to perform a method in an Information Technology (IT) development environment, said method comprising:
 translating business requirements into functional requirements; and
 generating an abstract IT structure, said generating the abstract IT structure comprising translating the functional requirements into the abstract IT structure.

The present invention provides a computer system comprising a processor and a computer readable memory unit coupled to the processor, said memory unit containing instructions that when executed by the processor perform a method in an Information Technology (IT) development environment, said method comprising:
 translating business requirements into functional requirements; and
 generating an abstract IT structure, said generating the abstract IT structure comprising translating the functional requirements into the abstract IT structure.

The present invention provides a method and system to reduce costs and user effort pertaining to Information Technology (IT) development, including implementation of a method performed in an IT development environment and an associated computer system.

DETAILED DESCRIPTION OF THE INVENTION

The detailed description of the present invention is organized into the following sections:
1. Nomenclature;
2. Information Technology (IT) Entity Model (defines basic IT entities and describes their properties and associated processes);
3. Development of IT Systems;
4. Computer System (describes computer system used to implement development of IT systems)

1. Nomenclature 1.1 Flow Charts

Figure 3:
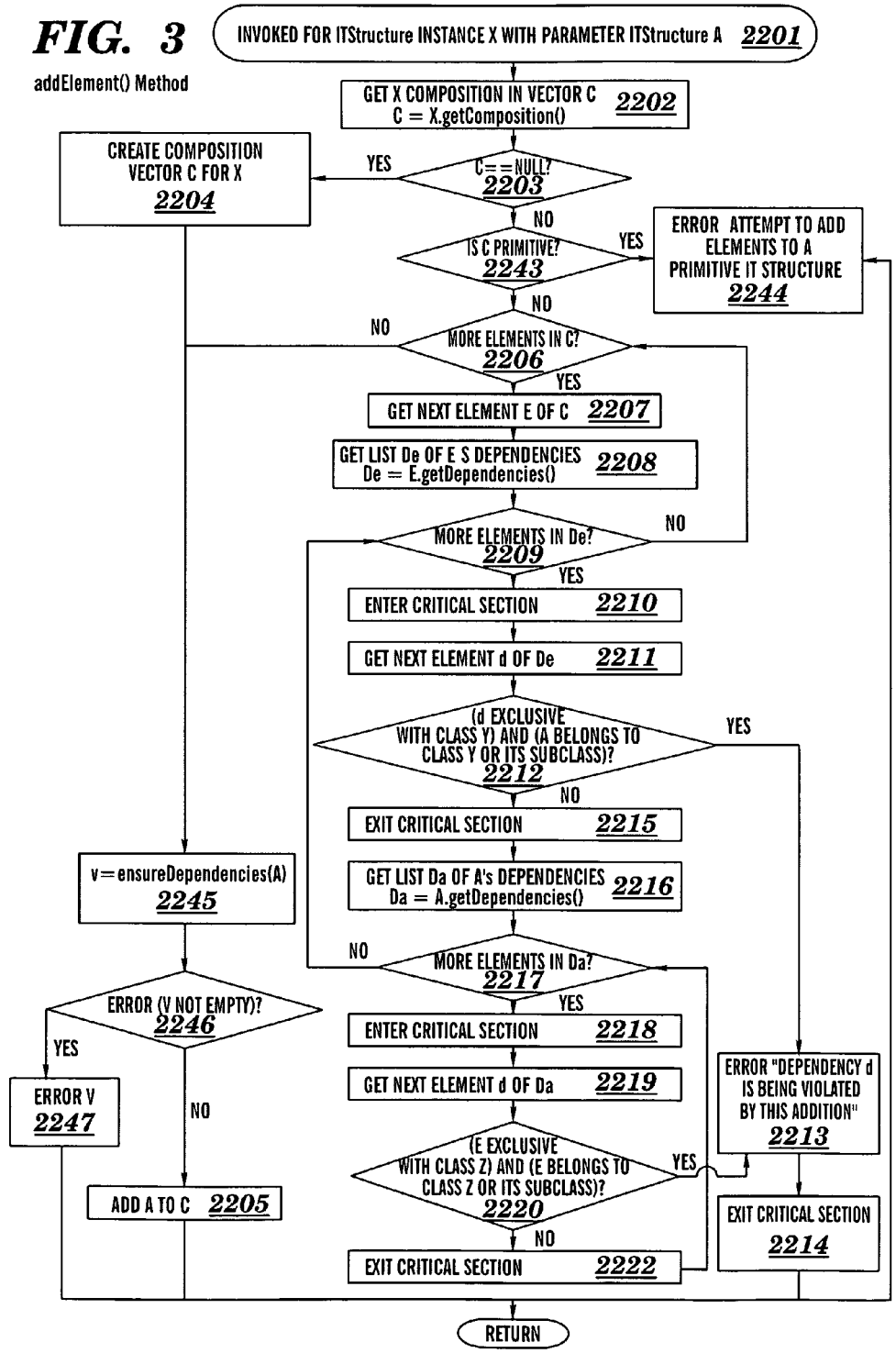
FIG. 3 is a flow chart depicting the logic of addElement( ) method, in accordance with embodiments of the present invention.

The flow charts in the Figures comprise, inter alia, the following block shapes:
1) Rectangular: represents execution of code as described (e.g., FIG. 3, block 2202); and
2) Diamond: represents a decision block (e.g., FIG. 3, block 2203).

1.2 Abbreviations

The following abbreviations are utilized herein.

CASE—computer-aided software engineering
CBM—Component Business Model
CD—compact disk
CICS—Customer Information Control System
CPU—central processor unit
DASD—direct access storage device
DB—database
DNS—domain name server
DRAM—dynamic random access memory
DVD—digital video disk
GB—gigabyte
GUI—graphical user interface
HTTP—HyperText Transfer Protocol
HTTPS—HTTP Secure
IDE—integrated development environment
IP—internet protocol
IT—information technology
KB—kilobyte
KW—kilowatt
LAN—local-area network
LOC—lines of code
Mbps—megabits per second
MHz—mega-Hertz
MP—multi-processor
NAT—network address translation
NIC—network interface card
NOOP—no operation (moot)
OS—operating system
PM—person/month
POTS—"plain old telephone service"
RAM—random-access memory
RISC—reduced instruction set computer
ROI—return on investment
ROM—read-only memory
SL—service level
SMTP—Simple Mail Transfer Protocol
S/N—serial number
TCO—total cost of ownership
TCP/IP—transmission control protocol/internet protocol
UI—user interface
UML—universal modeling language
UP—uni-processor
UPS—uninterruptible power supply

2. Information Technology (IT) Entity Model

IT systems and environments may be described in terms of IT entities. The term "entity" is understood to denote "IT entity" herein.

The base entity model comprises IT entities, relationships among the IT entities, and interfaces and methods provided by these IT entities.

For illustrative purposes, Java-like syntax is used herein as a specification language for IT structures. An IT structure is a set of IT entities. Generally, another programming language (e.g., object oriented, procedural, high- or low-level) may be used instead of Java; a modeling language (e.g., UML) may be used instead of Java; and a specialized language could be defined and implemented solely for the purpose of definition of IT structures.

2.1 IT Entities

Figure 1:
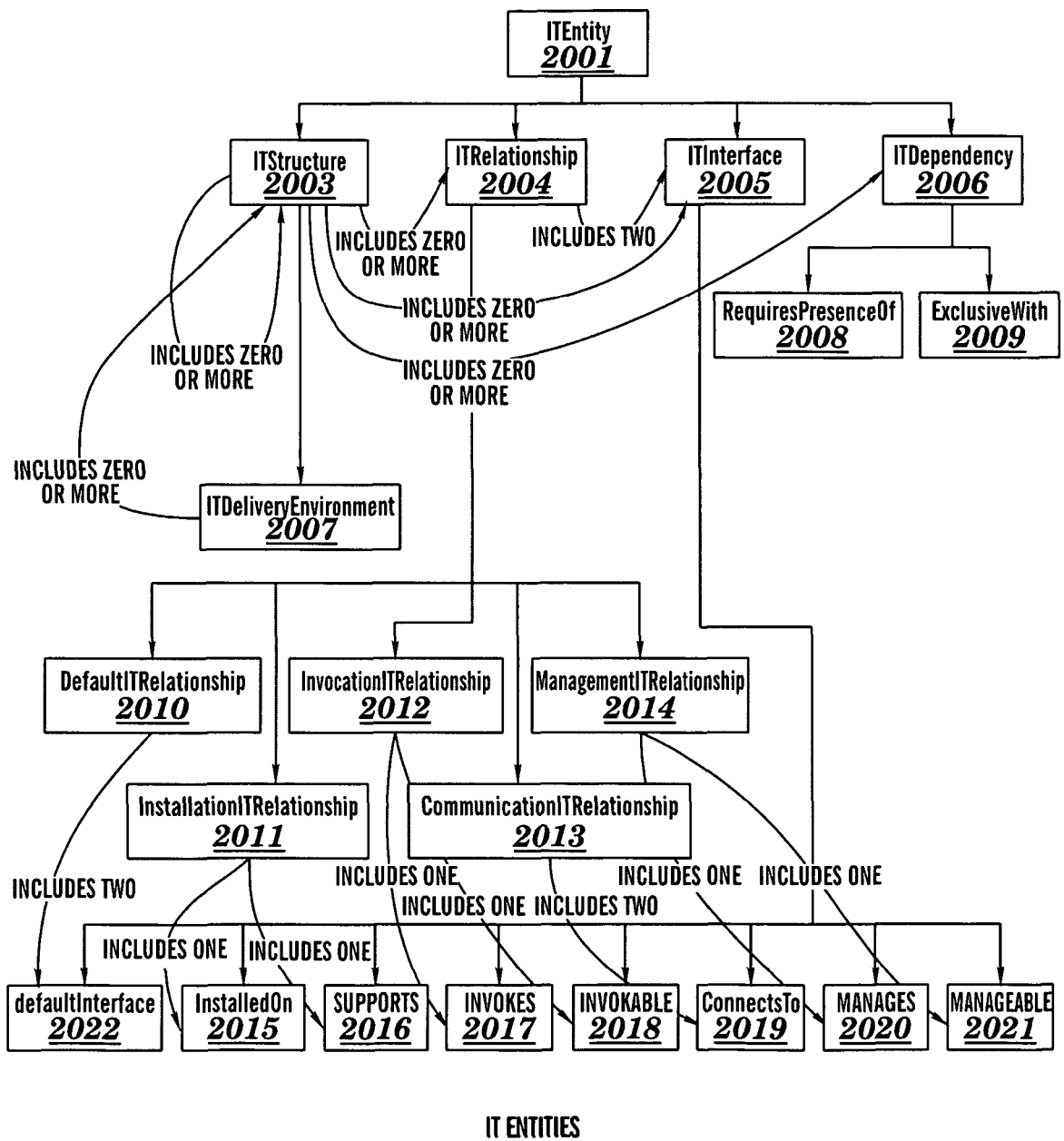
FIG. 1 is a diagram illustrating Information Technology (IT) entities included in the base entity model, and organized in a class hierarchy, in accordance with embodiments of the present invention.

FIG. 1 is a diagram illustrating IT entities included in the base entity model, and organized in a class hierarchy as shown in Table 1, in accordance with embodiments of the present invention.

TABLE 1

```
ITEntity 2001
    ITStructure 2003
        ITDeliveryEnvironment 2007
    ITInterface 2005
        defaultInterface 2022
        InstalledOn 2015
        Supports 2016
        Invokes 2017
        Invokable 2018
        ConnectsTo 2019
        Manages 2020
        Mangeable 2021
    ITRelationship 2004
        DefaultITRelationship 2010
        InstallationITRelationship 2011
        InvocationITRelationship 2012
        CommunicationITRelationship 2013
        ManagementITRelationship 2014
    ITDependency 2006
        RequiresPresenceOf 2008
        ExclusiveWith 2009
```

IT entities may be qualified as real, virtual, or abstract. A real IT entity has no undefined characteristic and may therefore be represented physically. A virtual IT entity has exactly one undefined characteristic and thus cannot have more than one undefined characteristic. An abstract IT entity has at least two undefined characteristics. Examples of real entities, virtual entities, and abstract entities will be presented infra. For convenience, class Type is introduced as follows:

Enumeration Type:=(abstract, virtual, real)

2.1.1 IT Entity Class

TEntity class is introduced for convenience as a root class for the other IT entity classes listed above. ITEntity has the following methods:

1) constructor(String name [, Type type])—creates an instance of ITEntity with the specified name and of optionally specified type 2) boolean isAbstract( ), returns true if ITEntity is abstract, false otherwise 3) boolean isVirtual( ), returns true if ITEntity is virtual, false otherwise 4) boolean isReal( ), returns true if ITEntity is real, false otherwise 5) getName( )—returns ITEntity name 6) setType(Type type)—changes IT entity type as specified

2.2 IT Structures

An IT structure is either a primitive IT structure or a complex IT structure.

A primitive IT structure is an IT entity representing materials or labor, indivisible within a particular view to a structural model, and a set of method associated with characteristics of the represented materials or labor.

A real primitive IT structure represents a specific single physical object or a specific unit of labor. Examples of real primitive IT structure include:

1) RS/6000 model F50 S/N 123456-AB. There is one and only one RS/6000 model F50 with this particular S/N.

2) Software product Ppppp version vvvvv license key 12345678-AB-9ABCD-XYZ.

A virtual primitive IT structure represents a class of specific physical objects. Examples of virtual primitive IT structure include:

1) RS/6000 model F50. Since no s/n is specified, there is a class of RS/6000 model F50 this virtual primitive IT structure corresponds to, and RS/6000 model F50 with any s/n belongs to this class.

2) Software product Ppppp version vvvvv.

An abstract primitive IT structure represents an abstract view of materials or labor. In this embodiment, abstract primitive IT structures include the same out-of-model IT entity, called abstractPrimitive. Other embodiment may have a multiplicity of abstract primitive out-of-model entities. Examples of abstract primitive IT structure include:

1) RS/6000. Since no model is specified, any RS/6000, including model F50, as well as any other models, belongs to this class.

2) Computer. Since no architecture, type, or any other characteristics are specified, any computer, including any model of RS/6000, belongs to this class.

3) Software product Ppppp.

4) Software product.

Primitive IT structures are indivisible only within a particular model. For example, a computer may be viewed as indivisible in the context of the model used in this embodiment. In a different embodiment, however, a different model may exist in which a computer may be represented as an IT structure (see discussion infra of a complex IT structure), comprising several primitive IT structures; e.g., the following collection of primitive IT structures: processor, memory, DASD, and network interface.

A complex IT structure is a non-empty collection of IT structures, a defined set of relationships (see below) among these IT structures, and a description of this IT structure's characteristics. Examples of a complex primitive IT structure include:

1) a personal computer 2) a network of Lotus Domino servers 3) a zSeries sysplex 4) a collection of programs running on a particular computer 5) a collection of software and hardware required to run Ariba Buyer application 6) a hosted application service (e.g., a service including a service provider hosting an application; Ariba Buyer, in its data center, and providing service customers access to the application through a network; Internet)

7) a professional service (e.g., a service including a service provider perform installation and configuration of an application; Ariba Buyer, at a service customer data center)

8) a network service (e.g., a service providing access to Internet at a specified guaranteed minimum bandwidth)

9) a combined network/hosted application services (e.g., a service providing access to Internet at a specified bandwidth and optionally including web hosting such as hosting of customer's web pages accessed through Internet; and a hosted application service for e-mail).

In the process of formation of an IT structure, values of properties of elements of this IT structure's composition (see below) may change; e.g., assignment of a name to a computer may be required to include that computer in an IT structure.

The set of relationships is imposed by a particular IT structure, rather than being intrinsic for the primitive IT structures comprising the IT structure. Thus, multiple complex IT structures may be created from the same set of primitive IT structures, and uniqueness of the assigned name (i.e., its inequality to any other computer name) may be imposed on a primitive IT structure representing a computer, included in a complex IT structure.

An IT structure composition is the list of IT structures included in a complex IT structure, or an out-of-model entity describing the entity represented by a primitive IT structure (e.g., a String, or a reference to a DB record).

An IT structure composition element is an IT entity included in an IT structure composition.

An IT structure primitive composition is the list of primitive IT structures included in an IT structure, where all complex IT structures are replaced with their respective primitive compositions.

An abstract IT structure is an IT structure whose composition includes at least one abstract IT entity. Examples of an abstract IT structure include:

1) An abstract IT structure may include an Intel computer with a single 400 MHz Pentium processor, 1024 MB of main memory, 10 GB of DASD, and an Ethernet network interface; however, since no particular model of computer is specified, this IT structure would be abstract.

2) At a different (higher) level of abstraction, the same IT structure may include just a computer, without specification of its technology or characteristics.

A virtual IT structure is a non-abstract IT structure whose composition includes at least one virtual IT entity.

A real IT structure is a non-abstract and non-virtual IT structure.

From the above definitions, it follows that a real IT structure only includes real IT entities in its composition. From the above definitions, it also follows that in a real IT structure, each IT entity in its composition uniquely corresponds to a physical IT entity.

Table 2 infra provides examples of IT structure composition.

TABLE 2

Examples of IT structure composition

| IT structure | Networking | Computers | Software | Labor |
| --- | --- | --- | --- | --- |
| Abstract IT structure with high degree of abstraction | network | computer | Ariba Buyer application | |
| Abstract IT structure with low degree of abstraction | TCP/IP network | platform | Ariba Buyer Application v7 | |
| Virtual IT structure | connectivity requirements | platform and associated parameters (memory, processor power, DASD space) | Ariba Buyer v7 for AIX on RS/6000 | installation and management |
| Delivery-bound IT structure | LAN segments with symbolic IP addresses | model | Ariba Buyer v7.02 for AIX on RS/6000 | specific installation activities; specific management activities |
| Real IT structure | LAN segments with real IP addresses | computer s/n specified | Ariba Buyer v7.02 for AIX on RS/6000, license # <lic. #> | skill level and quantity of labor by activity specified |

Figure 8:
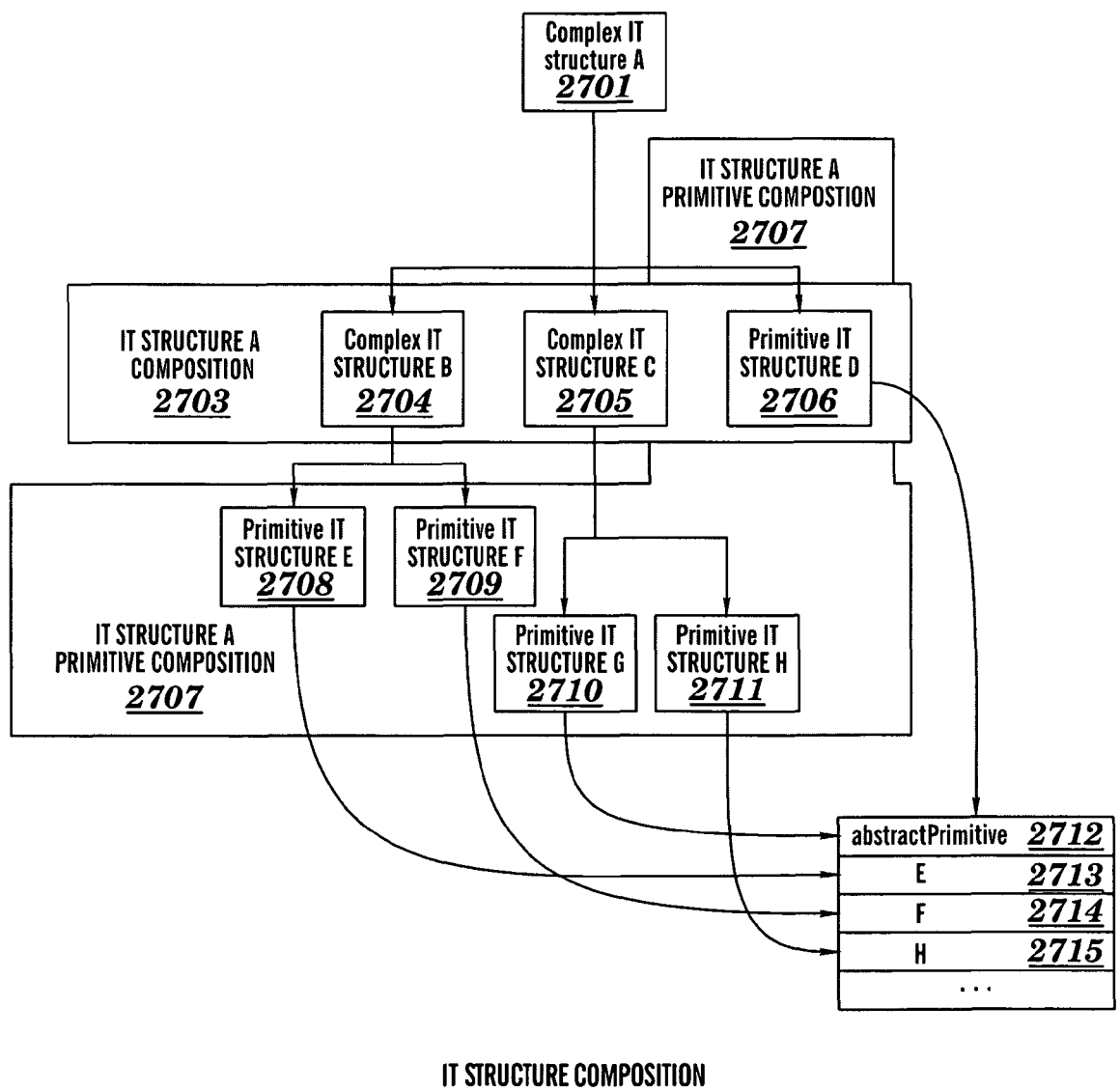
FIG. 8 is a diagram illustrating the concept of IT structure composition, in accordance with embodiments of the present invention.

FIG. 8 is a diagram illustrating the concept of IT structure composition, in accordance with embodiments of the present invention. A complex IT structure A 2701 includes in its composition 2703 two other complex IT structures B 2704 and C 2705, and one abstract primitive IT structure D 2706. Complex IT structure B includes in its composition two primitive IT structures E 2708 and F 2709, and complex IT structure C includes in its composition two primitive IT structures, an abstract primitive IT structure G 2710, and a primitive IT structure H 2711. Both abstract primitive IT structures, D and H, represent the abstractPrimitive out-of-model entity 2712, while all other primitive IT structures represent respective non-abstract out-of-model entities 2713, 2714, 2715. The IT structure A primitive composition 2707 includes all primitive IT structures shown (and no complex IT structures), namely primitive IT structures E 2708, F 2709, G 2710, H 2711, and D 2706.

An abstract IT structure with a high level of abstraction may be "an Ariba Buyer application running on a computer, connected to a network". The degree of abstraction can be lowered by restating the previous clause in more specific terms—"an Ariba Buyer application running on an RS/6000 computer, connected to a TCP/IP network".

The corresponding virtual IT structure may be "an Ariba Buyer version 7.0 for AIX on RS/6000 application, running on an AIX v5.0 operating system and RS/6000 model F50 computer with one 320 MHz CPU, 640 KB of main memory, and 128 GB of DASD in a single disk, connected through a 10 Gbps Ethernet LAN to a TCP/IP network—and—labor associated with installation and management of the above".

Once resolved into a delivery-bound IT structure, the previous IT structure may turn into something like "an Ariba Buyer version 7.0 path level 17.2 for AIX on RS/6000 application, running on an AIX v5.0 patch level 5.0.3.2 operating system and RS/6000 model F50-3745 computer with one 320 MHz CPU, 640 KB of main memory, 128 GB of DASD in a single disk, and a NIC (network interface card), connected through a 10 Gbps Ethernet LAN to a TCP/IP network on a single segment with a symbolic IP address of a.b.c.d and specific installation and management activities associated with the above.

Once deployed in a data center, the corresponding real IT structure would be "an Ariba Buyer version 7.0 path level 17.2 for AIX on RS/6000 application, license #178215-04, running on an AIX v5.0 patch level 5.0.3.2 operating system, license #514ABC-AE, and RS/6000 model F50-3745 computer, s/n 6734-FWU, with one 320 MHz CPU, 640 KB of main memory, 128 GB of DASD in a single disk, and a NIC (network interface card), connected through a 10 Gbps Ethernet LAN to a TCP/IP network on a single segment with a symbolic IP address of a.b.c.d and specific installation and management activities associated with the above, including quantity of labor and level of skills for each.

A delivery-bound IT structure is a virtual IT structure ready for provisioning in a particular delivery environment (see below) with no additional input/sources of information. "In a particular delivery environment" means "at the level of detail required by the provisioning process of the delivery environment". For example, a delivery-bound IT structure may include a specification of 10/100 Mbps Ethernet card, without regard to the manufacturer of that card.

An operating IT structure instance is a collection of physical hardware, software, networking, and labor, resulting from deployment of a real IT structure.

2.2.1 ITStructure Class

An IT Structure is represented by a class ITStructure, which inherits from ITEntity class and has the following methods:

1) ITStructure(String name, String function, Vector functions, Vector operationalCharacteristics[, Boolean external])—constructor; the external parameter is optional, and indicates that the ITStructure represents an external entity.

Note: Type is not specified for an ITStructure class—it is always derived based on ITStructure composition using the type definition as a rule.

2) Vector getFunctions( )—returns a list of functions (String) supported by ITStructure (always non-null)

3) Vector setFunctions(Vector V)—adjusts IT structure for support of one or more functions whose names were previously returned by getFunction( ) method; the list V is a list of pairs (<function>,<value>), where <function> is one of the list returned by getFunction( ) method and <value> is the associated setting. The method returns an empty Vector if the method execution was successful, and a list of error messages otherwise. If an error occurs, the method has not altered the IT structure.

4) Vector getOperationalCharacteristics( )—returns a list of pairs of names (String) and values (String) of operational characteristics of this IT structure 5) Vector setOperationalCharacteristics(Vector V)—adjusts IT structure operational characteristics as specified by the input parameters. The input parameter is a list of pairs of (operational characteristic name (String), characteristic value), where operational characteristic name is one of the values returned by the getOperationalCharacteristics( ) method, and characteristic value is specific to the operational characteristic being modified. The list V corresponds to all of or a subset of the list returned by getOperationalCharacteristics( ) method. The method returns an empty Vector if the method execution was successful, and a list of error messages otherwise. If an error occurs, the method has not altered the IT structure.

6) Vector getResolutionValues( )—returns a list of pairs of names (String) and values (String) of abstraction resolution parameters of this IT structure 7) JavaClass resolve(Vector V), where V is Vector of pairs (String resolution_parameter, value)—returns a less abstract ITStructure instance, instantiated with the specified resolution parameters if execution was successful; returns a Vector of error messages if no resolution was possible (in which case the IT structure is left unmodified)

8) boolean isPrimitive( )—returns true if this IT structure is primitive 9) boolean isComplex( )—returns true if this IT structure is complex 10) Vector getComposition([String C1 [, C2 ... [, Cn]]])—for a complex IT structure, returns list of other IT structures comprising this IT structure; for a primitive IT structure, returns the list including the IT structure itself. The optional list of parameters C1 ... Cn specify names of ITStructure subclasses to be returned by the getComposition( ) method. If C1 ... Cn are specified, only IT structures of subclasses with names C1 ... Cn will be returned by the getComposition( ) method.

11) Vector getPrimitiveComposition([String C1 [, C2 ... [, Cn]]])—returns primitive composition of an IT; returns the IT structure itself if invoked for a primitive IT structure. The optional list of parameters C1 ... Cn specify names of ITStructure subclasses to be returned by the getPrimitiveComposition( ) method. If C1 ... Cn are specified, only IT structures of subclasses with names C1 ... Cn will be returned by the getPrimitiveComposition( ) method.

12) Vector getInterfaces([String I1 [, I2 ... [, In]]])—returns the list of IT interfaces this IT structure possesses. The optional list of parameters I1 ... In specify names of ITInterface subclasses to be returned by the getInterfaces( ) method. If I1 ... In are specified, only IT interfaces of subclasses with names I1 ... In will be returned by the getInterfaces( ) method.

13) Vector getRelationships([String R1 [, R2 ... [, Rn]]])—returns a list of IT relationships elements of this IT structure's composition are involved in; returns an empty Vector if no IT relationships exist among elements of this IT structure's composition. The optional list of parameters R1 ... Rn specify names of ITRelationship subclasses to be returned by the getRelationships( ) method. If R1 ... Rn are specified, only IT relationships of subclasses with names R1 ... Rn will be returned by the getRelationships( ) method.

14) Vector getPrimitiveRelationships([String R1 [, R2 ... [, Rn]]])—returns a list of IT relationships elements of this IT structure's primitive composition are involved in; returns an empty Vector if no IT relationships exist among elements of primitive composition of this IT structure. The optional list of parameters R1 ... Rn specify names of ITRelationship subclasses to be returned by the getPrimitiveRelationships( ) method. If R1 ... Rn are specified, only IT relationships of subclasses with names R1 ... Rn will be returned by the getPrimitiveRelationships( ) method.

15) ITRelationship getRelationship(ITStructure A, ITStructure B)—returns the ITRelationship instance for relationship of IT structures A and B within the composition of this IT structure or null if IT structures A and B are not involved in an IT relationship 16) Vector setRelationship(ITStructure x, ITInterface xi, ITStructure y, ITInterface yi, Relationship r)—establishes the relationship r between IT structures x and y within the composition of this IT structure. Returns a null Vector if relationship was established successfully, and a Vector of error messages if relationship could not be established.

17) Vector setDependency({<add>|<remove>}, ITDependency x)—adds or removes the specified IT dependency to or from this IT structure. Returns a null Vector if dependency was added or removed successfully, and a Vector of error messages if dependency could not be added. Removal of an IT dependency is always successful. Addition of an IT dependency may fail if x contradicts an existing dependency—e.g., x indicates mutual exclusivity with IT structure Y and a dependency on presence of Y is already stated.

18) Vector getDependencies([String D1 [, D2 . . . [, Dn]]])—returns a list of IT dependencies of this IT structure. The optional list of parameters D1 . . . Dn specify names of ITDependency subclasses to be returned by the getDependencies( ) method. If D1 . . . Dn are specified, only IT dependencies of subclasses with names D1 . . . Dn will be returned by the getDependencies( ) method.

18a) Vector getPrimitiveDependencies([String D1[, D2 . . . [, Dn]]])—returns a list of IT dependencies among the elements of the IT structure primitive composition. The optional list of parameters D1 . . . Dn specify names of ITDependency subclasses to be returned by the getPrimitiveDependencies( ) method. If D1 . . . Dn are specified, only IT dependencies of subclasses with names D1 . . . Dn will be returned by the getPrimitiveDependencies( ) method.

19) Vector addElement(ITStructure A)—adds IT structure A to the composition of this IT structure. Returns a null Vector if addition was successful, and a Vector of error messages if addition failed. In order to ensure uniqueness of identifiers (computer names, network addresses) within IT structures, each identifier within IT structure A being added is prefixed with string A.getName( )+".". As a part of the addition process, addElement( ) method verifies that:
   a. addition of IT structure A to the composition of this IT structure does not violate any IT dependencies for any IT structure already included in the composition of this IT structure
   b. addition of IT structure A to the composition of this IT structure does not violate any IT dependencies for IT structure A and ensures that IT dependencies of the IT structure being added are satisfied. Each added IT structure composition element's name is prefixed with the IT structure name to ensure uniqueness.

20) Vector ensureDependencies(ITStructure A)—ensures that IT dependencies of the class requiresPresenceOf ofITStructure A in the composition of this IT structure are satisfied. If processing is unsuccessful, a Vector of error message(s) is returned, otherwise, a null Vector is returned.

21) Vector deleteElement(ITStructure A [, <force>])—removes IT structure A from the composition of this IT structure. Returns a null Vector if removal was successful, and a Vector of error messages if removal failed. <force> indicates that A should be removed regardless of relationships with or dependencies on it by other elements of this IT structure's composition.

22) Vector setOptimizationFunctions(Vector F)—specifies a prioritized list (starting with the priority and ending with the highest) of optimization classes (see Optimization) to be applied to this IT structure. Returns a null Vector if processing is successful, and a Vector of error messages otherwise.

23) Vector getOptimizationFunctions( )—returns the prioritized list of optimization classes to be applied to this IT structure.

24) Vector optimize( )—performs optimization of the IT structure using the specified prioritized list of optimization classes and applying each optimization function to the IT structure in turn, starting with the lowest and ending with the highest priority of optimization classes. Returns a Vector, containing the optimized IT structure as its first element if optimization was successful, and a list of error messages otherwise.

25) Vector setTargetITDeliveryEnvironments(Vector D)—specifies a list of target IT delivery environments (see below) for this IT structure. Returns a list of error messages if an error occurs (e.g., invalid specification of a target IT delivery environment), and a null Vector otherwise.

26) Vector getTargetITDeliveryEnvironments( )—returns the list of target IT delivery environments for this IT structure.

27) getID( )—returns a real IT structure's unique identifier; returns null if invoked for a non-real IT structure.

28) setID( )—sets real IT structure unique identifier; NOOP for a non-real IT structure.

29) Vector SLmaintenance(Vector V)—optional, supported for Autonomic IT System Improvement Cycle (see below); obtains a list of pairs of operational characteristics and associated values provided by monitoring facilities, and performs adjustment of the operational characteristics to sustain the SL. Returns a null Vector if processing is successful and a list of error messages if processing is unsuccessful.

30) Boolean isExternal( )—returns true if this IT structure is an external entity, and false otherwise. An external IT structure may be defined for completeness, and represents an IT structure outside the normal operational boundaries, yet which can engage in IT relationships. External IT structures are excluded from the sets of entities returned by getComposition( ) or getPrimitiveComposition( ) methods of the ITStructure class, yet IT relationships can be established to them and will be included in the sets of entities returned by getRelationships( ) or getPrimitiveRelationships( ) methods of the ITStructure class. E.g., for an IT structure defining a server and network configuration for a Web service, a client (or a set of clients) connecting to the Web service through Internet may be defined as an external IT structure. External IT structures are exempt from error verification or optimization, and are ignored when an IT structure comparison is performed, or when a reverse-specification of an IT structure is performed. External IT structures are presumed to be outside of an IT delivery environment, and will not result in generation of real IT entities as a part of the translation or delivery binding processes.

31) setBusinessComponents(Vector BC)—sets the list of business components this IT structure directly supports. Note that while all IT structures in a business IT environment support business components, not all IT structures support business components directly, and therefore will have a null list of business components supported. For example, ITStructure ProcurementSystem may support a Procurement business component. At the same time, ITStructure LoggingSubsystem, contained in the ProcurementSystem primitive composition, may not directly support any business components.

32) Vector getBusinessComponents( )—returns the list of business components this IT structure directly supports (or null, if none).

33) Int getTCO( )—returns the Total Cost of Ownership (TCO) of an IT structure, as calculated or measured by the appropriate financial tracking system(s), expressed in monetary units (e.g., U.S. dollars) per time period (e.g., 1 year). Note that TCO only includes operations and maintenance (defect repair) costs, and does not include development and deployment costs.

2.2.2 Detailed Description of Non-Trivial Methods
2.2.2.1 SetFunctions

A composition of an IT structure instance and relationships among elements of its composition may depend on particular function(s) this IT structure instance is intended to perform. The purpose of this method is to perform the necessary adjustments within IT structure instance that tailor IT structure composition and relationships among composition's elements as appropriate. This method also performs enforcement of function-specific rules.

The setFunctions( ) method is subclass-specific. Class ITStructure includes a placeholder that does nothing other than store the specified business function. ITStructure examples include:

1) IT structure X has three functions—A, B, C. However, these functions cannot be fulfilled indiscriminately (by their nature)—either A, or B and/or C, but not A and B, A and C, or A, B, and C can be supported by any instance of IT structure X. The setFunctions( ) method, when invoked, would ensure proper combination of functions requested from the instance of X, and prohibit improper modifications in the future.

2) Composition of instance of X may depend on the functions it performs. To perform function A, X may need to include an Intel server running Windows OS, an Oracle DB and a specific program package supporting function A. To perform functions B or C, X may need to include an RS/6000 server (whose power depends on whether only one of functions B and C, or both of these functions are supported), with a DB2 DB and specific program packages supporting functions B or C. So, the composition of X will be altered by the setFunctions( ) method appropriately, based on specification of functions.

2.2.2.2 setOperationalCharacteristics

A composition of an IT structure instance and relationships among elements of its composition, given a particular set of functions supported by the IT structure instance, may depend on operational characteristics associated with support of particular functions. The purpose of this method is to perform the necessary adjustments within IT structure instance that tailor IT structure composition and relationships among composition's elements as appropriate. This method also performs enforcement of operational-characteristic-specific rules.

The setOperationalCharacteristics( ) method is subclass-specific. Class ITStructure includes a placeholder that does nothing other than store the specified operational characteristic values.

EXAMPLES

1) IT structure X function A potentially supports up to 500 users. Its response time depends on the power and amount of memory of the processor that runs function A and an increment in the number of supported users can be translated into a processor power and memory increments. An instance of X is created, whose requirement is to support up to 200 users. setOperationalCharacteristics(new Vector("users", 200)) can be used to specify that number and adjust the configuration of the Intel server supporting function A in the composition of instance of X to ensure it supports the required number of users.

2) Availability of IT structure X instance supporting function A may be 80% or 99.8%, depending on configuration of processors and software supporting function A. If a single set of hardware and software elements support function A, availability is 80%; if supporting hardware and software are duplicated and appropriate monitoring software is added to permit takeover between the two sets of hardware and software, availability is 99.8%. setOperationalCharacteristics(new Vector("availability", "high")) can be used to indicate that instance of X when supporting function A must provide 99.8% availability.

3) The above operational characteristics settings may be combined: setOperationalCharacteristics(new Vector(("users", 200), ("availability", "high")))

2.2.2.3 Resolve

A composition of an IT structure instance and relationships among elements of its composition, given a particular set of functions supported by the IT structure instance and given a particular set of operational characteristics associated with support of the particular set of functions, may depend on additional factors. A purpose of this method is to perform the necessary adjustments within IT structure instance that tailor IT structure composition and relationships among composition's elements as appropriate.

The resolve( ) method is subclass-specific. Class ITStructure includes a placeholder that does nothing other than store the specified resolution values.

Example: Two hardware and operating systems platforms exist that provide equivalent (both in terms of scale and cost) performance, permitting an instance of IT structure X to support the required number of users with equivalent operational characteristics for its function A. For example, the choice of either of the two hardware and operating system platforms for the composition of an instance of IT structure X providing function A will produce an equivalent result. Further, the delivery environment in which the instance of X will operate, support both combinations of hardware and operating system with equivalent costs and service levels. The resolve( ) method may be used to specify which of the two combinations of hardware and operating system platforms to use based on other factors. For example, IT developer's preference or similarity with hardware and operating system platforms of other IT structures involved in a solution.

Assume the two combinations of hardware and operating system platforms are (a) AIX on RS/6000 and (b) Linux on Intel. So, IT structure X may provide a resolution characteristic "platform preference" which may be specified as "AIX" or "Linux", resulting in the choice of (a) or (b) for the instance of IT structure X.

2.2.2.4 setRelationship

Once an IT structure is added to the composition of the IT structure being developed, the developer may specify IT relationships between the added IT structure and other elements of the composition or primitive composition of the IT structure being developed.

Figure 2:
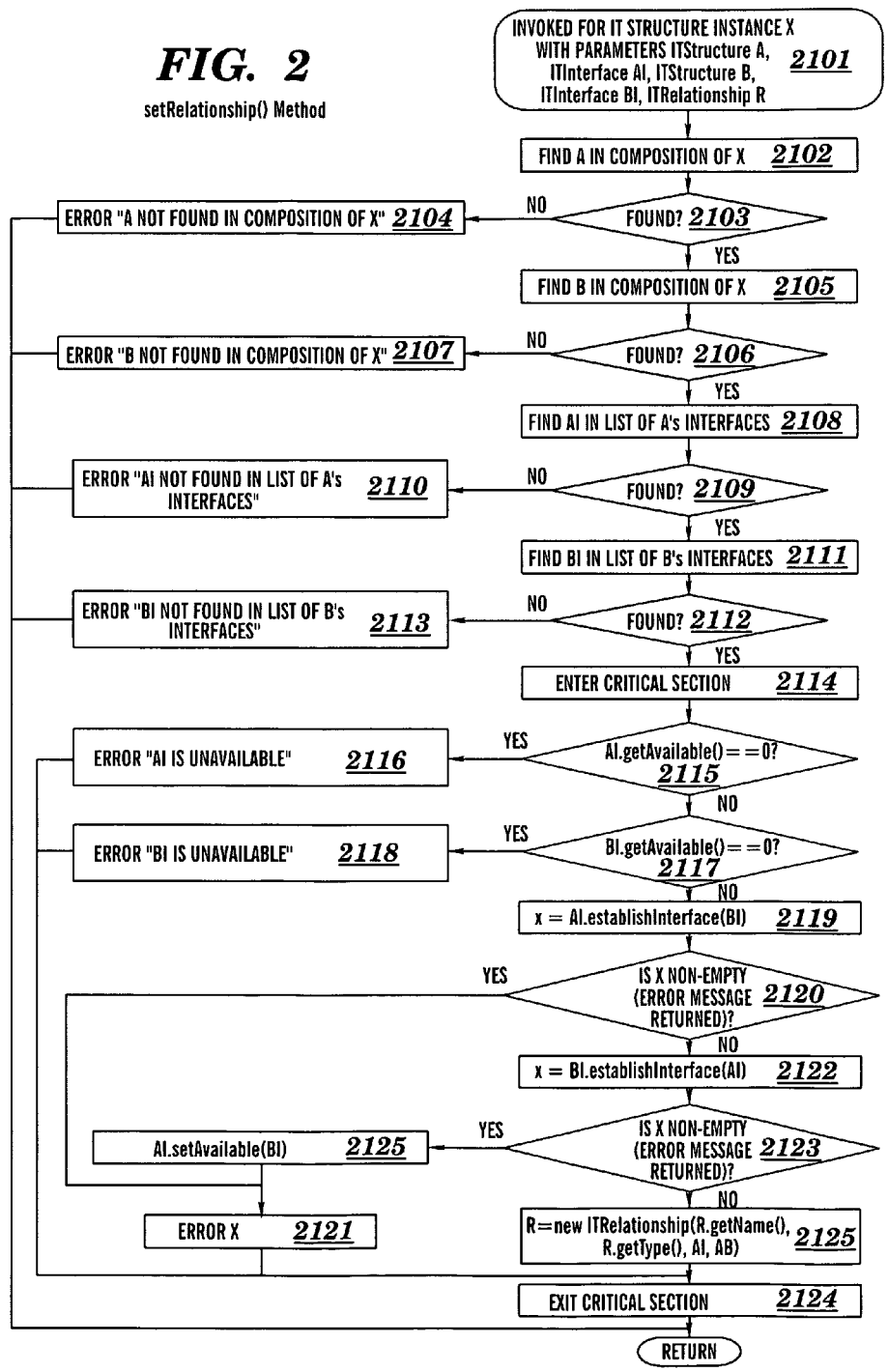
FIG. 2 is a flow chart depicting the logic of setRelationship ( ) method, in accordance with embodiments of the present invention.

FIG. 2 is a flow chart depicting the logic of setRelationship ( ) method, in accordance with embodiments of the present invention. The Vector setRelationship(ITStructure x, ITInterface xi, ITStructure y, ITInterface yi, Relationship r) establishes the relationship r between IT structures x and y within the composition of this IT structure. The setRelationship( ) method returns a null Vector if relationship was established successfully, and a Vector of error messages if relationship could not be established. The setRelationship( ) method for ITStructure instance X is invoked with parameters ITStructure A, ITInterface AI, ITStructure B, ITInterface BI, ITRelationship R 2101. The method attempts to find IT structure A in the composition of X 2102. If IT structure A is not found in the composition of X 2103, an error message is returned 2104 and processing terminates. The method then attempts to find IT structure B in the composition of X 2105. If IT structure B is not found in the composition of X 2106, an error message is returned 2107 and processing terminates. The method then proceeds to finding IT interface AI in the list of IT interfaces of IT structure instance A 2108. If AI is not found 2109, an error message is returned 2110 and processing terminates. The method then attempts to find IT interface BI in the list of IT interfaces of IT structure instance B 2111. If BI is not found 2112, an error message is returned 2113 and processing terminates.

Upon ascertaining presence of both specified IT structure instances A and B and IT interfaces AI and BI within A and B, the method execution enters a critical section 2114 which is used to serialize updates to the IT interface states. A critical section is a portion of the method which cannot be executed concurrently in a multi-threaded fashion, and entry to which must be serialized. No particular method of serialization for critical sections of programs is prescribed by this embodiment—known methods include (but are not limited to) semaphores, process queues, process locks, TS (Test and Set) instruction, CS (Compare and Swap) instruction.

The method then checks availability of IT interface AI by invoking the getAvailable( ) method of IT interface AI; if AI is unavailable 2115, an error message is returned 2116, previously entered critical section is exited 2124, and processing terminates. The method proceeds to checking availability of IT interface BI by invoking the getAvailable( ) method of IT interface BI; if BI is unavailable 2117, an error message is returned 2118, previously entered critical section is exited 2124, and processing terminates.

Upon ascertaining availability of both AI and BI interfaces, the method attempts to relate IT interfaces AI and BI. Vector x is allocated (not shown in the figure) to contain error message strings from attempts to establish the interface between AI and BI. The method attempts to update IT interface AI as interfacing with IT interface BI by invoking AI method establishInterface(BI), passing it BI as the parameter 2119. If an error occurs during the establishInterface(BI) method of AI invocation 2120, Vector x contains error messages, which are returned to the invoker of setRelationship( ) method of IT structure instance X 2121 upon exiting the critical section 2124. The method then attempts to update IT interface BI as interfacing with IT interface AI by invoking BI method establishInterface(AI), passing it AI as the parameter 2122. If an error occurs during the establishInterface(BI) method of AI invocation 2123, Vector x contains error messages, which are returned to the invoker of setRelationship( ) method of IT structure instance X 2121 upon exiting the critical section 2124, but only after the error cleanup is performed and the previously established update of IT interface AI is reversed by invoking its method setAvailable(BI) 2125.

If interface establishment was successful, IT relationship R is updated to contain the interface AI and BI 2125 prior to completion of method execution.

2.2.2.5 addElement

FIG. 3 is a flow chart depicting the logic of addElement( ) method, in accordance with embodiments of the present invention. The Vector addElement(ITStructure A) method adds IT structure A to the composition of IT structure X. The IT structures A and X may each independently be an abstract IT structure, a virtual IT structure, or a real IT structure. However, the resulting IT structure will have the highest degree of abstraction of that of X and A. For example, if X is abstract the result will be abstract even if A is not abstract, and if A is abstract the result will be abstract even if X is not abstract. As another example, if either X or A is virtual, and both X and A are not abstract, the result will be virtual.

The addElement( ) method returns a null Vector if addition was successful, and a Vector of error messages if addition failed. The addElement( ) method of ITStructure instance X is invoked with parameter ITStructure A, referencing the ITStructure instance to be added to X's composition 2201. The method retrieves composition of X as a Vector C 2202. If C is null (there are no composition elements for X) 2203, this is the addition of the first element, and no additional checks are necessary. The method creates a composition Vector C for X 2204, adds ITStructure A to C 2205, and returns.

If ITStructure X is a primitive IT structure (X.isPrimitive( )=true) 2243, an error message is stored 2244 and processing terminates.

If ITStructure X already has non-empty composition 2203, the method iterates through X's composition elements making sure no IT dependencies of either X or A are violated by the addition of A to X. While there are elements in C 2206, the next unprocessed element E of C is obtained 2207, and its list of IT dependencies De is extracted using the getDependencies method of E 2208.

While there are unprocessed elements in De (list of IT dependencies of ITStructure E) 2209, the following is performed. A critical section is entered 2210. The next element d of De is obtained 2211. If d (which belongs to the class ITDependency) indicates exclusion with class Y and IT structure A belongs to class Y or its subclass 2212, an error message is stored 2213, and upon exiting from the critical section 2214, processing terminates. Otherwise, critical section is exited 2215.

The method execution then proceeds to obtaining the list Da of IT dependencies of A using the getDependencies( ) method of A 2216. While there are unprocessed elements in Da (list of IT dependencies of ITStructure A) 2217, the following is performed. A critical section is entered 2218. The next element d of Da is obtained 2219. If d (which belongs to the class ITDependency) indicates exclusion with class Z and IT structure E belongs to class Z or its subclass 2220, an error message is stored 2213, and upon exiting from the critical section 2214, processing terminates. Otherwise, critical section is exited 2222.

When all possible combinations of potential dependencies of IT structure A and all elements of the composition of X are exhausted, and no violation has been found, the addElement( ) method invokes method ensureDependencies(A) 2245 to ensure that any of A's IT dependencies of the class requiresPresenceOf are satisfied. If ensureDependencies( ) method's processing was not successful 2246, any error messages returned by the ensureDependencies( ) method's invocation are returned, otherwise, A is added to the composition A is added to the composition C of IT structure X 2205.

2.2.2.6 ensureDependencies

Figure 7:
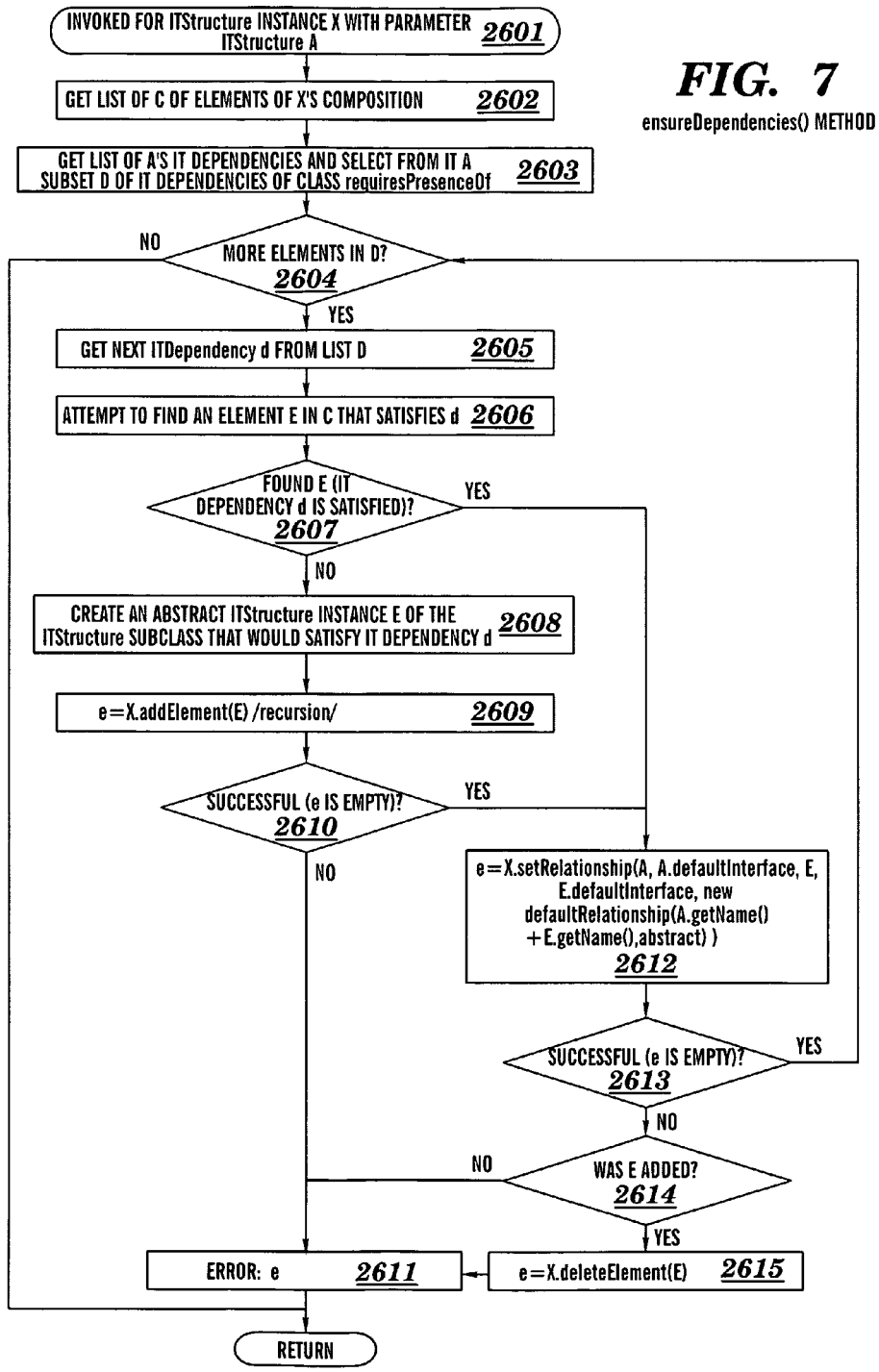
FIG. 7 is a flow chart depicting the logic of ensureDependencies( ) method, in accordance with embodiments of the present invention.

FIG. 7 is a flow chart depicting the logic of ensureDependencies( ) method, in accordance with embodiments of the present invention. The ensureDependencies(ITStructure A) method ensures that IT dependencies of the class requiresPresenceOf of ITStructure A in the composition of this IT structure are satisfied. If processing is unsuccessful, a Vector of error message(s) is returned, otherwise, a null Vector is returned. The ensureDependencies( ) method is invoked for IT structure instance X with parameter ITStructure A 2601. The method retrieves composition of X as Vector C 2602 and the list of A's IT dependencies, from which it selects a subset (list D) of IT dependencies of class requiresPresenceOf 2603. The method then iterates through list D of IT dependencies of class requiresPresenceOf of IT structure A, until the end of the list is reached 2604. Each element d of list D is an IT dependency d of class requiresPresenceOf. The method retrieves the next element d from the list 2605 and attempts to find an element of C (IT structure X composition) that satisfies the IT dependency d 2606. If an element E of C satisfying IT dependency d is found 2607, IT dependency d is considered to be satisfied.

ensureDependencies( ) method then creates an abstract IT structure E of ITStructure subclass that satisfies IT dependency d 2608 and attempts to add E to the composition of IT structure X using a recursive invocation of X.addElement(E) 2609. If execution of X.addElement(E) failed (i.e., E could not be added to X's composition—e.g., because it is exclusive with some element of X's composition) 2610, any error messages returned by X.addElement(E) are returned 2611 and processing terminates. Otherwise, addition of E to X's composition was successful, IT dependency d is now considered to be satisfied.

An abstract IT relationship (defaultRelationship) between E (either found in the composition C of IT structure X, or newly created) and A using defaultInterface of both is created and added to IT structure X) 2612. If establishment of the IT relationship was unsuccessful 2613, error message(s) are returned to the invoker 2611. If E was newly added 2614, it is removed 2615 to maintain the composition of IT structure X unchanged.

If establishment of the new IT relationship was successful 2613, the next element d of A's dependencies is considered.

2.2.2.7 deleteElement

Figure 4:
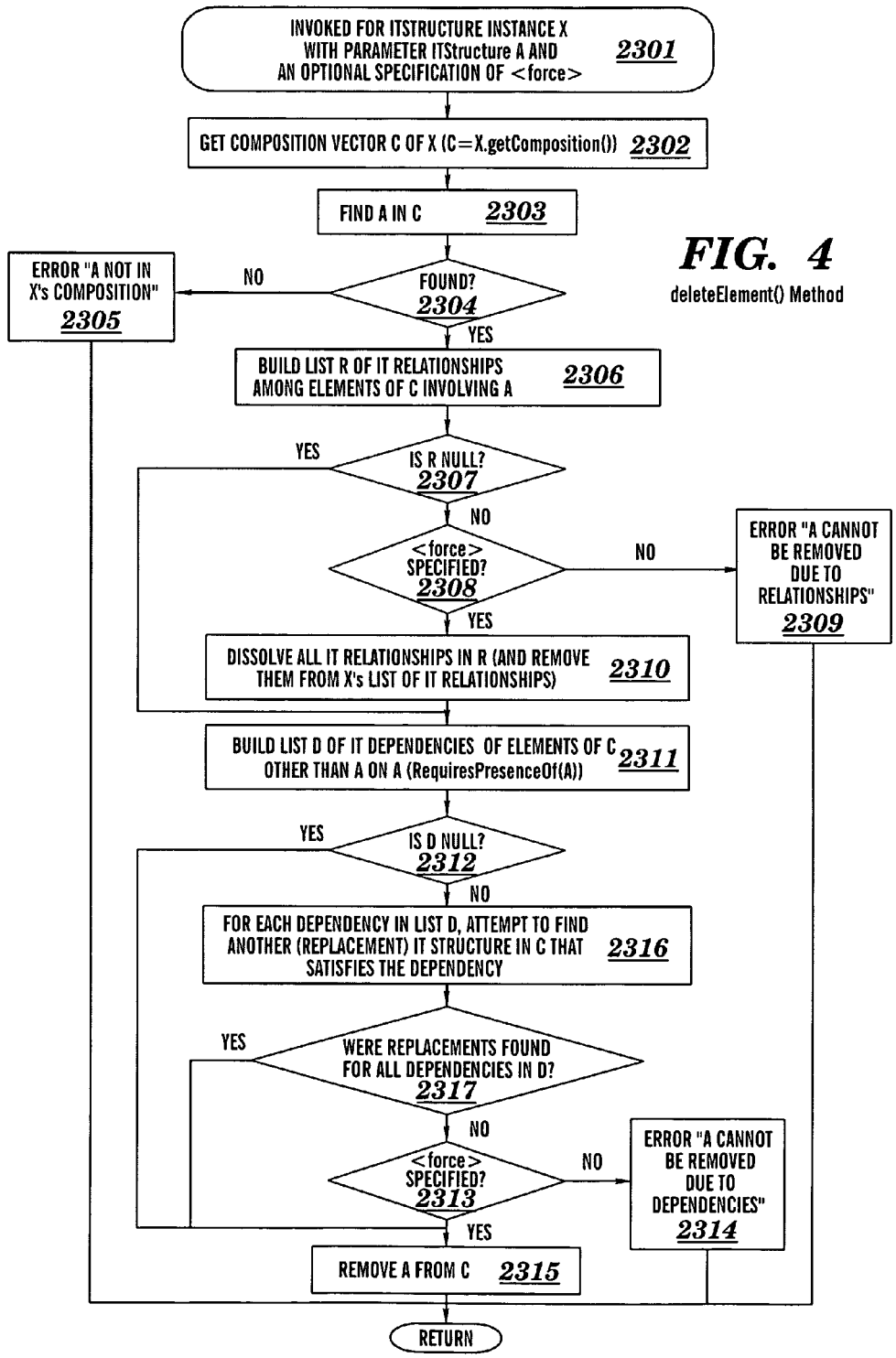
FIG. 4 is a flow chart depicting the logic of deleteElement ( ) method, in accordance with embodiments of the present invention.

FIG. 4 is a flow chart depicting the logic of deleteElement ( ) method, in accordance with embodiments of the present invention. The deleteElement(ITStructure A [, <force>]) method removes IT structure A from the composition of this IT structure. Returns a null Vector if removal was successful, and a Vector of error messages if removal failed. <force> indicates that A should be removed regardless of relationships with or dependencies on it by other elements of this IT structure's composition. In a first embodiment the <force> option is available for being selected, and in a second embodiment the <force> option is not available for being selected. Thus, the <force> option may not be specified because: (1) the <force> option is not available for being selected or (2) the <force> option is available for being selected but was not selected. The deleteElement( ) method is invoked for IT structure instance X with parameter ITStructure A and an optional specification of <force> 2301. The method retrieves composition of X as Vector C 2302 and attempts to find IT structure A in C 2303. If A is not found in C 2304, an error message is stored 2305 and processing terminates. Otherwise, the method proceeds through the attempt to remove A from C.

The method builds the list R of IT relationships of elements of C that involve A 2306. If R is not null (i.e., A is involved in IT relationships with at least one other element of composition of X) 2307, the method checks whether the <force> option was specified 2308, and if not, A cannot be removed from the composition of X, an error message is stored 2309, and processing terminates. If, however, <force> was specified, the method removes all IT relationships in the list R and removes them from the list of IT relationships of elements of C 2310.

The method then proceeds to check IT dependencies involving A. The method builds a list D of all dependencies of elements of C other than A itself on A 2311. If the list D is not null 2312, for each dependency in list D, the method attempts to find an element in C other than A that would satisfy the dependency 2316. If replacements were not found for any dependencies in list D 2317, the method checks whether the <force> option was specified 2313, and if not, A cannot be removed from the composition of X, an error message is stored 2314, and processing terminates.

Otherwise, if all previous checks indicate that removal of A will not damage IT structure X, or if the <force> option specification overrides the possible damage, the method removes A from C 2315.

2.3 IT Interfaces

An IT Interface is a characteristic of an IT structure, specifying a type of relationship this IT structure can engage in relative to other IT structures.

An abstract IT interface instance is an IT interface instance involving at least one abstract IT structure.

A virtual IT interface instance is a non-abstract IT interface instance involving at least one virtual IT structure.

A real IT interface instance is an IT interface instance involving only real IT structures.

A multi-connection IT interface is an IT interface to which multiple IT structures can relate (connect). For example, multiple invokers can call a single program—sometimes, concurrently.

A single-connection IT interface is an IT interface to which a single IT structure can relate (connect). For example, only a single cable can be plugged into a single printer port of a personal computer.

An available IT interface is an IT interface to which one or more IT structures can relate (connect).

A busy or Unavailable IT interface is an IT interface which has exhausted its ability to relate, and cannot be involved in any additional relationships (i.e., the maximum number of relationships have already been established). For example, a printer port of a personal computer is available if nothing is connected to it, and busy/unavailable if a printer cable is plugged into it.

2.3.1 ITInterface Class

An ITInterface class inherits from ITEntity class and has the following methods:

1) ITInterface(String name, Type type)—constructor, creates an ITInterface instance with specified name and type 2) boolean isSingleConnection( )—returns true if this ITInterface is a single-connection IT interface, and false otherwise 3) boolean isAvailable([int p])—returns true if ITInterface is available, false otherwise; optional parameter p indicates the specific connection for a multi-connection interface 4) setAvailable([ITInterface i])—makes ITInterface available; an ITInterface parameter i may be specified for multi-connection IT interfaces to indicate which of the multiple connections is to be made available 5) Vector establishInterface(ITInterface i [, int p])—establishes an interface with the parameter IT interface; returns an empty Vector if interface was established successfully, and a list of error messages otherwise. For a multiple-connection IT interface, may be optionally provided with the second parameter p specifying the connection.

6) int getAvailable( )—for multi-connection IT interfaces returns the number of available connections; always returns zero (unavailable) or one (available) for single-connection IT interfaces; always returns "high integer" for multi-connection IT interfaces with unlimited number of connections 7) int getRelated( )—returns the number of ITInterface instances related to this ITInterface 8) Vector getRelatedITInterfaces( )—returns a list of zero or more ITInterface instances related to this ITInterface 9) Vector verifyValidity(ITInterface Y)—returns null Vector if a connection between this IT interface instance and IT interface instance Y would be valid—i.e., the ITInterface subclass of this instance correlates with the ITInterface subclass of ITInterface instance Y; returns a Vector containing error message(s) if subclasses of X and Y do not correlate.

Note that the verifyValidity( ) method is a NOOP in the ITInterface class—each subclass of ITInterface, with the exception of DefaultInterface, overrides this method with the appropriate logic. Also note that an ITInterface cannot be instantiated—only ITInterface subclasses have practical uses.

2.3.2 ITInterface Subclasses

A number of different interfaces may exist among IT structures. Each IT structure, by definition, includes the DefaultInterface, which is used to establish relationships not involving real interfaces, such as "requires presence of . . . to install". DefaultInterface supports any relationships.

Other ITInterface subclasses are ("correlates" in this context means "can only be related to"):

InstalledOn(<single>)—IT structure is installed using this interface (correlates with Supports)

Supports({<single>|<multiple>})—IT structure(s) can be installed on this interface (correlates with InstallsOn)

ConnectsTo(<connection type>, {<single>|<multiple>})—can connect to IT structure(s) using <connection type>, correlates with ConnectsTo
where:
<connection type>::= {<direct>|<network>|<messaging>|<other>}

X ConnectsTo(<connection type>, {<single>|<multiple>}, Integer IPaddress, Integer NetMask, String transport[, Vector ports])—an additional constructor signature for ConnectsTo, where IPaddress is the IP address associated with this interface, NetMask is the associated netmask, transport is an identifier of the type of transport ("TCP" or "UDP"), and ports is a list of IP ports to be used (if not specified, dynamic port assignment is assumed).

Invokes(<invocation type>, <single>)—can invoke IT structure using <invocation type>, correlates with Invokable Invokable(<invocation type>, {<single>|<multiple>})—can be invoked by IT structure(s) using <invocation type>, correlates with Invokes
where:
<invocation type>::={<direct><interrupt>|<other>}

Manages({<single>|<multiple>})—is managing IT structure(s), correlates with Manageable Manageable(<single>)—is managed by IT structure, correlates with Manages X Balances(<multiple>)—is balancing load for IT structures, correlates with BalancedBy X BalancedBy(<single>)—is balanced by a load balancer, correlates with Balances Table 3 shows valid ITInterface subclass correlations, wherein "yes" denotes a pair of correlated IT interfaces.

The IT interface subclasses are summarized as follows in terms of IT1, IT2, IF1, and IF2:
IT1: IT structure 1
IT2: IT structure 2
IF1: interface of IT structure 1
IF2: interface of IT structure 2

1) Installed On: a characteristic of IF1 permitting IT1 to be installed on IT2
2) Supports: a characteristic of IF2 permitting IT1 to be installed on IT2
3) ConnectsTo: a characteristic of IF1 permitting IT1 to connect to IT2
4) Invokes: a characteristic of IF1 permitting IT1 to invoke IT2
5) Invocable: a characteristic of IF2 permitting IT2 to be invoked by IT1
6) Manages: a characteristic of IF1 permitting IT1 to manage IT2
7) Manageable: a characteristic of IF2 permitting IT2 to be managed by IT1
8) Balances: a characteristic of IF1 permitting IT1 to balance load for IT2
9) BalancedBy: a characteristic of IF2 permitting IT2 to be balanced by IT1

Examples of IT interfaces are as follows:
A program is installed on a computer
A computer supports one or more programs to be installed on the computer
Computer A connects to computer B through a network
Program A invokes program B
Program B is invocable by program A
Program A manages system B
System B is manageable by program A In this embodiment, labor entities are associated with other entities by means of defaultInterface and defaultITRelationship. In another embodiment, a special ITInterface, laborInterface, may be defined, and used to comprise a laborRelationship to relate a labor entity to another entity.

2.3.3 Detailed Description of Non-Trivial Methods
2.3.3.1 setAvailable

Figure 5:
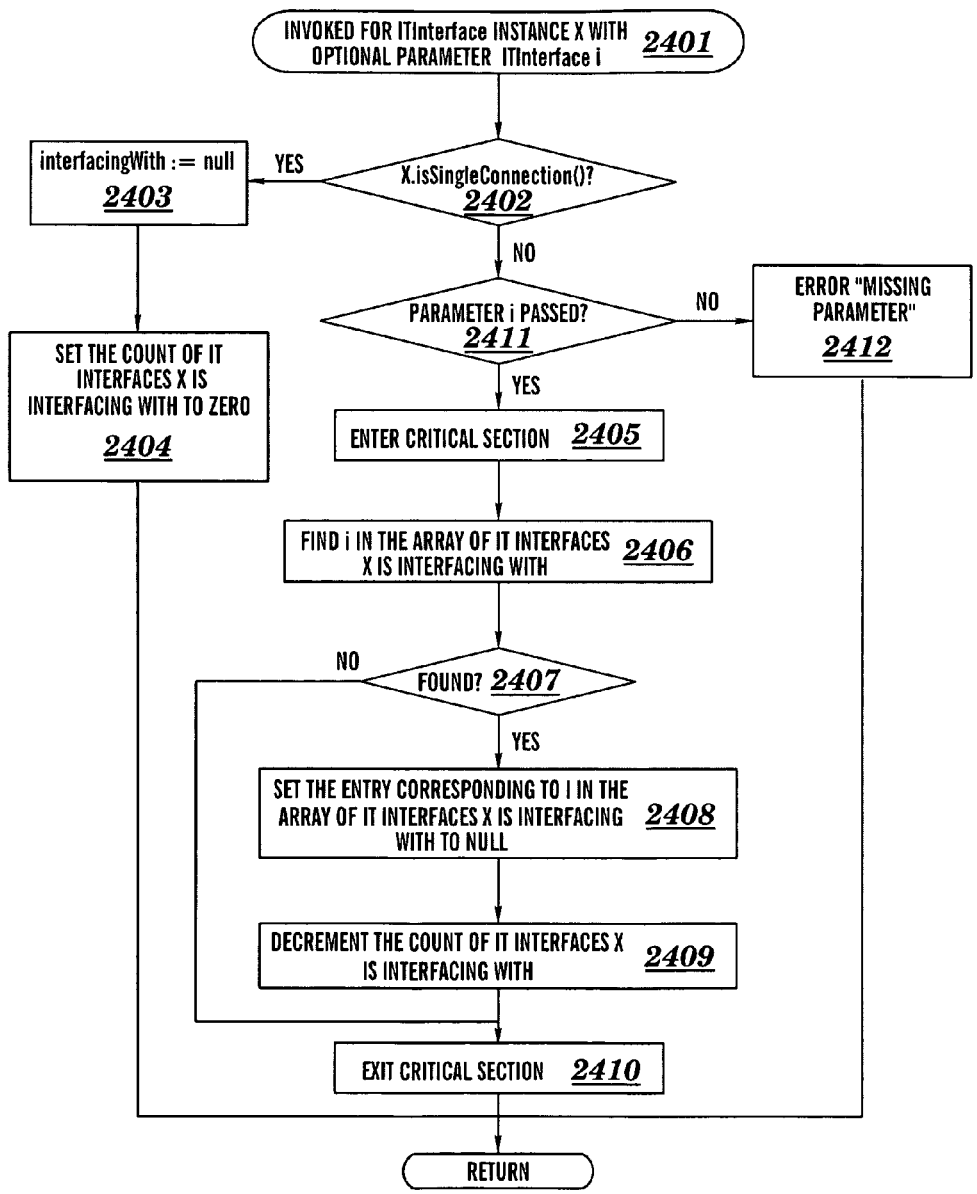
FIG. 5 is a flow chart, depicting the logic of setAvailable( ) method, in accordance with embodiments of the present invention.

FIG. 5 is a flow chart, depicting the logic of setAvailable( ) method, in accordance with embodiments of the present invention. The setAvailable([ITInterface i]) method makes ITInterface available; an ITInterface parameter i may be specified for multi-connection IT interfaces to indicate which of the multiple connections is to be made available. The setAvailable( ) method is invoked for ITInterface instance X with an optional parameter ITInterface i 2401. If IT interface instance X is a single-connection IT interface (X.isSingle-

TABLE 3

Interface correlations

| | Default Interface | Installed On | Supports | Connects To | Invokes | Invocable | Manages | Manageable | Balances | Balanced By |
|---|---|---|---|---|---|---|---|---|---|---|
| Default Interface | yes | yes | yes | yes | yes | yes | yes | yes | yes | yes |
| InstalledOn | yes | | yes | | | | | | | |
| Supports | yes | yes | | | | | | | | |
| ConnectsTo | yes | | | yes | | | | | | |
| Invokes | yes | | | | | yes | | | | |
| Invocable | yes | | | | yes | | | | | |
| Manages | yes | | | | | | | yes | | |
| Manageable | yes | | | | | | yes | | | |
| Balances | yes | | | | | | | | | yes |
| BalancedBy | yes | | | | | | | | yes | |

Connection( ) returns true) 2402, the field interfacingWith in ITInterface X is set to null 2403, and the count of IT interfaces X is interfacing with is set to zero 2404. Note that it is the responsibility of the invoker to ensure that the corresponding IT interface that was interfacing with X (if any) also becomes available.

If ITInterface X is a multiple-connection IT interface 2402, processing ensures that a parameter i is passed, indicating which connection out of the multitude to make available. If parameter i is not passed 2411, and an error is signaled 2412, and processing terminates. The mechanism of signaling an error may vary, depending on implementation, and may include, but is not limited to, an error message, an exception, an ABEND, a log and/or a trace entry.

Upon ascertaining availability of parameter i 2311, processing enters a critical section 2405. ITInterface i passed as the parameter to method setAvailable( ) is located in the array of IT interfaces ITInterface X is interfacing with 2406. If i is not found 2407, processing terminates after exiting a critical section 2410. If i is found 2407, the method sets the entry in the array of IT interfaces ITInterface X is interfacing with that corresponds to i to null 2408, decrements the count of IT interfaces X is interfacing with 2409, and exits the critical section 2410.

2.3.3.2 establishInterface

Figure 6:
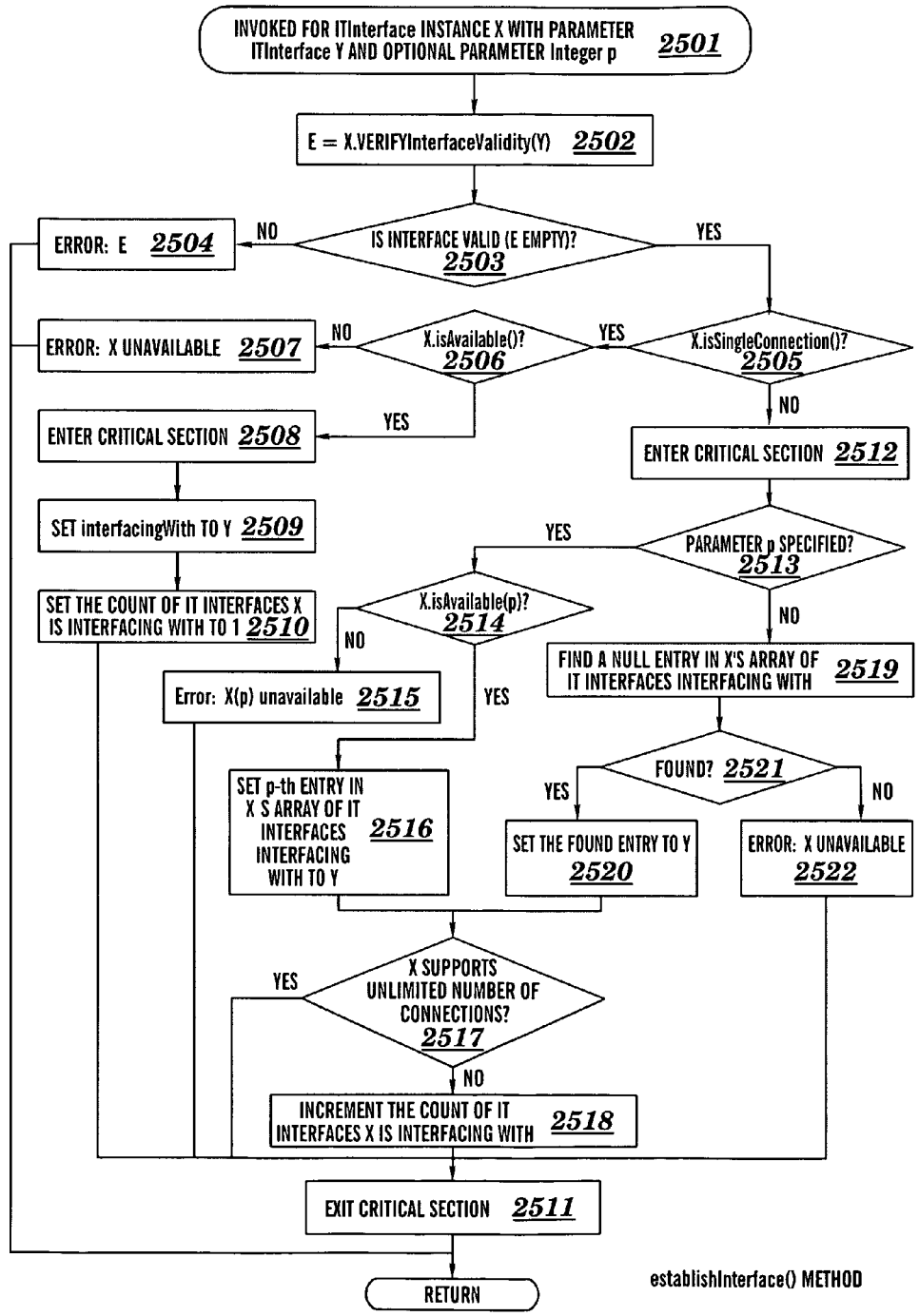
FIG. 6 is a flow chart depicting the logic of establishInterface( ) method, in accordance with embodiments of the present invention.

FIG. 6 is a flow chart depicting the logic of establishInterface( ) method, in accordance with embodiments of the present invention. The establishInterface(ITInterface i [, int p]) method establishes an interface with the parameter IT interface; returns an empty Vector if interface was established successfully, and a list of error messages otherwise. The establishInterface( ) method is invoked for ITInterface instance X with a parameter ITInterface Y and an optional parameter integer p 2501.

The method starts by verifying validity of establishment of connection between X and Y (by invoking method X.verifyValidity(Y)) 2502. If establishment of connection between X and Y is invalid (X.verifyValidity(Y) returns error message(s)) 2503, method establishInterface( ) returns the error message(s) returned by X.verifyValidity(Y) invocation 2504 and terminates processing.

If ITInterface X is a single-connection interface 2505, but X is available 2506, method establishInterface( ) returns and error message 2507 and terminates processing. Otherwise, if X is a single-connection interface 2505 and X is available 2506, a critical section is entered 2508 the interfacingWith reference of ITInterface X is set to Y 2509, the count of IT interfaces X is connected with is set to one 2510, the critical section is exited 2511, and processing completes successfully.

For a multiple-connection ITInterface X 2505, critical section is entered 2512. If the optional parameter p was specified on invocation of method establishInterface( ) 2513, but p-th entry of X's array of connections is not null (X.isAvailable (p)=false), indicating that the p-th connection of X is unavailable 2514, an error message is stored 2515, the critical section is exited 2511, and processing terminates. If, on the other hand, the p-th connection of X is available 2514, the p-th entry in X's array of connections is set to Y 2516.

If the optional parameter p was not specified on invocation of method establishInterface( ) 2513, an attempt is made to find an available (null) entry in X's array of connections 2519. If an available entry is found 2521, the found entry is set to Y 2520, otherwise an error message is stored 2522, and processing terminates after exiting the critical section 2511.

If a connection was established 2516 2520, if ITInterface X does not support an unlimited number of connections 2517, the count of connections of X is incremented 2518. The method establishInterface( ) then exits the critical section 2511 and completes its processing.

2.4 IT Relationships

An IT Relationship is a pair of associated (established) IT interfaces belonging to two different IT structure instances. Note that the notion of IT relationship is introduced for convenience. This notion is not absolutely necessary for the model, since a pair of established IT interfaces can always be considered in and of itself, but IT relationships represent a convenient way of tracking interfacing IT structure pairs.

A symmetric IT relationship is an IT relationship, involving IT interfaces of identical class. Examples of a symmetric IT relationship include:

1) IT structure A uses ConnectsTo interface to relate to IT structure B, and IT structure B uses ConnectsTo interface to relate to IT structure A.

2) IT structure A uses DefaultInterface to relate to IT structure B, and IT structure B uses DefaultInterface to relate to IT structure A.

An asymmetric IT relationship is an IT relationship, involving IT interfaces of different classes. As an example, IT structure A InstallsOn IT structure B, while IT structure B Supports IT structure A.

An abstract IT relationship instance is an IT relationship interface instance involving at least one abstract IT interface instance.

A virtual IT relationship instance is a non-abstract IT relationship instance involving at least one virtual IT interface.

A real IT relationship instance is an IT relationship instance involving only real IT interface instances.

2.4.1 ITRelationship Class

ITRelationship class inherits from ITEntity class and has the following methods:

1) ITRelationship(String name, Type type[, ITInterface A, B])—constructor, establishes a relationship <name> of type <type> using IT interfaces A and B, or defaultInterface if A and B are not specified.

2) boolean isSymmetric( )—returns true if relationship is symmetric, false otherwise 3) [ ] ITInterface getRelatedITInterfaces( )—returns the pair of ITInterface instances involved in a relationship ITRelationship cannot be instantiated—only ITRelationship subclasses have practical uses.

2.4.2 ITRelationship Subclasses

Subclasses of the ITRelationship class are predicated by the types of IT interfaces included in the model. The following IT relationships may exist given the types of IT interfaces defined above:

DefaultITRelationship—two IT structures are related in an unidentified way

InstallationITRelationship—IT structure 1 is installed on IT structure 2

CommunicationITRelationship(<connection type>)—IT structure 1 communicates to IT structure 2 using <connection type>

InvocationITRelationship(<invocation type>)—IT structure 1 invokes IT structure 2

ManagementITRelationship—IT structure 1 manages IT structure 2

2.5 IT Dependencies

An IT dependency is a characteristic of an ITStructure class, indicating requirements of this ITStructure class instances for presence or absence of this or other ITStructure class instances.

A symmetric IT dependency is an IT dependency which can be applied to ITStructure subclasses involved, regardless of the order of ITStructure subclasses in the IT dependency predicate. For example, IT structure A depends on IT structure B, and IT structure B depends on IT structure A in the same way. The order of A and B in the previous sentence may be reversed without a change in meaning of the sentence.

An asymmetric IT dependency is a non-symmetric IT dependency (i.e., it cannot be applied to ITStructure subclasses involved regardless of their order in the IT dependency predicate). For example: IT structure A depends on IT structure B, but IT structure B does not depend on IT structure A.

2.5.1 ITDependency Class

ITDependency class inherits from ITEntity class and has the following methods:

1) ITDependency(String name, String A, B)—constructor, establishes a dependency of ITStructure subclass A on ITStructure subclass B, where A and B are names of subclasses.

2) boolean isSymmetric( )—returns true if relationship is symmetric, false otherwise 3) [ ] String getDependentClasses( )—returns the pair of names of ITStructure subclasses involved in an IT dependency.

ITDepdendency cannot be instantiated—only ITDependency subclasses have practical uses.

2.5.2 ITDependency Subclasses

A number of different dependencies may exist among IT structures comprising (i.e., included in a complex IT structure's composition) or potentially comprising an IT structure (i.e., having a potential of being included in a complex IT structure's composition). For the purposes of this definition, the following dependencies (ITDependency subclasses) are considered (i.e., other dependencies may be defined as appropriate for the structural model):

1) RequiresPresenceOf—as in "IT structure 1 requires presence of IT structure 2"

2) ExclusiveWith—Negation of 1—as in "IT structure 1 is exclusive with IT structure 2", IT structure 1 cannot be installed or operate in the presence of IT structure 2

In this embodiment, no difference is made between requirement of presence for installation and requirement of presence for operation, and the corresponding exclusivity. In another embodiment, such distinction could be made.

2.6 IT Delivery Environment

An IT delivery environment (or delivery environment) is a collection of rules, policies, practices, and associated support functions, including labor, physical space, power supply, hardware, software, networking, and management facilities involved in operating a data center, as well as means of provisioning and deployment of the aforementioned support functions. IT delivery environment also includes a collection of all delivery-bound real IT structures operating in it or in process of being deployed.

IT delivery environment may be null if every IT structure in it operates independently, does not use any data center services, no data center infrastructure exist, and no rules or standards are imposed on IT structures by the delivery environment. For example: a stand-alone personal computer is operated in a null IT delivery environment.

A delivery-bound IT structure is a virtual IT structure that can be provisioned and deployed in a particular IT delivery environment.

2.6.1 ITDeliveryEnvironment Class

ITDeliveryEnvironment class inherits from ITStructure and is always a complex IT structure. ITDeliveryEnvironment composition includes all IT structures deployed in the delivery environment. ITDeliveryEnvironment composition may (and normally would) also include one or more IT structures representing data center infrastructure.

Unlike ITStructure, ITDeliveryEnvironment permits an empty composition—empty composition is valid for the null IT delivery environment.

In addition to the standard ITStructure methods, ITDeliveryEnvironment includes the following methods:

1) Vector verifyConformance(ITStructure A)—verifies conformance of an IT structure to the rules of the IT delivery environments. Returns an empty Vector if the parameter IT structure conforms to the IT delivery environment rules, and a Vector containing a list of error message strings if the parameter IT structure does not conform to the IT delivery environment rules. This method is a NOOP for the null IT delivery environment.

Example: A set of product standards may be established by a data center, such that for certain types of products only products included in the standard set may be used—e.g., operating systems may be restricted to UNIX, and Windows; e.g., UNIX hardware platforms may be restricted to RS/6000 model F50 or H50 and no other computer may be used to run UNIX. verifyConformance( ) method in this case would examine the composition of its parameter IT structure (recursively, if the parameter IT structure is complex) and ensure that it only includes products for operating systems and hardware platform for UNIX that are either within the established set of standards or have higher level of abstraction than specific operating system and specific type of hardware.

2) Vector addElement({<new>|<update>}, ITStructure A)—overrides the parent class addElement( ) method; performs delivery binding of a virtual IT structure. Returns a Vector containing a delivery-bound IT structure as the first element if delivery binding is successful, and a list of error messages otherwise. This method is a NOOP (i.e., returns the input virtual IT structure as the first element of the returned Vector) for the null IT delivery environment. <new> or <update> input parameter may be specified to indicate whether this is a binding of a newly added IT structure, or an update of an existing IT structure.

3) Vector deploy({<new>|<update>}, ITStructure A)—initiates deployment of a delivery-bound IT structure. Returns a Vector containing error messages if processing is unsuccessful, and a null Vector otherwise. <new> or <update> input parameter may be specified to indicate whether this is a deployment of a new IT structure, or a change to an existing IT structure.

4) NetworkSecurityPolicy getNetworkSecurityPolicy ( )—returns network security policy established within the IT delivery environment. The NetworkSecurityPolicy class may be specific to a particular IT delivery environment.

5) setNeworkSecurityPolicy(NetworkSecurityPolicy S)—establishes a network security policy S for an IT delivery environment.

Note that all methods of ITDeliveryEnvironment class are subclass-specific. Class ITDeliveryEnvironment includes NOOP placeholders.

2.7 Extending Entity Model

The above model provides a foundation for building an IT class library. However, it is highly abstract and insufficient for effective modeling of IT. A set of general extensions, with its classes inheriting from the appropriate base IT classes, defining basic IT constructs, such as computers or network devices, is required as further foundation. Such extended class libraries exist—e.g., Common Information Model (CIM).

Figure 18:
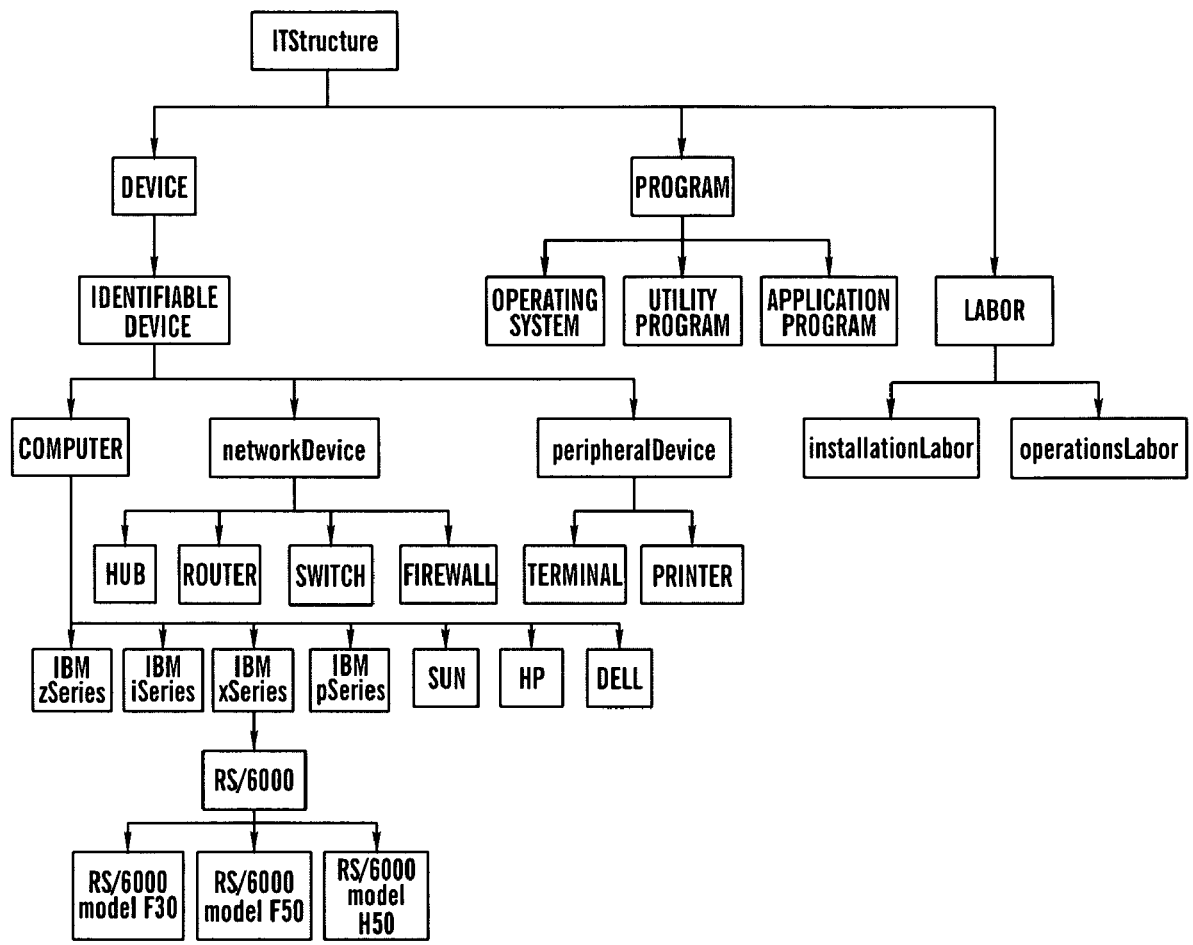
FIG. 18 is an extended class hierarchy example, in accordance with embodiments of the present invention.

Another example of such class hierarchy is described in FIG. 18, in accordance with embodiments of the present invention. FIG. 18 is an example of a set of extensions going from the class hierarchy origin (ITEntity) down to a set of specific computer models shown at a lowest hierarchical level as the virtual IT structures RS/6000 model F30, RS/6000 model F50, and RS/6000 model H50. FIG. 18 also shows intermediate hierarchical levels having successively lower degrees of abstraction. For example, consider the following example path through the hierarchical representation shown in FIG. 18: ITStructure, device, Identifiable Device, computer, IBM xSreies, RS/6000, RS/6000 model F50. In the preceding example, device is less abstract than ITstructure, IdentifiableDevice is less abstract than device, computer is less abstract than IBMxSeries, IBMxSeries is less abstract than RS/6000, and RS/6000 is less abstract than RS/6000 model F50. The lowest level IT structure of RS/6000 model F50 is a virtual IT structural, though not delivery bound.

Within the IT class hierarchy, class Device is included; the class Device embodies any types of hardware devices, and, in addition to all inherited and specific properties and methods associated with class Device, provides the following methods:

Int PeakPowerConsumption( )—returns the peak power consumption of the device (expressed in KW);

Boolean isRackMounted( )—returns true if the device is rack-mounted, and false otherwise;

Int requiredSpace( )—returns the number of rack slots a device requires if it is rack mounted, or the size of device footprint (expressed in square feed) if device is not rack mounted.

Within the IT class hierarchy, class Firewall is included; the class Firewall embodies any type of firewalls, and, in addition to all inherited and specific properties and methods associated with class Firewall, provides the following methods:

Vector getRules( )—returns the Vector of firewall rules associated with this firewall, or null if no rules have been specified for this firewall;

setRules([Vector rules)])—if not specified, the set of firewall rules is set to empty (no rules); otherwise, the set of firewall rules is set to the specified Vector of rule strings.

Class Program, also included in the IT class hierarchy, in addition to all the other properties and methods inherited or specific to class Program, possesses the properties IPTransportServer and Ports. Note that "application" and "software" are each to be construed as a member of the class Program.

IPTransportServer(["TCP"|"UDP"])—sets the IPTransportServer property value to "TCP" if a Program is a TCP server, "UDP" if a Program is a UDP server, or null, if a Program is not an IP transport server.

String getIPTransportServer( )—returns the value of the IPTransportServer property.

Ports is a Vector of TCP or UDP ports which the Program uses to accept communications.

setPorts([Vector <ports>])—sets the value of IP ports associated with the IP transport server; if not specified, dynamic port assignment is assumed, Vector getPorts( )—retrieves the list of ports associated with the IP transport server.

Associated with the above properties, is a list of clients, IPClients.

Vector getIPClients( )—returns a list of IP clients associated with the IP transport server.

setIPClients(Vector <IP address>)—associates a set of IP clients with the IP transport server, where <IP address> is either address of the host or network where each client is located.

The isSessionBased property of class Program indicates whether the program represented by the instance of class Program supports persistent sessions.

Boolean isSessionBased( )—returns the value of isSessionBased property of class Program, void setIsSessionBased({true|false}) otherwise sets the value of isSessionBased property to the specified Boolean value.

The expectedTxLoad property of class Program reflects the expected server load triggered by a single transaction on the scale of 0, 1, 2, 3 where 0 corresponds to unknown, 1 reflects low expected server load, 2 reflects medium expected server load, and 3 reflects high expected server load.

Integer getExpectedTxLoad( )—returns the value of expectedTxLoad property.

setExpectedTxLoad({0|1|2|3})—sets the value of expectedTxLoad property.

setPeakBandwidth(Int <peak bandwidth>)—sets the value of peak bandwidth this program may require, expressed in Mbps.

Int getPeakBandwidth( )—returns the peak value of bandwidth this program may require, expressed in Mbps.

Class Program may be associated with an ITServer object; this association is established by means of getITServer( ) and setITServer( ) methods.

ITServer getITServer( )—returns ITServer object associated with the Program, or null if none is associated.

setITServer(ITServer S)—associates a Program with ITServer S, or disassociates a Program from an ITServer if S is null.

An ITServer class, included in the IT class hierarchy, in addition to all the other properties and methods inherited or specific to class ITServer, has the following methods:

setITLBGroup(ITLBGroup G)—associates an ITServer with an instance of ITLBGroup, or disassociates ITServer from an instance of ITLBGroup if G is null.

ITLBGroup getITLBGroup( )—returns the associated ITLBGroup instance, or null if no ITLBGroup instance is associated.

setlbApplication(Program A)—sets an association with an instance of Program object which represents the application program requests to which should be load balanced.

Program getlbApplication( )—returns instance of class Program, requests to which should be load balanced, or null if no such program has been associated using setlbApplication ( ) method.

An ITLBGroup class, included in the IT class hierarchy, in addition to all the other properties and methods inherited or specific to class ITLBGroup, has the following methods:

Vector getServerList( )—returns the list of ITServer objects comprising the load balanced group.

setServerList(Vector S)—sets the list of ITServer objects comprising the load balanced group.

ITLBMechanism getITLBMechanism( )—returns the instance of ITLBMechanism class, which contains the definition and parameters of the load balancing mechanism to be used setITLBMechanism(ITLBMechanism M)—sets the instance of ITLBMechanism class.

ITLBSessionPersistence getITLBSessionPersistence ( )—returns the stored definition of the session persistence mechanism to be used; class ITLBSessionPersistence is a user-defined class which represents the session persistence mechanism to be used—source IP address/port, URL, or cookie-based string.

setITLBSessionPersistence (ITLBSessionPersistenceS)—sets the definition of the session persistence mechanism to be used.

Class LoadBalancer is included in the IT class hierarchy, embodying any type of load balancer, and, in addition to all the other properties and methods inherited or specific to class LoadBalancer, having the following methods:

Vector getRules( )—returns the Vector of load balancing rules associated with this load balancer, or null if no rules have been specified for this load balancer.

setRules([Vector rules)])—if not specified, the set of load balancer rules is set to empty (no rules); otherwise, the set of load balancer rules is set to the specified Vector of rule strings.

Class ITLBMechanism is the parent for the following classes which describe individual load balancing mechanisms which have become de-facto industry standards: ITLBMechanismRoundRobin, ITLBMechanismLeastLoad, ITLBMechanismFastestResponse.

Class ITLBMechanismRoundRobin provides the following methods:

setWeightCoefficients(Vector weightCoefficients [ ])—sets weight coefficients associated with the round-robin algorithm for load balancing Vector getWeightCoefficients( )—returns the values of weight coefficients associated with the round-robin algorithm for load balancing Class ITLBMechanismLeastLoad provides the following methods:

setLoadMetrics(ITLBLoadMetrics loadMetrics)—specify least load algorithm load metrics, where class ITLBLoadMetrics is a user-defined class which provides a method returning a double precision value of the load metrics.

ITLBLoadMetrics getLoadMetrics( )—retrieve least load algorithm load metrics

Class ITLBMechanismFastestResponse provides the following methods:

setResponseString(String responseString)—sets the response string associated with the fastest response load balancing algorithm String getResponseString( )—retrieves the response string associated with the fastest response load balancing algorithm.

Within the IT class hierarchy, class ITIPTransportWrapper is included, to describe IP transport wrappers, and, in addition to all inherited properties and method, possesses the following properties and provides the following methods:

IPTransport(["TCP"|"UDP"])—sets the IPTransport property value to "TCP" if the non-compliant transport is TCP, "UDP" if the non-compliant transport is UDP, or null otherwise.

String getIPTransport( )—returns the value of the IPTransport property.

Vector getInPorts( )—returns the vector of TCP or UDP ports where the wrapper is to intercept the incoming communications.

setInPorts(Vector P)—sets the vector of TCP or UDP ports where the wrapper is to intercept the incoming communications.

Integer getOutPort( )—returns the number of TCP or UDP port where the wrapper is to open the pipe to.

The present invention discloses a translator (see Section 2.10 infra) to translate the abstract IT structure at the highest level (denoted as ITStrucure) to the virtual IT structures RS/6000 model F30, RS/6000 model F50, and RS/6000 model H50. To effectuate such translation, all of the intermediate IT structures shown in FIG. 18 may be stepped through in order to arrive at the final virtual IT structures (e.g., RS/6000 model F30, RS/6000 model F50, RS/6000 model H50, etc.). In some embodiments, however, the designer may provide sufficient input description (typically stored in libraries) so that the translator may not have to step through all of the intermediate IT structures shown in FIG. 18 to arrive at the final virtual IT structures. For example, a requirement that a particular IT structure can store and execute software may imply that the particular IT structure is a computer, so that the intermediate levels of device and IdentifiableDevice in the preceding example path could be skipped by the translator.

Figure 15:
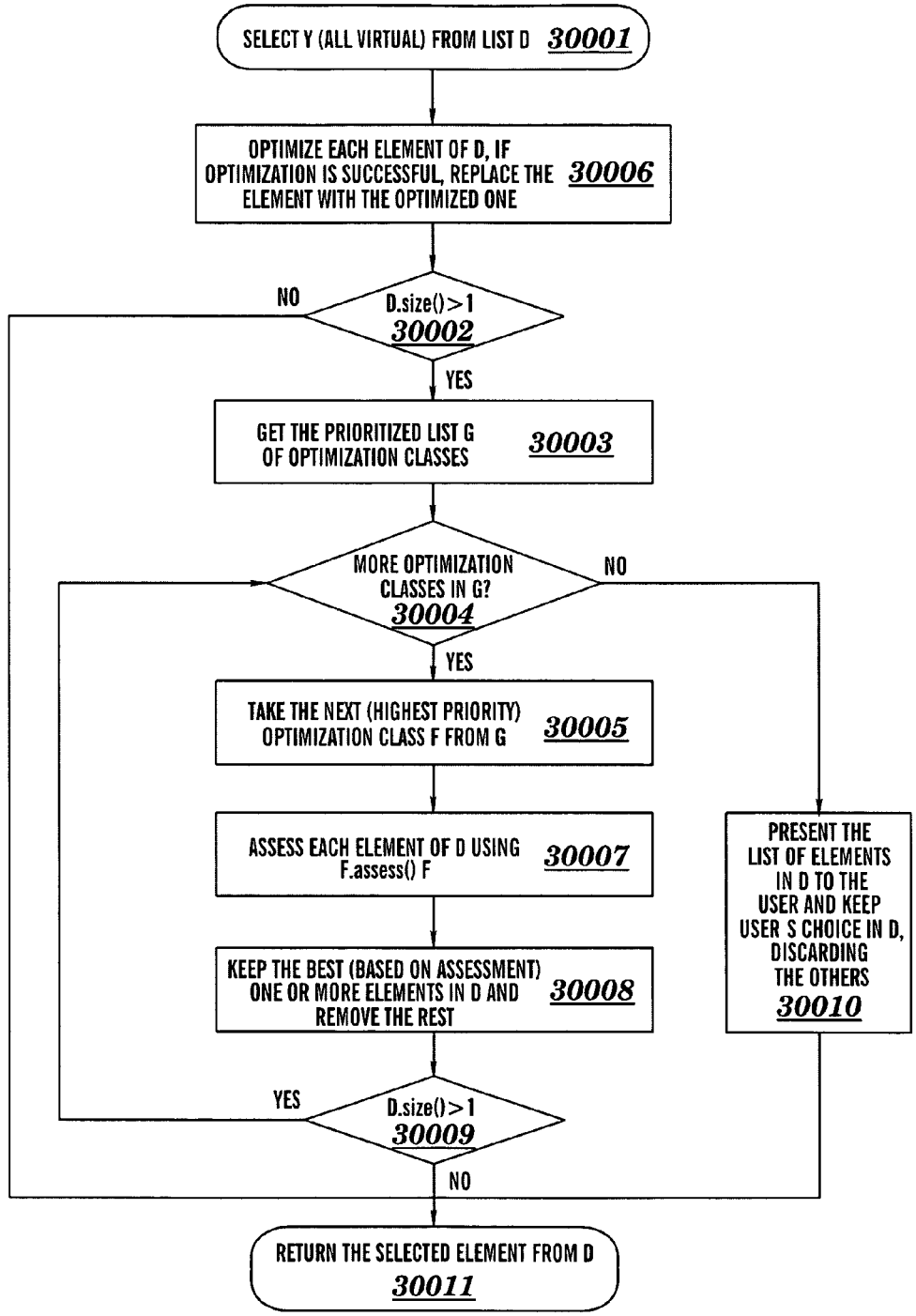
FIG. 15 is a flow chart depicting the process of selecting the best translation candidate from a list of translation candidates, in accordance with embodiments of the present invention.

Although each IT structure box in FIG. 18 is a primitive IT structure, a box appearing in the hierarchy of FIG. 15 could alternatively be a complex IT structure. For example, a box in the hierarchy could represent a client-server architecture as a complex IT structure having primitive elements of server and client.

2.8 Extended IT Delivery Environment

Similar to ITStructure subclasses, the ITDeliveryEnvironment class can have subclasses, used to define various delivery environments. All of ITDeliveryEnvironment subclasses must override two methods: verifyConformance( ) and addElement( ). The verifyConformance( ) method verifies whether a particular IT structure can be deployed and can operate within a given instance of an ITDeliveryEnvironment subclass. The addElement( ) method performs delivery binding of an IT structure to the IT delivery environment subclass instance if the IT structure has been previously verified via verifyConformance( ) to be depoyable and operable within the IT delivery environment defined by the given instance of an ITDeliveryEnvironment subclass.

While this embodiment does not attempt to enumerate all possible delivery environments, an example ITDeliveryEnvironment subclass, called StandardizedITEnvironment is described. The key characteristic of the StandardizedITEnvironment is that it imposes product standards and restricts IT structures deployed and operated within it only to the allowable product set. So, the verifyConference( ) method of StandardizedITEnvironment checks primitive composition of its argument target IT structure and indicates conformance only if every element of the primitive composition of the target IT structure belongs to the set of primitive IT structures permitted by the ITDeliveryEnvironment subclass. For example, the ITDeliveryEnvironment subclass may restrict a computer to be an IBM xSeries computer or an IBMzSeries computer.

Another embodiment for using the verifyConformance( ) method is a situation in which an IT structure is currently deployed in IT delivery environment A, but it is desired that this IT structure migrate to IT delivery environment B. Accordingly, this IT structure would be checked against the verifyConformance( ) method of delivery environment B to determine if this IT structure could be deployed in delivery environment B.

Figure 19:
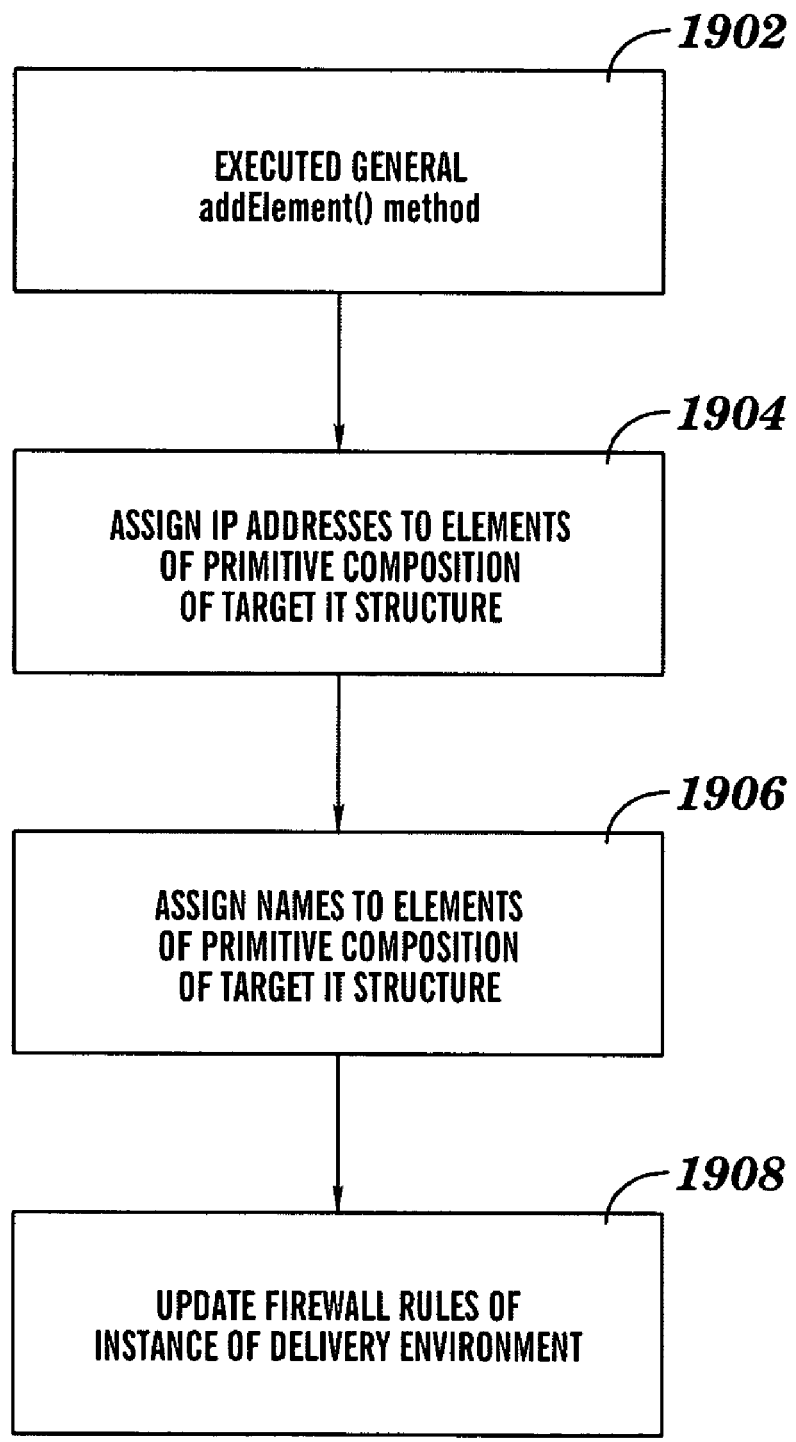
FIG. 19 is a flow chart for implementing delivery binding of an IT structure to a delivery environment, in accordance with embodiments of the present invention.

FIG. 18 is a flow chart depicting a modified addElement( ) method of StandardizedITEnvironment to perform delivery binding of the argument target IT structure to the instance of StandardizedITEnvironment, in accordance with embodiments of the present invention. The modified addElement( ) method effectuates IT delivery binding by invoking the general addElement( ) method of FIG. 3 with an addition of elements required to delivery bind the IT structure to a given IT delivery environment. As a part of this process, the modified addElement( ) method of FIG. 19 includes the general addElement( ) method 1902 of FIG. 3. If at least one element of the primitive composition of the delivery-bound IT structure requires access to the Internet, then the modified addElement( ) method assigns 1904 IP addresses to the elements of primitive composition of the target IT structure requiring IP addresses, these IP addresses being unique relative to the current primitive composition of the instance of StandardizedITEnvironment and adhering to the IP addressing policy of the instance of StandardizedITEnvironment. Similarly, the addElement( ) method assigns names 1906 to the elements of primitive composition of the target IT structure requiring names, and ensures uniqueness of these names relative to the current primitive composition of the instance of StandardizedITEnvironment and adherence of these names to the naming policies of the instance of StandardizedITEnvironment. If target IT structure requires access to the Internet through the firewall(s) provided by the instance of StandardizedITEnvironment, the firewall rules of the instance of StandardizedITEnvironment are updated 1908 to permit the appropriate communications.

2.8.1 Verifying Conformance of an ITStructure to an Exemplary Delivery Environment The exemplary delivery environment is a data center and is aimed at providing the highly-available branded infrastructure for Internet-accessible IT applications.

The data center is a new, state-of-the-art facility. It is built on today's technology and practices a philosophy of being a security-focused operation. Activities and services are monitored by an experienced technical staff 24×7 from the Network Operations Center (NOC). The facilities include 3,000 square feet of raised floor, a network operations monitoring center, conference rooms, administrative space and coffee room.

The physical space of the data center has a secure co-location in a 3,000 square foot room with 18" raised floor and is ADA (Americans with Disabilities Act)-compliant. The physical space includes 27"×39"×84" cabinets with internal vertical cable management and vented front and back doors. All hardware must fit into cabinets. No space other than cabinets is provided.

The electrical power to the data center from NYSEG (New York State Electric and Gas Company) is delivered by dual redundant feeds. The electric service in the building is connected to a parallel redundant UPS. There is a backup 1000 KW diesel generator with 7-day fuel reserve.

Primary Internet access of the data center is via AT&T Gigabit Ethernet over multi-mode fiber to their national fiber network node located in adjacent building. This network node has eight connections to the AT&T network. Alternate Internet access is via 100 Mbps Ethernet over single-mode fiber connection to the Cable & Wireless Network.

Security for the data center includes access control by Smart Card system issued by NOC personnel staffed 24×7× 365 (24 hours, 7 days a week, 365 days a year). Data center floor access is controlled by access card and biometric scan. Visitors are granted access by duly authorized representatives of the data center clients. A biometric scan and surrender of the visitor's driver's license for a proxy card is required for visitors to gain access from the lobby to the administrative area. Another biometric scan and use of the access card is required to enter the raised floor area.

Conformance factors for the IT structure to the above IT delivery environment (i.e., data center) include:

Electric power availability, reliability (and possibly voltage)

Ability to introduce devices out of the list of "supported" devices

Ability to use specific software, or requirement to run specific software (e.g., for monitoring or virus defense)

Availability of specific rack sizes/space

Ability to use geometrically non-standard devices

Compliance to physical network layer (jack types; switches/hubs; network speed)

Compliance to monitoring/admin access (e.g., there may be a requirement to have an extra network interface per physical box for admin access)

Possible conflict of application availability requirements to DE service window

Network bandwidth requirements

Internet availability requirements (dual-ISP, etc. . . . )

Architectural requirements with respect to network (layering, firewalls, IP addressing schema, network isolation requirements)

Network traffic requirements (e.g., "This IT Delivery Environment will allow only HTTP/HTTPS traffic from the Internet to your hosts"; "We do not allow outgoing traffic on port 25 directly, you must use one of our SMTP servers if you want to send email")

Application type limitations ("We do not allow mass-mailing applications")

Figure 9:
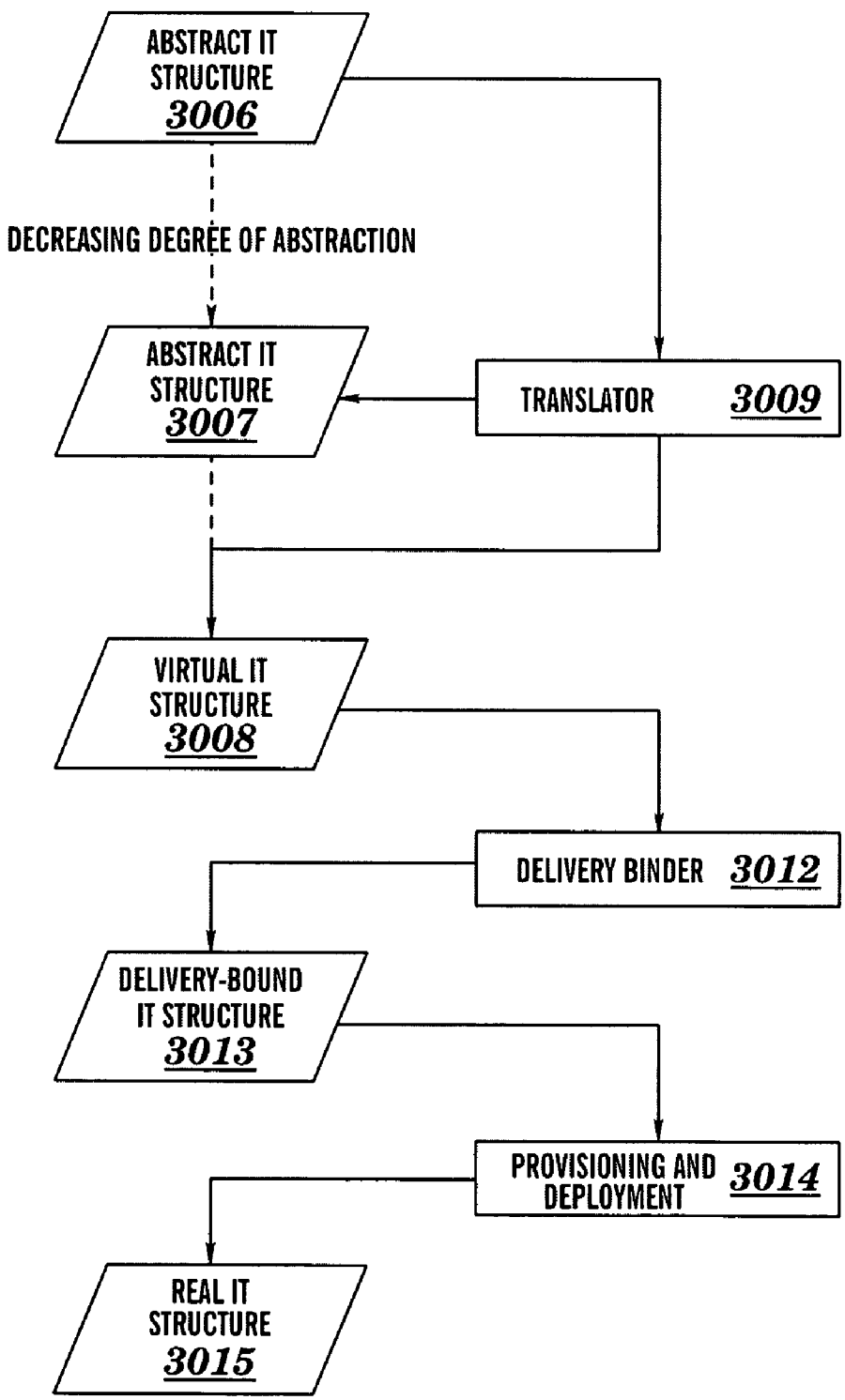
FIG. 9 is a chart depicting the IT development process, in accordance with embodiments of the present invention.
Figure 10:
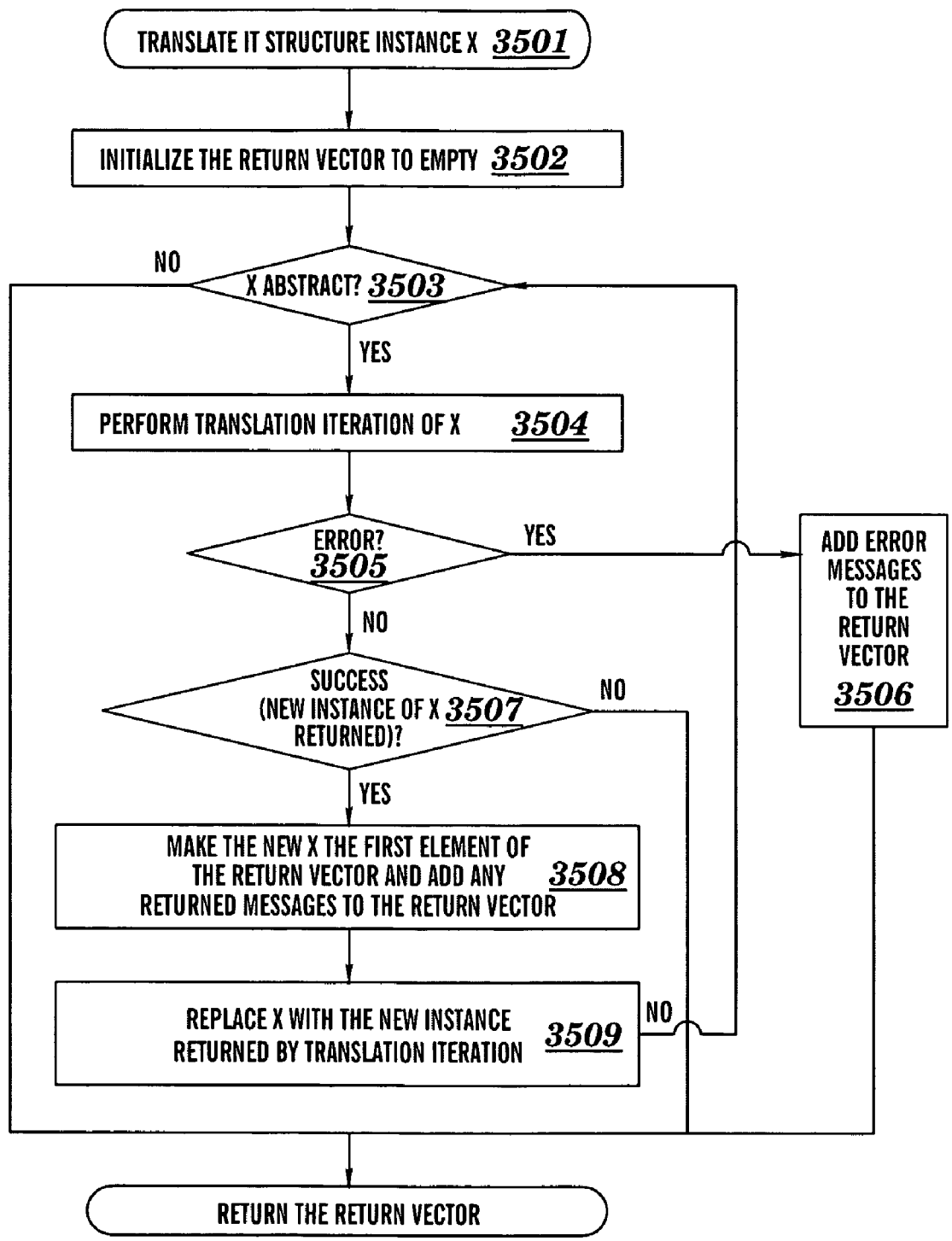
FIG. 10 is a flow chart depicting the process of translation of an IT structure instance, in accordance with embodiments of the present invention.

Security level provided by IT Delivery Environment versus IT structure security requirements 2.9 IT Development Process FIG. 9 is a chart depicting the IT development process, in accordance with embodiments of the present invention. Translator 3009 (see Sec. 2.10; FIG. 10) may be used in a translation process to translate an abstract IT structure 3006 into another abstract IT structure 3007 having a lower degree of abstraction than abstract IT structure 3006. This translation process may be recursively repeated until the abstract IT structure 3006/3007 has been translated into a virtual IT structure 3008 or until the translation process aborts due to an unsuccessful translation attempt. Alternatively, a single translation of abstract IT structure 3006 by translator 3009 may produce the virtual IT structure 3008. The virtual IT structure 3008 serves as input to the delivery binder 3012 (see Sec. 2.11; Sec. 2.2.2.5, addElement( ) method, FIG. 3), which translates the virtual IT structure into a delivery-bound IT structure 3013, elements of which are then provisioned and deployed 3014 (see Sec. 2.12; deploy( ) method), resulting in a real IT structure 3015 operating in the appropriate IT delivery environment.

2.10 Translation

Figure 11:
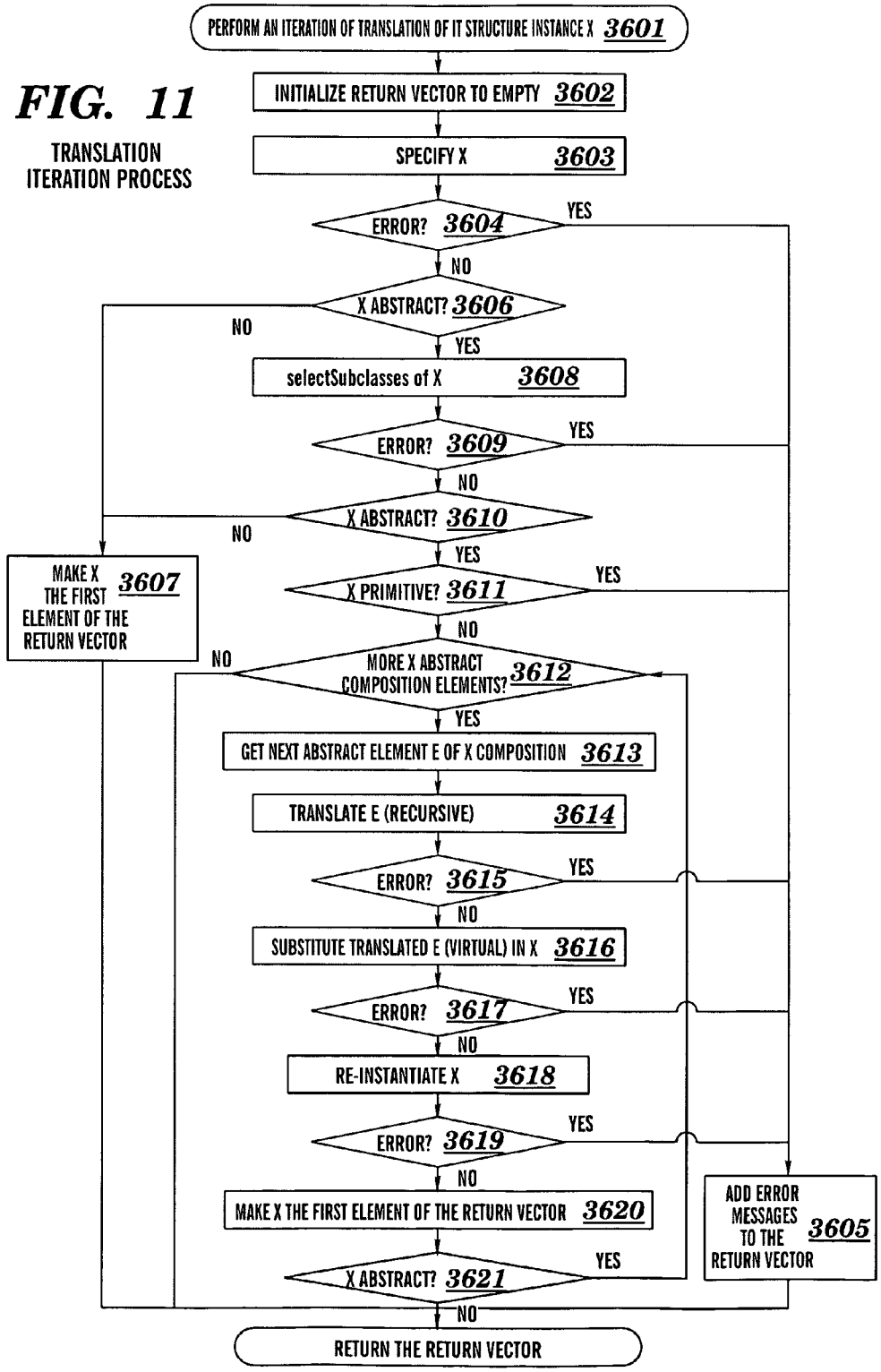
FIG. 11 is a flow chart depicting the translation iteration process, in accordance with embodiments of the present invention.

Translation is performed on an abstract IT structure instance with the intention of obtaining a virtual IT structure, which can then be optimized and bound to one or more IT delivery environment to obtain one or more real IT structure. FIGS. 10 and 11 collectively describe an IT translator (ITRAN) adapted to translate an abstract IT structure to the virtual IT structure.

FIG. 10 is a flow chart depicting the process of translation of IT structure instance X 3501, in accordance with embodiments of the present invention. The process starts by initializing the return Vector 3508 to an empty Vector 3502. If X is not abstract 3503, no translation is necessary, and a null return Vector is returned to indicate that no action was performed (and no errors occurred).

The process then performs a series of iterations until either an error occurs or a virtual IT structure is obtained. The process invokes the translation iteration process 3504, as described infra in relation to FIG. 11, to iteratively translate the abstract elements of X (i.e., the IT structures in the composition of X) until an instantiation of X following said iterative translation is virtual. If an error is indicated by the translation iteration (by returning error message(s)) 3505, any error messages returned by the translation iteration process are added to the return Vector 3506 and processing terminates. If translation iteration processing did not indicate an error 3505, a check is performed to ascertain whether the translation iteration processing was successful 3507 (i.e., the translation iteration process returned a new instance of IT structure X), and if so, the new instance of IT structure X returned by the translation iteration process is made the first element of the return Vector 3508, and the current instance of IT structure X is replaced with the new instance of IT structure X returned by the translation iteration process 3509. The process then loops back to the check of whether the instance of IT structure X is still abstract 3503.

FIG. 11 is a flow chart depicting the translation iteration process, which is performed for an IT structure instance X 3601, in accordance with embodiments of the present invention. The process iterates through the abstract elements of X's composition to perform a translation of each abstract element of X, wherein the iterations end when a re-instantiation of X results in X being virtual (i.e., being in a virtual state).

The process starts by initializing the return Vector 3620 to an empty Vector 3602. The process then invokes the process of specification for X 3603, which may be a NOOP if X is fully specified, or, if X is not fully specified, will ensure full specification of characteristics of X. If an error occurs during the specification process for X 3604, any error messages returned by the specification process are added to the return Vector 3605 and processing terminates.

The process then checks whether X is abstract 3606, and if X is no longer abstract (i.e., X is now virtual), the process makes X the first element of the return Vector 3607 and returns.

If X is still abstract 3606, the process invokes selection of subclasses for X 3608. If an error occurs during subclass selection 3609, any error messages returned by the subclass selection process are added to the return Vector 3605 and processing terminates.

If subclass selection did not indicate an error 3609, the process checks whether X is still abstract 3610, and if X is no longer abstract (i.e., X is now virtual), the process makes X the first element of the return Vector 3607 and returns.

If X is still abstract 3610, the process checks whether X is primitive 3611, and if so, the process places a translation error message in the return Vector 3607 and processing terminates. The reason for this is that subclass selection process for a primitive IT structure has searched all possible subclasses of X (including any existing virtual IT structures) and has not found one that would represent a satisfactory translation result for X—i.e., no possible virtual IT structure exists that would satisfy functional, operational, and other requirements and/or constraints imposed on X.

If X is complex 3611, the process iterates through abstract elements of X's composition 3612. Because X is still abstract, by definition of abstract IT entities, X's composition includes at least one abstract element. Each iteration through X's composition finds the next abstract element E of X's composition 3613 and recursively invokes the translation process for E 3614. If an error occurs during translation of E 3615, any error messages returned by the recursive invocation of the translation process are added to the return Vector 3605 and processing terminates.

Figure 14:
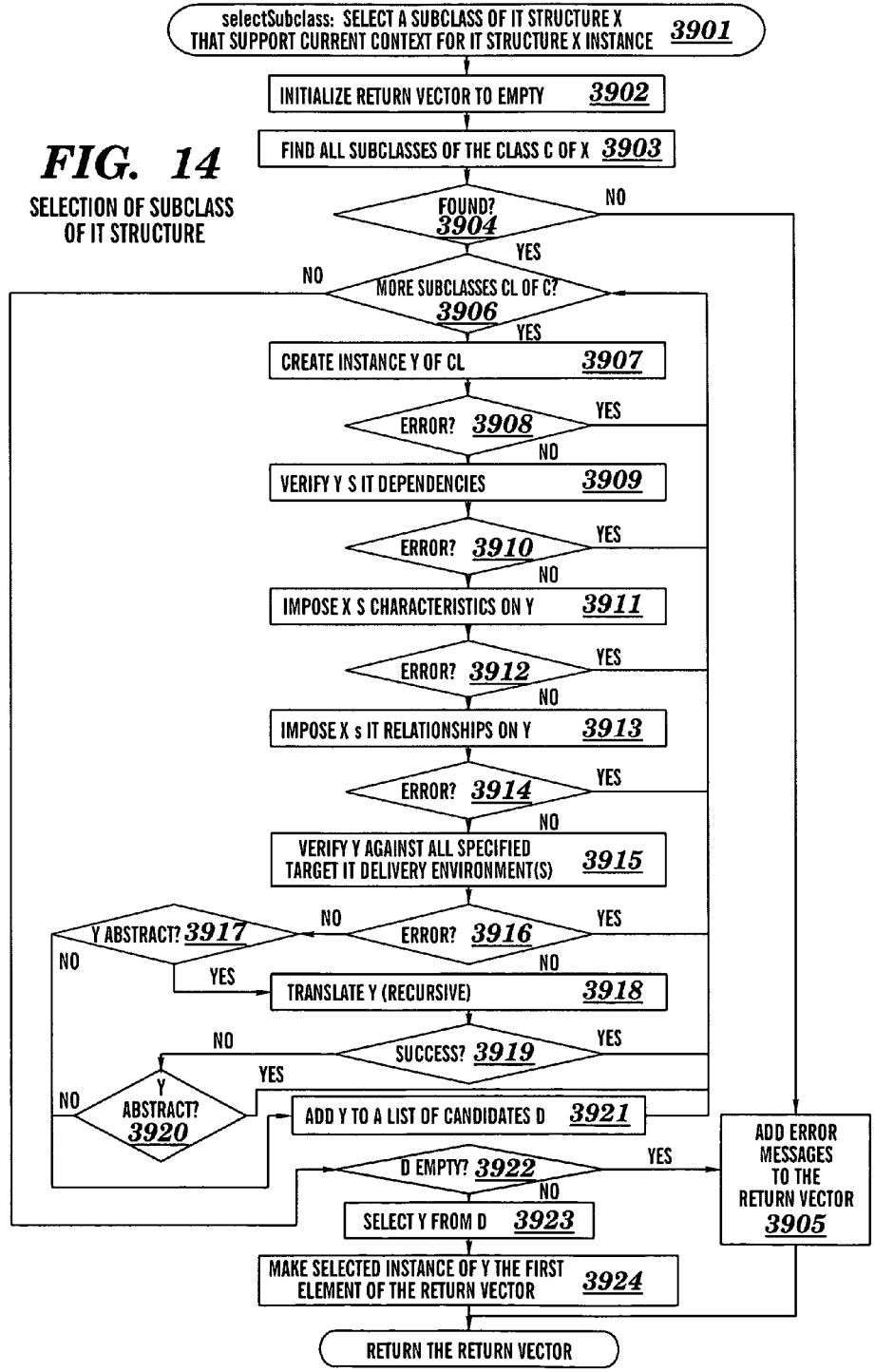
FIG. 14 is a flow chart depicting the process of selection a subclass of an IT structure, in accordance with embodiments of the present invention.

If translation process is successful and returns a new instance of E 3615, the new instance of E (denoted as $E_{NEW}$) is substituted for the current instance of E in the composition of X 3616. The process of substitution (not shown, but an analogous process is shown in FIG. 14) involves ensuring that any IT dependencies in X involving E are still satisfied, any IT relationships in X involving E are still valid and established, any characteristics of X (functional, operational, or other) are still supported, and X is still valid for any IT delivery environment for which it is targeted.

X (with $E_{NEW}$ substituted therein) is then re-instantiated 3618 to form an interim IT structure instance. If an error occurs during re-instantiation of X 3619 (e.g., if the interim IT structure instance is not virtual), error messages are added to the return Vector 3605 and processing terminates.

X (now re-instantiated) is then made the first element of the return Vector 3620. If X is no longer abstract 3621 (i.e., it is virtual), the return Vector (including X as its first element) is returned and processing terminates. If X is still abstract 3621, processing iterates to finding the next abstract composition element of X 3612.

Figure 12:
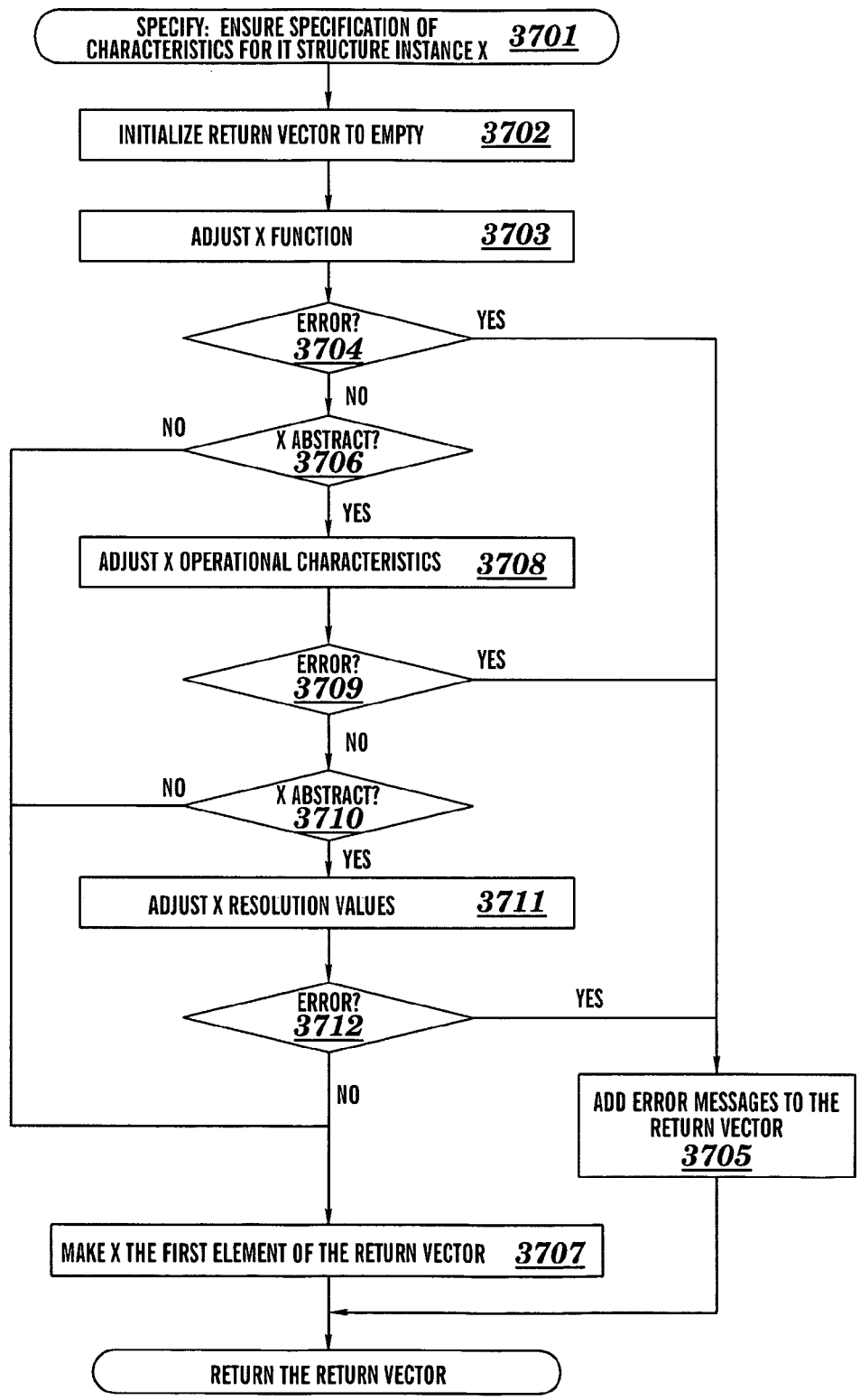
FIG. 12 is a flow chart depicting the process of ensuring specification of characteristics of an abstract IT structure instance, in accordance with embodiments of the present invention.

FIG. 12 is a flow chart depicting the process of ensuring specification of characteristics of abstract IT structure instance X 3701, in accordance with embodiments of the present invention. The process starts by initializing the return Vector 3707 to an empty Vector 3702. The process then invokes the adjustment process for the X's function(s) 3703. The adjustment process for a particular characteristic of an IT structure may be a NOOP if that characteristic is fully specified, or, otherwise, will ensure full specification of that characteristic. If an error occurs during the adjustment of X's function(s) 3704, any returned error messages are added to the return Vector 3705 and processing terminates.

The process then checks whether X is still abstract 3706. It is conceivable that as a result of invocation of setFunctions( ) method of X, X became virtual. If this is the case, X is made the first element of the return Vector 3707 and processing terminates.

If X is still abstract 3706, the process invokes the adjustment process for the X's operational characteristics 3708. If an error occurs during the adjustment of X's operational characteristics 3709, any returned error messages are added to the return Vector 3705 and processing terminates.

The process then once again checks whether X is still abstract 3710. It is conceivable that as a result of invocation of setOperationalCharacteristics( ) method of X, X became virtual. If this is the case, X is made the first element of the return Vector 3707 and processing terminates.

If X is still abstract 3710, the process invokes the adjustment process for the X's resolution values 3711. If an error occurs during the adjustment of X's resolution values 3712, any returned error messages are added to the return Vector 3705 and processing terminates, otherwise, the process makes X the first element of the return Vector 3707 prior to completion.

Figure 13:
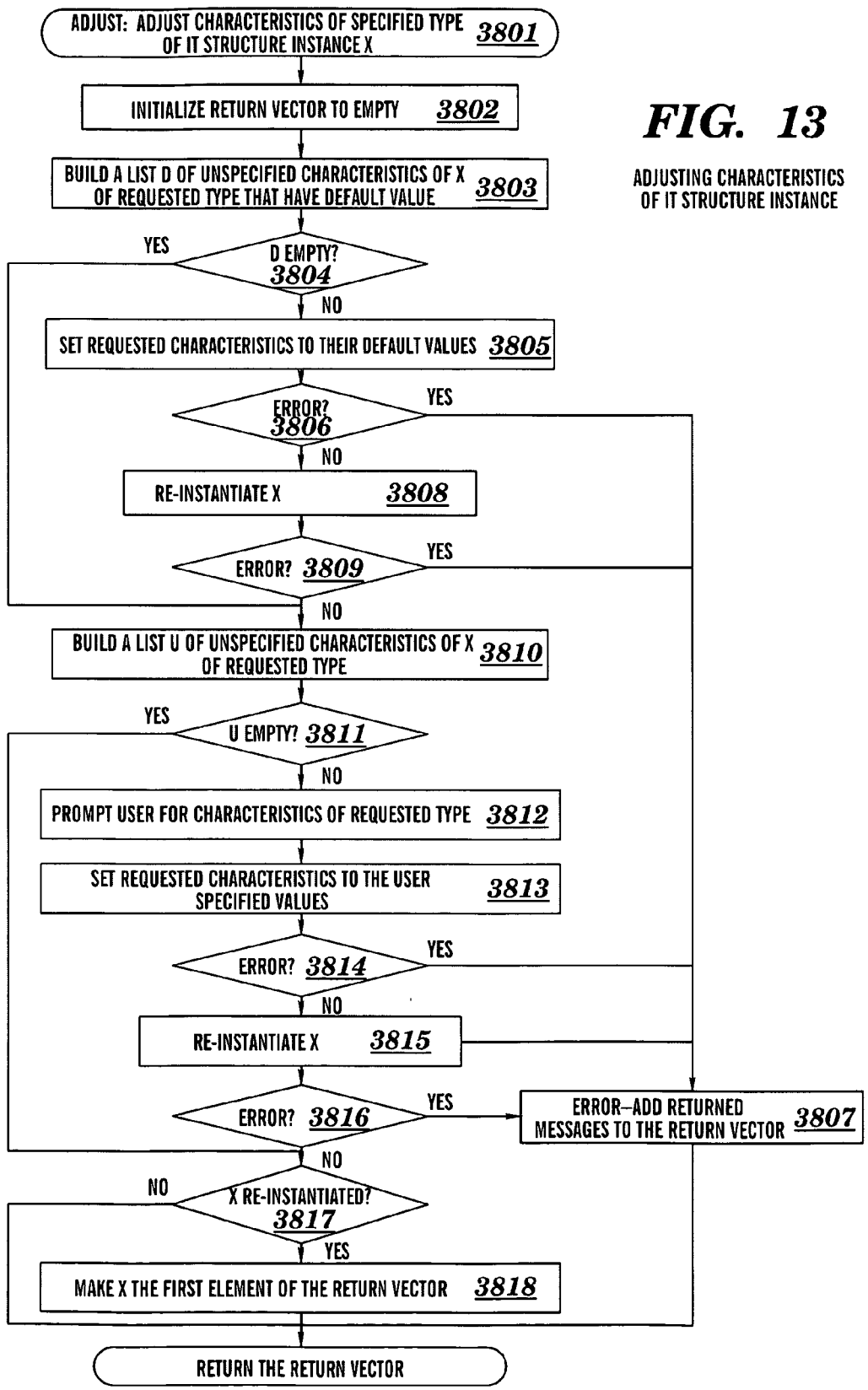
FIG. 13 is a flow chart depicting the process of adjusting a particular set of characteristics of an IT structure instance, in accordance with embodiments of the present invention.

FIG. 13 is a flow chart depicting the process of adjusting a particular set of characteristics of IT structure instance X 3801, in accordance with embodiments of the present invention. The process starts by initializing the return Vector to an empty Vector 3802. The process then builds a list D of unspecified characteristics of the requested type that have default values 3803. If D is not empty 3804 (i.e., at least one unspecified characteristic of the requested type has a default value), the unspecified characteristics are set to their default value 3805 using the appropriate method (i.e., setFunctions ( ) for functional characteristics, setOperationalCharacteristics( ) for operational characteristics, and resolve( ) for resolution values). If an error occurs during the appropriate method invocations 3806 (i.e., if the requested characteristics could not be set to their corresponding default values), any error messages are added to the return Vector 3807 and processing terminates.

If default setting for the unspecified characteristics of the requested type was successful 3806, X is re-instantiated 3808. If an error occurs during the attempt to re-instantiate X 3809 (i.e., there is an internal logic error in X-X has accepted the default settings for the unspecified characteristics of the requested type, but now cannot be instantiated using these settings), any error messages are added to the return Vector 3807 and processing terminates.

The process then builds a list U of unspecified characteristics of the requested type 3810 (i.e., those that remain unspecified after any defaults were set). If U is not empty 3811 (i.e., at least one characteristic of the requested type remains unspecified), the process prompts the user for specification of the unspecified characteristics of the requested type 3812 and sets the now specified characteristic values using the appropriate method 3813. If an error occurs during the appropriate method invocations 3814 (i.e., if the requested characteristics could not be set to the values specified for them by the user), any error messages are added to the return Vector 3807 and processing terminates.

A number of possibilities exist as alternatives to addressing the user, comprising:

consulting an internal policy, possibly, associated with the target IT delivery environment(s), generating a value for each unspecified characteristic of the requested type that would not violate internal logic of the class of IT structure X, ignoring the fact that a particular characteristic is unspecified, requiring the users to always provide a default value for all characteristics of IT structures.

If setting of the user-specified values for the unspecified characteristics of the requested type was successful 3814, X is re-instantiated 3815. If an error occurs during the attempt to re-instantiate X 3816 (i.e., there is an internal logic error in X-X has accepted the user settings for the unspecified characteristics of the requested type, but now cannot be instantiated using these settings), any error messages are added to the return Vector 3807 and processing terminates.

The process then checks whether X was re-instantiated during preceding steps 3817, and if so, makes the new instance of X the first element of the return Vector 3818, otherwise (no error has occurred, but X was not re-instantiated—this is a NOOP processing case), an empty (as originally created) return Vector is returned upon completion of the process.

FIG. 14 shows the process of selection a subclass of IT structure X, in accordance with embodiments of the present invention. The instances of IT structure X would support characteristics of the instance (abstract) of IT structure X, relationships imposed on the instance of IT structure X, dependencies of IT structure X, and be valid for the IT delivery environments to which the instance of IT structure X is targeted 3901. The process starts by initializing the return Vector to an empty Vector 3902. The process then finds all subclasses of the class C of X 3903 (i.e., those classes in the class library that inherit from C directly or indirectly (by inheriting from a class that inherits from C directly or indirectly)). If no subclasses of C are found 3904, an error is indicated 3905 and processing terminates. The reason for indicating an error is that X is abstract, and therefore must have a way to be translated to a virtual IT structure instance. The translation process ensures that X is fully specified, and therefore, no other means of reducing abstraction than finding a less abstract class for X remain—and that just proved to be impossible.

If at least one subclass of C was found 3904, the process iterates through the list of subclasses CL of C 3906. An instance Y of subclass CL is created 3907. If an error occurs when creating an instance of CL 3908, CL is ignored (although an error message may be stored in the return Vector, as inability to create an instance of CL indicates an error in CL definition) and the next value of CL is taken.

If instance Y of class CL was created successfully 3908, Y's IT dependencies are verified 3909. If an error is detected by verification of Y's IT dependencies 3910, CL is discarded and the next value of CL is taken.

The process then attempts to impose all characteristics of IT structure instance X on Y 3911. If any characteristics of X could not be imposed on Y and an error occurred 3912, CL is discarded and the next value of CL is taken.

If transfer of characteristics from X to Y was successful 3912, any IT relationships of X are imposed on Y 3913. If Y cannot support all of X's IT relationships 3914, CL is discarded and the next value of CL is taken.

If transfer of IT relationships from X to Y was successful 3914, Y is now verified against all IT delivery environments to which X is targeted 3915. If an error is indicated 3916, CL is discarded and the next value of CL is taken.

Now that Y supports the context of X, a check is performed to determine whether Y is abstract 3917. It is conceivable that Y was virtual from the beginning, or that one or a combination of the actions performed for the transfer of X's context to Y caused Y to become virtual. The reason this check was not performed before this point is that until it is known that Y can support the context of X, Y's type is irrelevant.

If Y is virtual 3917, it is added to the list of translation candidates D 3921, and the next value of CL is taken.

If Y is abstract 3917, a translation of Y is attempted 3918 (recursive invocation of the translation process). If an error occurs during translation of Y or if no error occurs but Y is not translated anyway (NOOP) 3919, CL is discarded and the next value of CL is taken.

If Y was successfully translated 3919, but the result of the translation is still an abstract IT structure 3920, CL is discarded and the next value of CL is taken.

Discarding a subclass of C that does not translate into a virtual IT structure is not a necessity but a design choice. It would be equally valid to include the abstract IT structure Y in the list of candidates D in hopes of subsequent user intervention and manual modification of class source of the class CL of Y such that translation of Y to a virtual IT structure becomes possible. The design choice may be made for conciseness and minimization of complicated actions by the user.

If Y is now virtual 3920, Y is added to the list of translation candidates D 3921 before the next CL value is taken, Upon completion of iteration through the subclasses CL of C, if the list of translation candidates D is empty 3922 (i.e., no translation candidates were found), an error is indicated 3905 and processing terminates.

If the list of translation candidates D contains at least one translation candidate 3922, the process of translation candidate selection is performed 3923, resulting in selection of a single translation result Y from the list of translation candidates D, which is made the first element of the return Vector 3924 prior to completion of the process.

FIG. 15 is a flow chart depicting the process of selecting the best translation candidate Y from a list of translation candidates D (all virtual) 30001, in accordance with embodiments of the present invention. The process starts by optimizing each element of D (using its optimizes method), and, if optimization is successful, replacing the element of D with the result of its optimization 30006. If the list of candidates D has a single element 30002, no further action is performed and the one element of D is returned.

If the list of translation candidates D has more than one element to choose from 30002, the prioritized list of optimization classes (getOptimizationFunctions( ) method) is retrieved 30003. The process then iterates through the list G of optimization classes 30004, always taking the next (i.e., the highest priority) optimization class F from the list 30005. The process then assesses each element of D using the assessment function A associated with the optimization class F 30007 and only keeps in D the elements for which A produces the best result 30008, discarding all others.

If more than one element remains in D 30009 (i.e., optimization resulted in equally good result for multiple elements of D), the process iterates to the next assessment function.

If after the application of a sequence of assessment functions, D only has a single element 30009, that element is returned as the one selected for translation from the list of candidates D.

If all assessment functions are exhausted before D is reduced to a single element 30004, the list of elements in D is presented to the user and the user's choice acts as the tie-breaker 30010—the user can select a single element from the list and the others will be discarded prior to the process completion.

Prompting the user for a tie-breaker decision is a design choice. Other designs are possible, including those in which other means of breaking the tie are employed (e.g., random choice), and those in which multiple elements of D are returned and, as a result, the user is presented with multiple equally valid translations. The reason for the choice of human intervention as the tie-breaker is the extremely low probability of having multiple applications of assessment functions to multiple different optimized IT structure instances produce identical results.

2.11 Binding

An IT structure instance X can be added to another IT structure Y by inclusion of X into the composition of Y by means of the addElement( ) method of Y. The process of addition of IT structure instance X to Y is called binding.

2.11.1 Delivery Binding

A virtual IT structure targeted to a particular IT delivery environment may be delivery-bound (i.e., translated into a delivery-bound virtual IT structure) by means of invoking the addElement( ) method of the target ITDeliveryEnvironment class instance.

2.12 Initiating Deployment of a Delivery-Bound IT Structure

Deployment of a delivery-bound IT structure is initiated by invoking the method deploys of the particular ITDeliveryEnvironment class instance.

2.13 Fall-Back Policy

In several places above it has been noted that it is not always possible to transition from an abstract IT structure to, eventually, a real IT structure. A trivial cause of this may be unavailability of the appropriate materials in a provisioning system. More complex cases are possibly, in which, although materials are available, the right combination of them cannot be derived, or, worse, a wrong choice was made in a decision tree of one of the steps of translation to make delivery binding impossible. In many of these cases, returning to a previous step in the IT development process may resolve the problem. Therefore, a fall-back policy is implemented throughout the IT development process, such that, should a condition be reached preventing the production of a real IT structure as a result of a step of the IT development process, a return to the appropriate previous step of the IT development process is performed and a different decision is made, resulting hopefully in a positive outcome of the IT development process.

2.14 IT Agents

An IT agent is a program, installed on or embedded within OS of a computer, or embedded within microcode or hardware of a device, which gathers information about hardware configuration of a computer or a device, software installed on a computer, and network connectivity of a computer or a device, and transmits this information to a requester.

IT agents may transmit gathered information to a requester unsolicited or in response to a request. IT agents possess proper OS authorization and proper network connectivity to be able to transmit gathered information.

IT agents are a particular case of software agents in general, and therefore their implementation is OS- and possibly hardware-dependent.

External discovery functions other than agents may be used to obtain some or all of the required information.

Depending on the degree of sophistication of an IT agent, an IT agent may or may not be able to provide certain types of information—e.g., an IT agent may or may not contain logic permitting it to examine customization and configuration parameters of a particular program. For the purposes of this embodiment, it is assumed that an IT agent always possesses the degree of sophistication required to accomplish its task and furnish the information necessary to fulfill a particular function. If this is not the case, and some of the required information may not be provided by an IT agent, a manual completion step may be required in some of the methods described below, enabling the user to provide the missing information.

Depending on a security policy and network connectivity of a particular IT delivery environment, some IT agents may be unable to gain access to some of the information they intend to gather, or to transmit some of the gathered information. For the purposes of this embodiment, it is assumed that an IT agent always possesses the necessary authority to gather the information it needs and is capable of transmitting this information whenever such transmission is required. If this is not the case, and some of the required information may not be provided by an IT agent, a manual completion step may be required in some of the methods described below, enabling the user to provide the missing information.

IT agents are assumed to be present on all computers and smart devices comprising a real IT structure.

2.15 ReverseSpecifying an IT Structure

In order to accomplish some of the functions described below, it may be necessary to perform a process of delivery-binding "in reverse", having an operational configuration as input, and deriving from it a real and a virtual IT structure. The process relies on the information gathered by IT agents and builds a real IT structure first, including all IT entities within an IT structure being examined. Once a real IT structure is built, a corresponding virtual IT structure is produced by discarding the information imposed on an IT structure by the delivery binding process associated with a particular IT delivery environment, and replacing real primitive IT structures in an IT structure composition with their respective virtual primitive counterparts.

While the reverse-specification process will recreate composition and IT relationships of an IT structure, it will not produce IT dependencies or any methods beyond those present in the real or virtual primitive IT structures and IT relationships used to comprise the reverse-specification.

Figure 16:
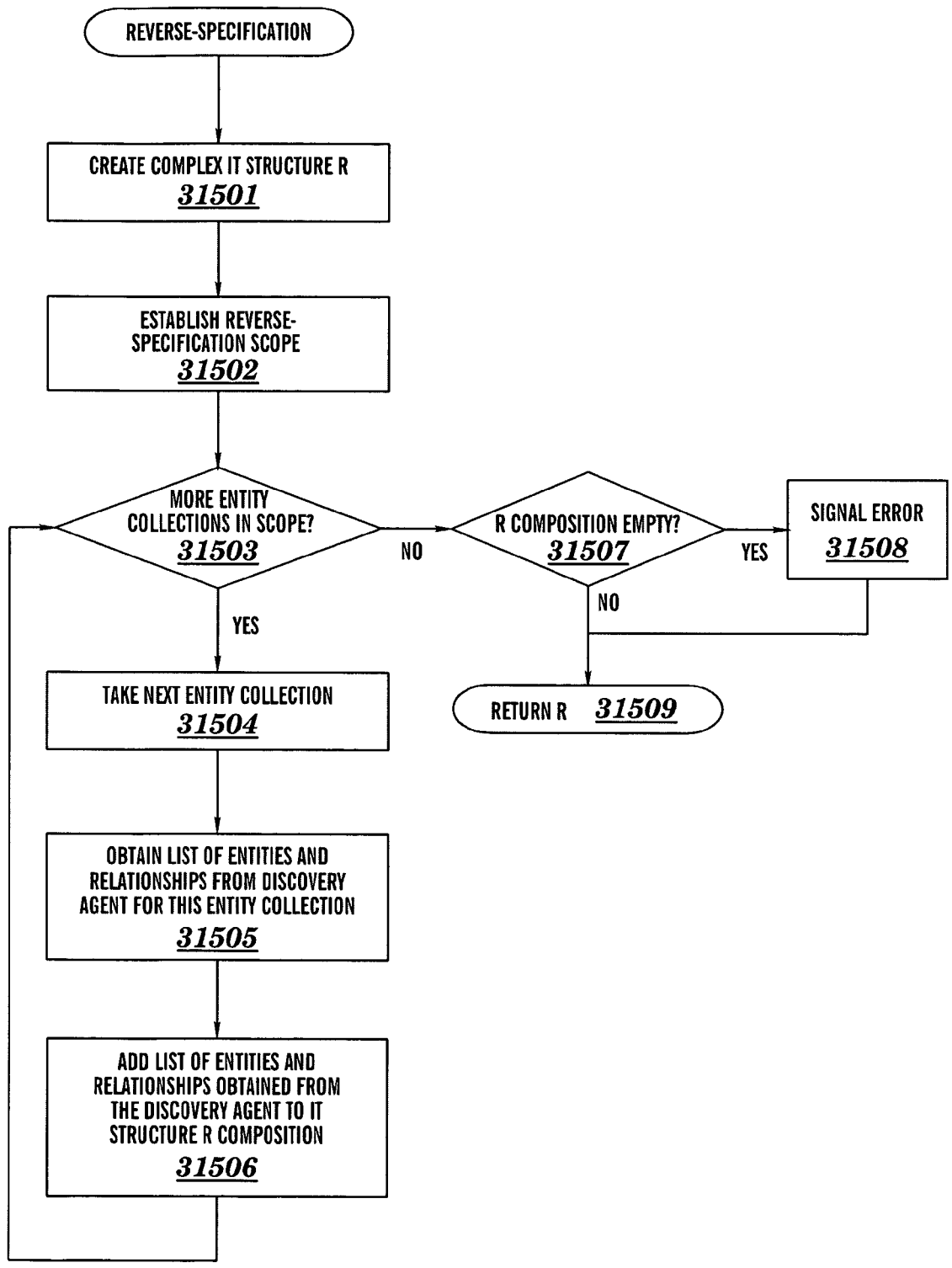
FIG. 16 is a flow chart depicting a reverse specification process, in accordance with embodiments of the present invention.

The process of reverse-specification is illustrated in FIG. 16, in accordance with embodiments of the present invention. The process starts by creating a complex IT structure R, with empty composition 31501. The process proceeds to establishing reverse-specification scope 31502. This is necessary to bound the reverse-specification process to the necessary subset of the IT delivery environment. The scope of reverse specification is a list of IT entities (most likely, computers) indicated by a user. If the scope is not provided, all IT entities supplied with agents are considered within the scope—e.g., the whole IT delivery environment. While there are unprocessed entity collections in scope (an entity collection is a group of IT entities reachable by a single discovery agent—e.g., a computer with its full software stack) 31503, consider the next unprocessed entity collection 31504. Obtain the list of entities and relationships from the associated discovery agent 31505, and add this list to the composition of IT structure R 31506. When all the entity collections are processed 31503, if composition of R is empty 31507, en error is indicated 31508. The resulting IT structure R is returned to the invoker 31509. The resulting IT structure R may result from either reverse specifying an IT delivery environment or from reverse specifying an IT system instance.

2.16 Comparing IT Structures

In some cases, it may be advantageous to compare two IT structures. IT structure classes can be compared by comparing their source code using conventional means of program comparison (e.g., delta-compare utility). The process of comparing two IT structure instances is described infra.

The process of comparing IT structures assumes one of the two cases, based on the usage of results of a comparison (these are the practical cases when a comparison would be useful—the method of comparison is not restricted to these situations):

1) The IT structure instances being compared are an original and its reverse-specification—for deployment verification and detection of unauthorized modifications.

2) The IT structure instances being compared are instances of the same IT structure subclass—for testing of IT structure methods by the user.

Figure 17:
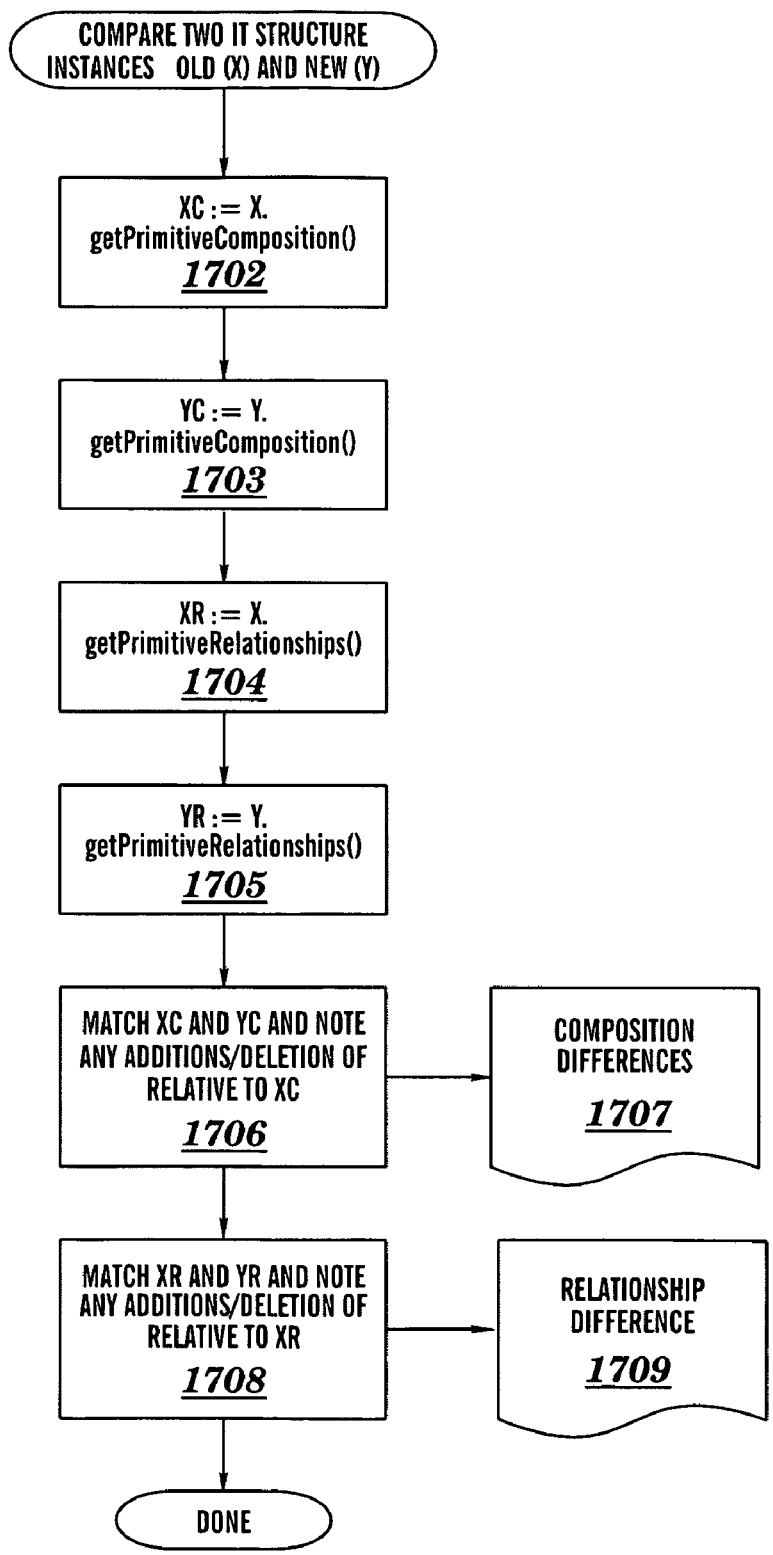
FIG. 17 is a flow chart depicting a process for comparing two IT structure instances, in accordance with embodiments of the present invention.

FIG. 17 describes the process of comparing two IT structure instances. The process obtains as input two IT structure instances, termed "old" (X) and "new" (Y) A1. The process obtains primitive compositions (getPrimitiveComposition( )) of the old 1702 and the new 1703 IT structure instances. The process then obtains primitive relationships list (getPrimitiveRelationships( )) of the old 1704 and the new IT 1705 structures.

The process then matches elements of the old and the new IT structure instances primitive compositions and determines any additions or deletions in (assumed) derivation of the new IT structure from the old 1706, and reports any additions or deletions in the new IT structure relative to the old one 1707.

The process then performs a similar matching for IT relationships of the old and the new IT structure instances 1708 and reports any differences 1709.

The process then produces a report (textual and/or graphical), showing any differences, and marking them as additions or deletions.

3.0 Development of IT Systems

The development of IT systems is described in terms of pertinent processes (Section 3.1) and pertinent tools (Section 3.2).

3.1 Processes Pertaining to Development of IT Systems 3.1.1 Definitions

A direct business function is a technical function performed in direct support of a business process; e.g., procurement, billing, group communications, broadcasting of business information to users, etc.

An indirect business function is a technical function performed in support of direct business function(s); e.g., network protection (firewall), backup/restore, disaster recovery, dump, networking, operating system, software messaging, etc.

Business requirements are a set of weakly structured natural language statements defining direct business function(s).

An example of a business requirement is: "We need a procurement function supporting all our suppliers."

Functional requirements are a set of weakly structured natural language statements, derived from business requirements, and defining a set of direct or indirect business functions. An example of a functional requirement is: "We need a procurement portal, membership model, and a security function running in our data center, and supporting 573 suppliers in 15 countries in 2 geographies." Thus functional requirements are instances of business requirements at lower levels of abstraction than are the business requirements from which the functional requirements are derived.

Operational requirements are requirements for operating a real IT structure in an IT delivery environment.

A functional specification process is a process of translation of business requirements into functional requirements.

An initial design process is a process of translation of functional requirements into an abstract IT structure.

A delivery-binding process is a process of translation of a virtual IT structure into a delivery-bound IT structure.

A provisioning process is a process of assigning a physical entity to correspond to the virtual primitive IT structure.

A deployment process is a process of creation of a physical instance of a delivery-bound IT structure within a particular IT delivery environment, resulting in a real IT structure and an operating instance of this real IT structure.

An IT Development process is a process of transition from business requirements to a real IT structure embodying the original business requirements.

3.1.2 IT Development Process

Figure 21:
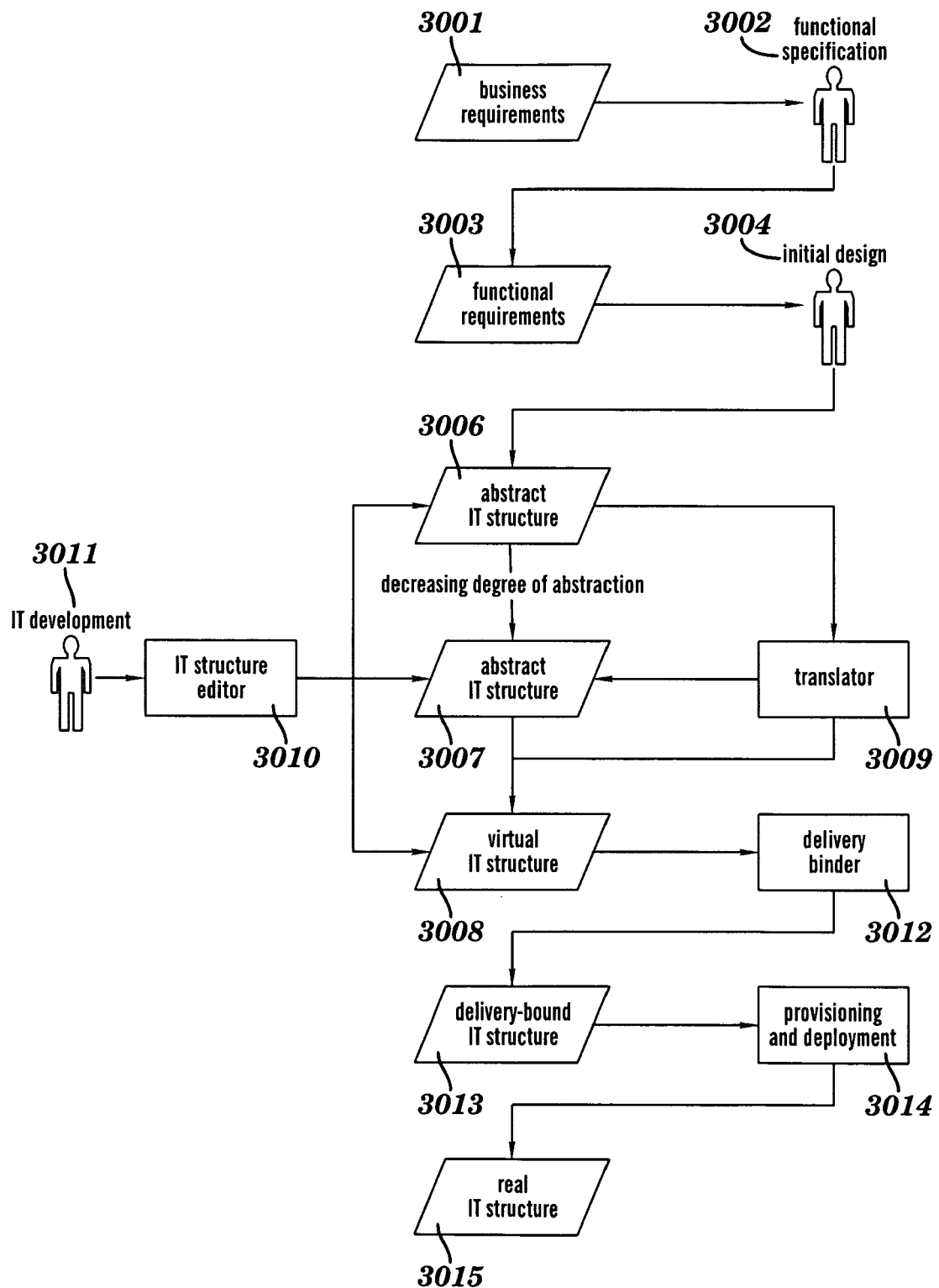
FIG. 21 is a flow chart depicting the IT development process as triggered by business and functional requirements and as implemented through design, in accordance with embodiments of the present invention.

FIG. 21 is a chart depicting the IT development process as triggered by business and functional requirements and as implemented through design, in accordance with embodiments of the present invention. The chart in FIG. 21 is the same as the chart in FIG. 9 with an addition of a business requirements specification step 3001, a functional requirements specification step 3002, functional requirements step 3003, an initial design step 3004, and an IT development design step 3011 using the IT structure editor 3010, as shown.

In FIG. 21, business requirements are formulated in step 3002, and a functional specification process is performed in step 3002 based on the formulated business requirements, resulting in functional requirements 3003. In addition to functional requirements, step 3002 may also generate operational requirements such that reference numeral 3003 would represent both the functional requirements and the operational requirements. The functional requirements (and accompanying operational requirements if present) 3003 are used to perform an initial design process in step 3004 to generate an abstract IT structure 3006 corresponding to the functional requirements (and accompanying operational requirements if present) 3003.

The initial design process 3004 to generate an abstract IT structure 3006 may be performed by the alternative methods of: utilizing IT development 3011 (described infra); performing translation in step 3009 to translate the abstract IT structure 3006 whose composition is initially empty into the virtual IT structure 3008 through use of the functional requirements (and accompanying operational requirements if present) 3003; performing translation in step 3009 in combination with IT development 3011; or specifying the functional requirements (and accompanying operational requirements if present) 3003 such as from previous experience with similar or analogous functional requirements (and accompanying operational requirements if present). The composition of the abstract IT structure 3006 be by initially very simple and may subsequently be enhanced through incorporation of additional IT entities via performing translation in step 3009 or by performing translation in step 3009 in combination with IT development 3011. In one embodiment, the initial abstract IT structure 3006 comprises functional requirements (and accompanying operational requirements if present) but its composition is initially empty, such as when no appropriate initial IT structure is found in the relevant libraries of FIG. 23. When no appropriate initial IT structure is found in the libraries, IT structure development may be performed, including manual creation of composition, relationships among elements of composition, dependencies, and interfaces.

In the following example, a business function is accounting, an associated business requirement 3001 is a need to perform the accounting function, and the associated functional requirements, and associated functional requirements 3003 are a need to implement a general ledger, accounts payable, and accounts receivable. Accompanying operational requirements, if present, may comprise a capability for accommodating up to 25 users simultaneously, a response time of less than one second when striking a key on the keyboard; minimum data security/protection requirements, etc. The composition of the resultant abstract IT structure 3006, derived from the preceding functional requirements (and accompanying operational requirements if present) 3003, may initially comprise software application specifications to implement a general ledger, accounts payable, and accounts receivable. The composition of the resultant abstract IT structure 3006 may be subsequently enhanced (e.g., during translation 3009) through an unfolding of layers of specifications such as the software application specifications pointing to middleware and a database, the middleware specifications pointing to an application server having web server functionality, specifications for operating system services, etc. When faced with various alternatives for the abstract IT structure, a choice from the alternatives may be made in consideration of the functional requirements (and accompanying operational requirements if present) 3003.

Design is performed in step 3011, using the IT entity editor 3010 (see Sec. 3.2.4 described infra), as an iterative process, resulting in gradual refinements of the abstract IT structure instance 3007, using the translator 3009 (see Sec. 2.10; FIG. 10) and decreasing the IT structure degree of abstraction, until a virtual IT structure 3008 is produced. The virtual IT structure serves as input to the delivery binder 3012 (see Sec. 2.11; Sec. 2.2.2.5, addElement( ) method; FIG. 3), which translates the virtual IT structure into a delivery-bound IT structure 3013, elements of which are then provisioned and deployed in step 3014 (see Sec. 2.12; deploys method), resulting in a real IT structure 3015 operating in the appropriate IT delivery environment. Although FIG. 21 shows functional requirements 3003 as producing the abstract IT structure 3006, the functional requirements 3003 could also be used to produce the virtual IT structure 3008 and/or the real IT structure 3015.

Depending on the complexity of the business and functional requirements, and depending on whether a new system is being built or an existing one is being modified, and depending on policies and practices of a particular establishment performing IT development, the business and/or functional specification activities may or may not take place—in some cases, the process may start by an IT designer using the IT structure editor to create new or modify existing IT structure(s).

3.1.2 Rule Sets

Another way to look at the IT structure refinement portion of the IT development process is as a sequence of applications of rules to an IT structure to generate or change the IT structure. Rules, which are created in the IT development step 3011 of FIG. 1, may be imposed by:

1) user (i.e., IT developer), said rules comprising the definition of an IT structure being developed, its composition, methods, and relationships among elements of its composition, as well as user-defined or user-selected optimization functions;

2) IT structures other than the one being developed (i.e., contained within IT structures used for development of this IT structure), said rules comprising IT dependencies;

3) IT delivery environment, said rules comprising policies, practices, and standards of a particular data center.

For the purposes of this definition, rules imposed by a user are represented as classes and methods within the IT structure being developed, rules imposed by other IT structures are represented as classes and methods within other IT structures, and rules imposed by a delivery environment are represented as classes and methods within the applicable (i.e., corresponding to the target IT delivery environment) ITDeliveryEnvironment class. Note that: (1) other sets of rules than the three listed above may exist, or the three sets listed above may be consolidated into fewer sets, (2) rules may be expressed in forms different from classes and methods, (3) rules may be expressed in a form (syntax) of rules required by a particular rules engine, (4) rules may be expressed as one or more policies, (5) rules may be packaged together or separate from (external to) IT structures, and (6) rules may be enacted by various means, including programming logic or a rules engine.

Consider a virtual IT structure that is created by translation from an abstract IT structure and subsequently translated into a real IT structure adapted to operate in an IT delivery environment (via delivery binding of the virtual IT structure and deployment of the delivery-bound IT structure in the IT delivery environment). Specification of rules for generating the virtual IT structure, via translation from the abstract IT structure, may include rules defining how the IT structure constructor during translation of the abstract IT structure would react: to an operational characteristic descriptive of operation of the real IT structure in the IT delivery environment; to one or more functional characteristics supported by virtual IT structure; or to resolution parameters representing any other (than functional or operational) information that may be specified to an IT structure. A functional characteristic of an IT structure is associated with a functional requirement (explained supra) and represents functionality needed to satisfy said functional requirement.

For example with respect to the effect of an operational characteristic descriptive of operation of the associated real IT structure in the IT delivery environment, the virtual IT structure X may include processor P running application A for every N concurrent users. A developer may enhance the constructor of the IT structure X with a rule (e.g., programming logic) that creates the appropriate number of processors P based on the operational characteristic of the maximum number of concurrent users $N_{MAX}$ that would concurrently use the associated real IT structure during operation of the associated IT structure in IT delivery environment. Application of the rule for the preceding example would result in the appropriate software stacks (operating systems, middleware, application A) for every processor P thus generated, and then connection of all the instances of processor P to a network segment, also generated in the IT structure composition as a result of applying this rule. Further, a load balancer may be generated for the cases when more than a single instance of processor P is present, and connected to the same network segment for routing requests to multiple instances of application A. For this example, the characteristic descriptive is the numerical value of $N_{MAX}$ which describes operation of the associated real IT structure in the IT delivery environment in terms of the maximum number of concurrent users $N_{MAX}$, and the rule to be applied during translation is the number of processors in the virtual IT structures is sufficient to satisfy $N_{MAX}$ for a given value of N. Thus if N=5 and $N_{MAX}$=4, then application of the preceding rule during translation would result in the virtual IT structure X comprising one instance of processor P for running application A. In contrast if N=5 and $N_{MAX}$=11, then application of the preceding rule during translation would result in the virtual IT structure X comprising three instances of processor P (for running application A) connected to a network segment and connected to a load balancer, and the composition of the virtual IT structure X will include the appropriate relationships among the network, the processors P, and the load balancer. Thus, the rule examines $N_{MAX}$ in relation to N and controls the composition of the virtual IT structure X based on the value of $N_{MAX}$.

Similarly, a rule set changing the IT structure composition may exist based on a variety of other operational characteristics (e.g., performance measure, reliability measure, security level, response time upper limit, etc.). Accordingly, translating the abstract IT structure into the virtual IT structure may comprise satisfying a rule that specifies at least one operational characteristic descriptive of operation of the real IT structure in the IT delivery environment, such that the virtual IT structure resulting from said translating differs from the virtual IT structure that would have resulted from said translating if said satisfying said rule had not been performed. In one embodiment, said at least one operational characteristic consists of a plurality of operational characteristics (e.g., the maximum number of concurrent users permitted to use a real IT structure during operation in an IT delivery environment, performance measure, reliability measure, security level, response time upper limit, etc., as described supra).

A rule set creating or changing the IT structure composition and topology may be utilized, wherein said rule set is based on one or more functional characteristics supported by said IT structure. Thus, for a virtual IT structure X, rules may exist that vary the composition of an instance of the virtual IT structure X created from an abstract IT structure during a translation, based on one or more functions (i.e., functional characteristics) to be supported by the virtual IT structure X. In one embodiment, a list may be used to communicate the set of functional characteristics of the entity to the virtual IT structure X constructor during the translation process. For example, the abstract IT structure X may comprise, among other things, an entity that is a software application A with two functional modules, F1 and F2, performing two different functions provided by the application A, and running on dedicated processors P1 and P2, respectively. Depending on the rule denoting which functional characteristics are to be supported by the application A, the composition of the virtual IT structure may include P1, P2, or both of P1 and P2 connected by a network segment. Thus, the rule may select one or more functional characteristics from a given set of multiple functional characteristics of the associated abstract IT structure and constrain the virtual IT structure composition (resulting from translation of the associated abstract IT structure) to accommodate the selected one or more functional characteristics.

Accordingly, translating the abstract IT structure into the virtual IT structure may comprise satisfying a rule that specifies a functional characteristic of the virtual IT structure, such that the virtual IT structure resulting from said translating differs from the virtual IT structure that would have resulted from said translating if said satisfying said rule had not been performed. In one embodiment, the abstract IT structure comprises a plurality of alternative functional characteristics, wherein the functional characteristic of the virtual IT structure specified by said rule is one functional characteristic of the plurality of alternative functional characteristics comprised by the abstract IT structure.

3.1.3 Analogy

Figure 22:
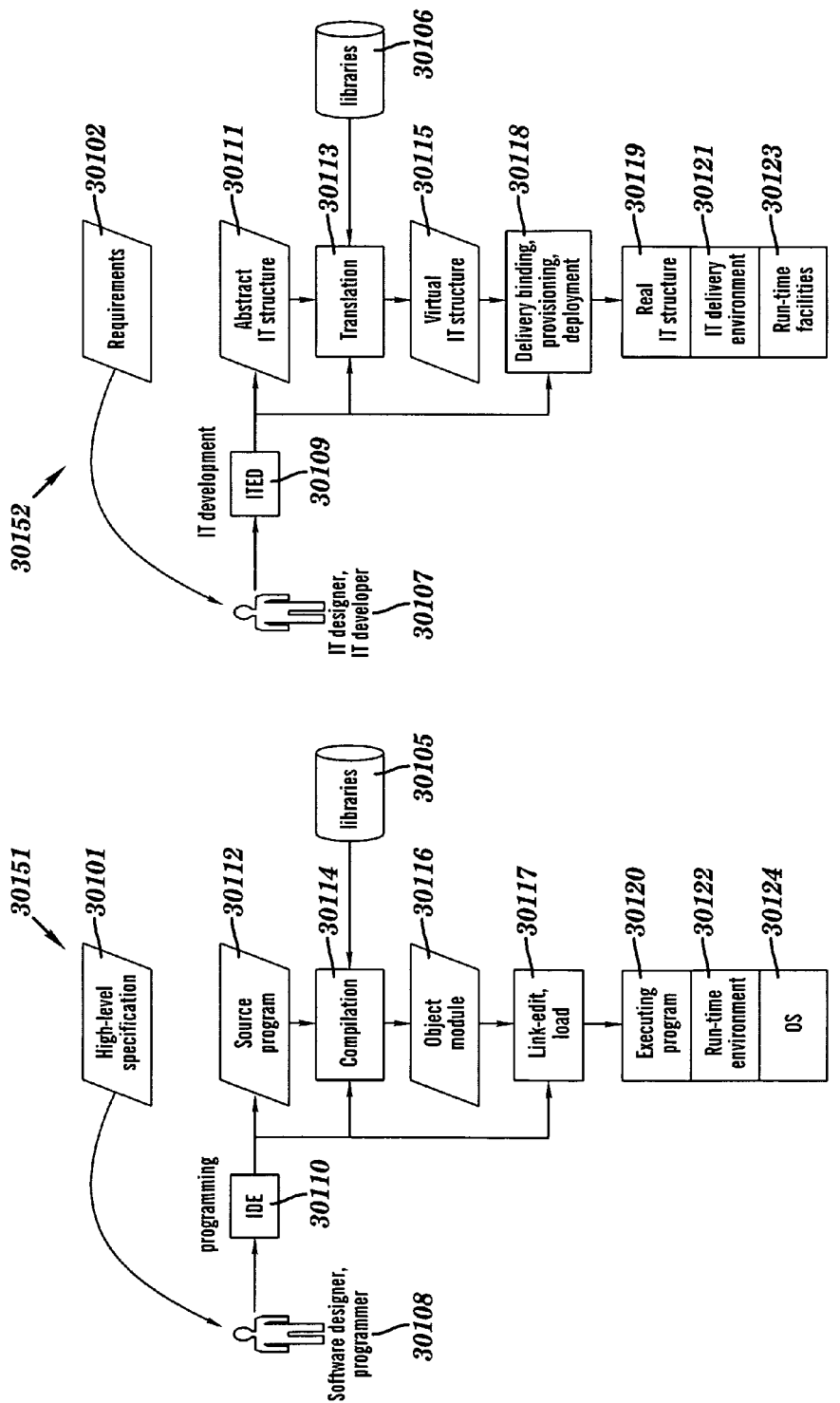
FIG. 22 depicts charts illustrating an analogy between IT development and software development, in accordance with embodiments of the present invention.

FIG. 22 depicts charts illustrating an analogy between IT development 30152 and software development 30151, in accordance with embodiments of the present invention. The analogy illustrated in FIG. 22 serves as an aide in explaining the IT development approach.

When developing software, a software developer 30108 may use integrated development environment (IDE 30110) to accomplish development process tasks, starting with a high-level specification 30101. The high-level specification is, such as by means of a program generator or a CASE tool, translated into a source program 30112 in a high-level programming language. The source program 30112 may use libraries 30105 of macros (or COPYBOOKs, include files, etc., depending on a language). The source program 30112 is compiled in step 30114, resulting in an object module 30116. In some languages, the source program is translated from a high-level language into a low-level language, such as an assembly language, and then assembled into an object module. The object module is link-edited in step 30117 and loaded into the computer memory, resulting in an executable program 30120. The executable program executes on a computer, within a run-time environment 30122, such as a particular language run-time environment, or a subsystem (e.g. CICS, under a control of an operating system (OS) 30124, and possibly, using OS services).

When developing IT systems, an IT software developer 30107 may use the IT entity editor ITED 30109 to accomplish development process tasks, starting with business requirements 30102 (i.e., business requirements 3001 of FIG. 21), which are translated into an abstract IT structure 30111 as explained supra in conjunction with FIG. 21. The IT entity editor ITED 30109 has the ability to manipulate the composition parameters and rules of an IT structure being manipulated. The IT entity editor ITED 30109 of FIG. 22 is equivalent to the IT structure editor 3010 of FIG. 21 and may facilitate implementation of functional specification 3002 (to translate the business requirements 3001 into the functional requirements 3003) and/or initial design 3004 (to translate the functional requirements 3003 into the abstract IT structure 3006) in FIG. 21. In FIG. 22, the translation of the requirements 30102 into the abstract IT structure 30111 (via ITED 30109) may use libraries 30106 of IT structures. The libraries 30106 may comprise the working library 3103 and/or the common library 3104 in FIG. 23, discussed infra. The abstract IT structure 30111 is translated in step 30113, resulting in an virtual IT structure 30115, which is then delivery-bound (analogous to link-edit), provisioned and deployed (analogous to program load) in step 30118, resulting in a real IT structure 30119. The real IT structure operates in an IT delivery environment 30121 and under control of run-time facilities 30123.

The following analogies exist between IT structures and Software:

1) An abstract IT structure is analogous to high-level source code (e.g., Java, C, Fortran, etc.).

2) A virtual IT structure is analogous to object code with relative addresses.

3) A real IT structure is analogous to machine language code with absolute addresses.

3.1.4 Introducing a Change in a Real IT Structure

As business needs evolve, new business requirements may be generated against existing and operating real IT structures. Alternatively, a requirement for a change may be driven by operational needs; e.g., an upgrade to a new level of software due to the current level end of life/end of support deadline. Yet another case requiring a change is due to discovery of a problem in an IT structure definition.

Regardless of the motivation for the change, introducing a change of the abstract IT structure at the highest level of abstraction is analogous to a source program change in software development. Alternatively, a change may made so as to alter a particular real IT structure, which is analogous to applying a binary patch to a program in memory.

3.1.5 Introducing a Change in an Abstract IT Structure without Impact Minimization When a change is introduced into an abstract IT structure, a new delivery-bound and real IT structure may be produced as a result, which may not attempt to minimize the changes to the real IT structure for the following reasons:

1) From the long-term business cost perspective, it is more advantageous to have an optimized new real IT structure than a sub-optimal new real IT structure, even if it is cheaper to deploy.

2) The state of the art automatic provisioning tools diminish cost of IT deployment.

3) Many solutions require high availability of operations, making it undesirable to stop operations of the old real IT structure to alter it into a new IT structure.

3.1.6 Minimization of Impact From Change of an IT Structure

Even though in many cases minimization of impact from a change of an IT structure may not be necessary, there may be cases where the short-term benefit of minimizing the change outweighs the long-term considerations. For that purpose, the process of delivery-binding may be invoked with the parameter <update>, rather than <new>, indicating that this is an update to an already deployed IT structure, and therefore change impact is to be minimized. The change minimization is accomplished by constraining the delivery binding algorithm to using the primitive IT structures comprising the primitive composition of the real IT structure being changed as a first choice for instantiating virtual primitive IT structures.

Thus, the impact of a change to an abstract IT structure, as reflected in the translation process, may be contained to satisfy a specified condition or threshold pertaining to the composition of a real IT structure derived from said abstract IT structure. For example, a translation may be performed to upgrade to a new version of a software application that runs on a processor. Although the current version of the software application runs on an existing two-year old processor, there is a new processor that is faster and less expensive than the existing processor now available for running the software application. With no extra constraints imposed on the translation process, the translation for the upgrade to the new version of the software application may result in a virtual IT structure that includes the new processor. However, the new processor may be very costly and it may thus be preferred to retain the existing processor. Therefore, a constraint may be imposed on the translation to require the resultant virtual IT structure to include the existing processor, while permitting the software application to change from the current version. The constraint may take the form of: establishing a cost threshold (e.g., don't replace the processor if the replacement cost exceeds a given threshold); establishing a depreciation threshold (e.g., don't replace the processor if the existing processor is newer than a given threshold such as three years); excluding hardware changes of any kind. Thus, the constraint may be a threshold constraint imposed on an entity comprised by the real IT structure, wherein said entity is a processor in the preceding example.

Accordingly, the translation process may be constrained to take into account the composition of the existing real IT structures. Thus generally, the translation of an abstract IT structure to a virtual IT structure may be subject to a constraint imposed on the composition of a real IT structure that operates in an IT delivery environment.

3.2 Tools Pertaining to Development of IT Systems

3.2.1 IT Development Activities

An IT developer can use the IT development toolset to perform the following processes:

1) Find IT structure class(es) based on requirements

2) Create a primitive IT structure class for an out-of-model entity

3) Create a complex IT structure class using existing primitive or complex IT structure classes as building blocks; these existing classes may be contained in a library 4) Modify an IT structure class by adding or removing its composition elements (see addElement Sec. 2.2.2.5, deleteElement Sec. 2.2.2.7)

5) Specify an IT structure's function(s), which entails creating additional rules within an IT structure definition 6) Remove a previously specified IT structure function(s), which entails changing the IT structure rules 7) Establish an IT relationship between two IT structure composition elements 8) Remove a previously established IT relationship between two IT structure composition elements 9) Specify IT dependencies of an IT structure 10) Remove previously specified IT dependencies of an IT structure 11) Specify operational characteristic rules for an IT structure 12) Specify resolution parameter rules for an IT structure 13) Specify function(s) for IT structures used in the composition of an IT structure 14) Specify operational characteristics for IT structures used in the composition of an IT structure (see Sec. 2.2.2.2)

15) Specify resolution parameters for IT structures used in the composition of an IT structure (see Sec. 2.2.2.3)

16) Translate an abstract IT structure instance, obtaining a virtual IT structure 17) Examine all aspects of an IT structure 18) Evaluate (manually) relevant operational aspects of an IT structure 19) Compare two IT structures and be apprised of differences (see Sec. 2.16 and FIG. 17)

20) Define an IT delivery environment

21) Specify a target delivery environment for an IT structure by selecting the target delivery environment from a list of defined IT delivery environments 22) Perform a delivery binding of a virtual IT structure, obtaining a delivery-bound IT structure (see Sec. 2.11; Sec. 2.2.2.5, addElement( ) method; FIG. 3)

23) Initiate deployment of a delivery-bound IT structure, obtaining a real IT structure (see Sec. 1.12, deploy( ) method))

24) Ensure correctness of deployment of a real IT structure

25) Introduce a change in a real IT structure

26) Detect unauthorized or erroneous changes in a real IT structure

With respect to the software appearing in FIG. 22, the preceding processes 1-16 may each be utilized by ITED 30109, process 17 may be utilized by translation step 30113, process 23 may be utilized by "delivery binding, provisioning, deployment" of step 30118, and processes 25-26 may be utilized by run-time facilities 30123. These processes and associated supporting mechanisms are described infra in Sections.

3.2.2 IT Development Process Support Tools

This and subsequent sections describe the IT development process support tools enabling execution of the above IT development and runtime activities.

Figure 23:
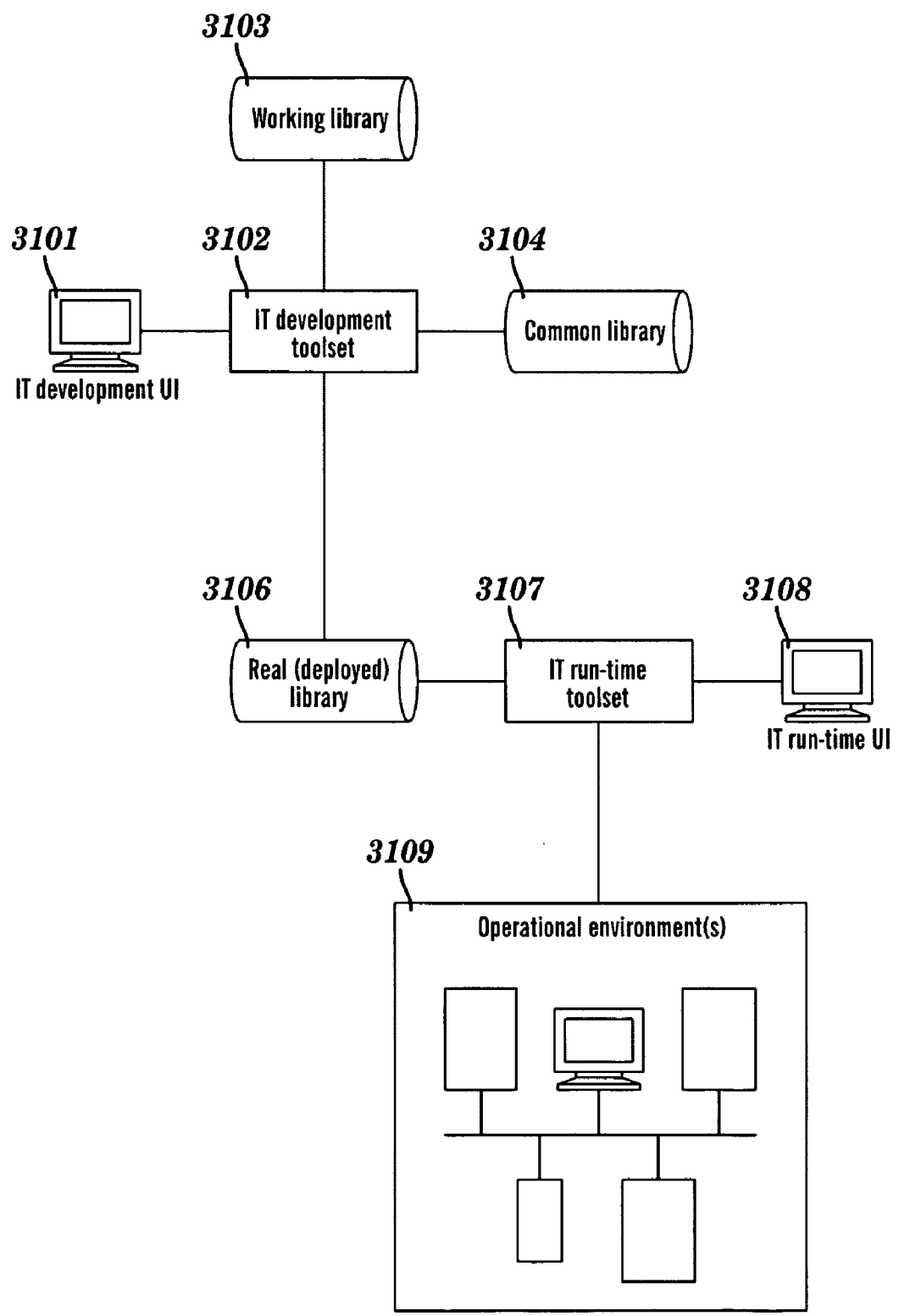
FIG. 23 is a chart providing an overview of the IT development and run-time toolsets, in accordance with embodiments of the present invention.

FIG. 23 depicts an IT development environment, in accordance with embodiments of the present invention. In FIG. 23, the IT development user interface (UI) 3101 is used by an IT developer (a.k.a., IT architect) to access the IT development toolset 3102 to work on IT entities contained in a local working library 3103, using IT entities in the common library 3104, which, in this embodiment, is shared by multiple IT developers, and contains stable IT entity definitions. Thus, the IT development UI 3101 comprises the ability to edit (via ITED30109 of FIG. 22) and invoke other functions contained within the IT development toolset 3102 and the IT runtime toolset 3107. The real (deployed) library 3106 contains definitions of real IT delivery environment(s) 3109 and all real IT entities operating in the delivery environments 3109. The IT runtime UI 3108 is used to access the IT runtime toolset 3107 and perform various run-time activities against the real IT delivery environment(s) 3109.

The IT development environment also includes the IT entity editor ITED 30109 of FIG. 22.

3.2.3 Libraries and Storage

Different library structures are possible, as well as different approaches to library management. Since in one embodiment, IT entities are represented as classes in a programming language, all known software library management functions are applicable to libraries of IT entity classes.

IT entity instances are stored in a database. An object-oriented or object-based implementation, an object or relational database (e.g., DB2) could be used optimally, but other types of storage, such as flat files, could also be used—and existing methods of marshalling and un-marshalling IT entity instances can be used. For other (non-object-oriented and non-object-based) implementations, any appropriate means of storing IT entity instances would be suitable, including databases or file structures. One embodiment assumes an object database providing object persistence.

3.2.4 Editing IT Entities

Since in one embodiment IT entities are classes in an object-oriented language, any editor used for software development, could be used to edit IT entities. The editor may be a pure text editor, or a graphical editor. A graphical editor showing graphical IT entity representations and permitting drag and drop functions on these representations, and including appropriate connectors for establishing relationships among IT structures could be used.

Figure 24:
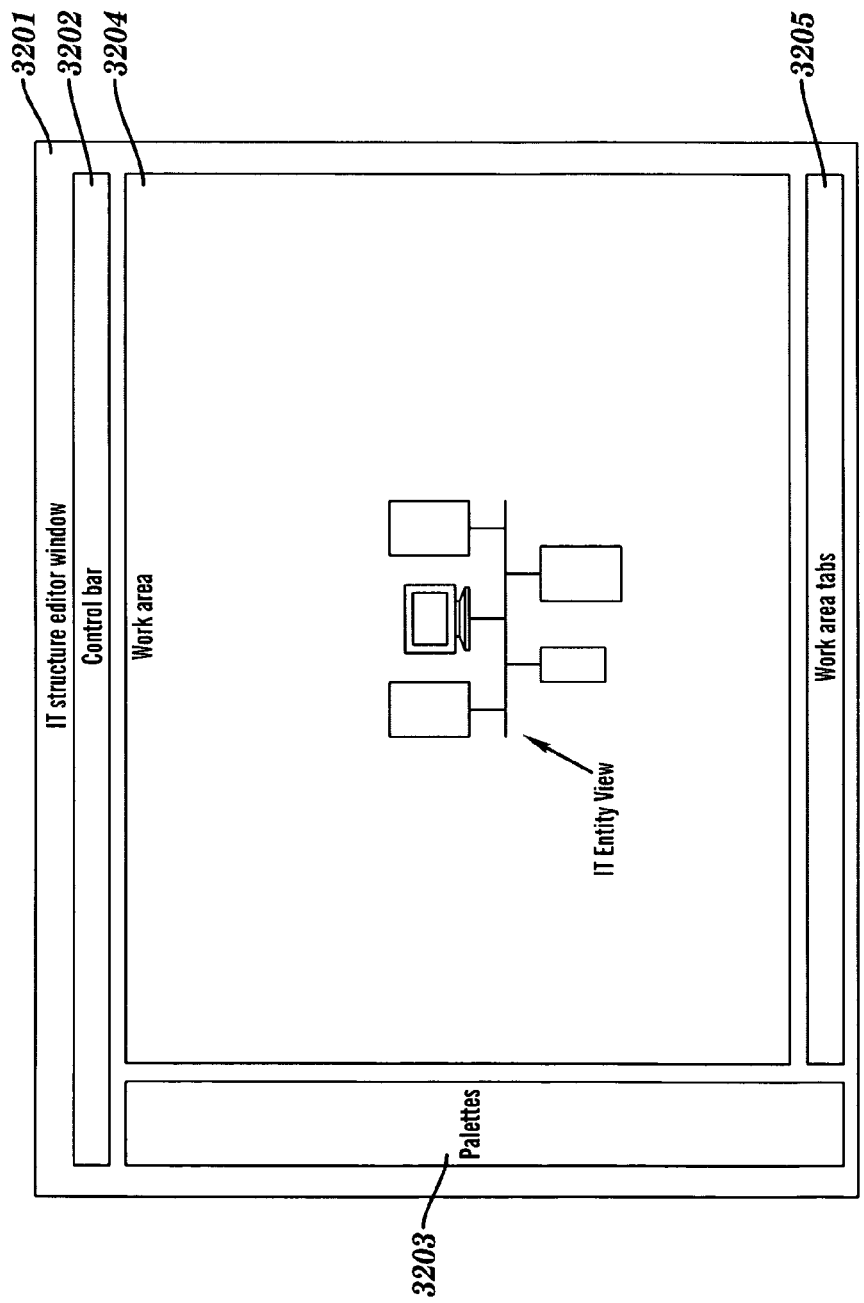
FIG. 24 depicts an overview of the IT entity editor (ITED) main panels, in accordance with embodiments of the present invention.

FIG. 24 depicts an overview of the IT entity editor (ITED) main panels, in accordance with embodiments of the present invention. The entity editor (ITED) is the IT entity editor 3010 of FIG. 21. The ITED performs various IT structure operations which may be utilized, inter alia, for refining abstract structure instances as will be described infra. The IT entity editor window 3201 includes: one or more control bars 3202 with file, editing, view, formatting, windows, and help controls; one or more palettes 3203 with symbols for various IT entities and connectors to be dragged onto the work area 3204; one or more work areas 3204, containing visual and/or text representations of various aspects of IT entities; and zero or more sets of work area/view tabs 3205, permitting identification and selection of open views of IT entities.

The layout and visual characteristics of various components of IT entity editor window may vary, and the visual design of IT entity editor (hereinafter referred to as ITED-IT Entity Editor) presentation may vary in different embodiments.

Although IT development functions, including ITED, operate on IT entity and other classes, IT structure compositions may include instances of other IT entities. IT development functions may (and in this embodiment do) create temporary instances of IT entities operated on. In one embodiment, ITED, when used to edit an ITStructure subclass S, creates a temporary instance of S, giving it the name "temporaryInstance", and every time a change to S is made, temporaryInstance is re-instantiated (which causes its constructor method to be invoked) and any of its visual representations are refreshed. Thus, the user edits the source of class S, but sees an instance of class S in the associated visual representations.

If multiple temporary instances are required, the name "temporaryInstance" is augmented with a suffix ensuring uniqueness.

In the subsequent text, the words "IT structure X is re-instantiated" mean that a new temporaryInstance of X is created instead of or in addition to the old one.

3.2.5 Finding an IT Structure Class

Figure 25:
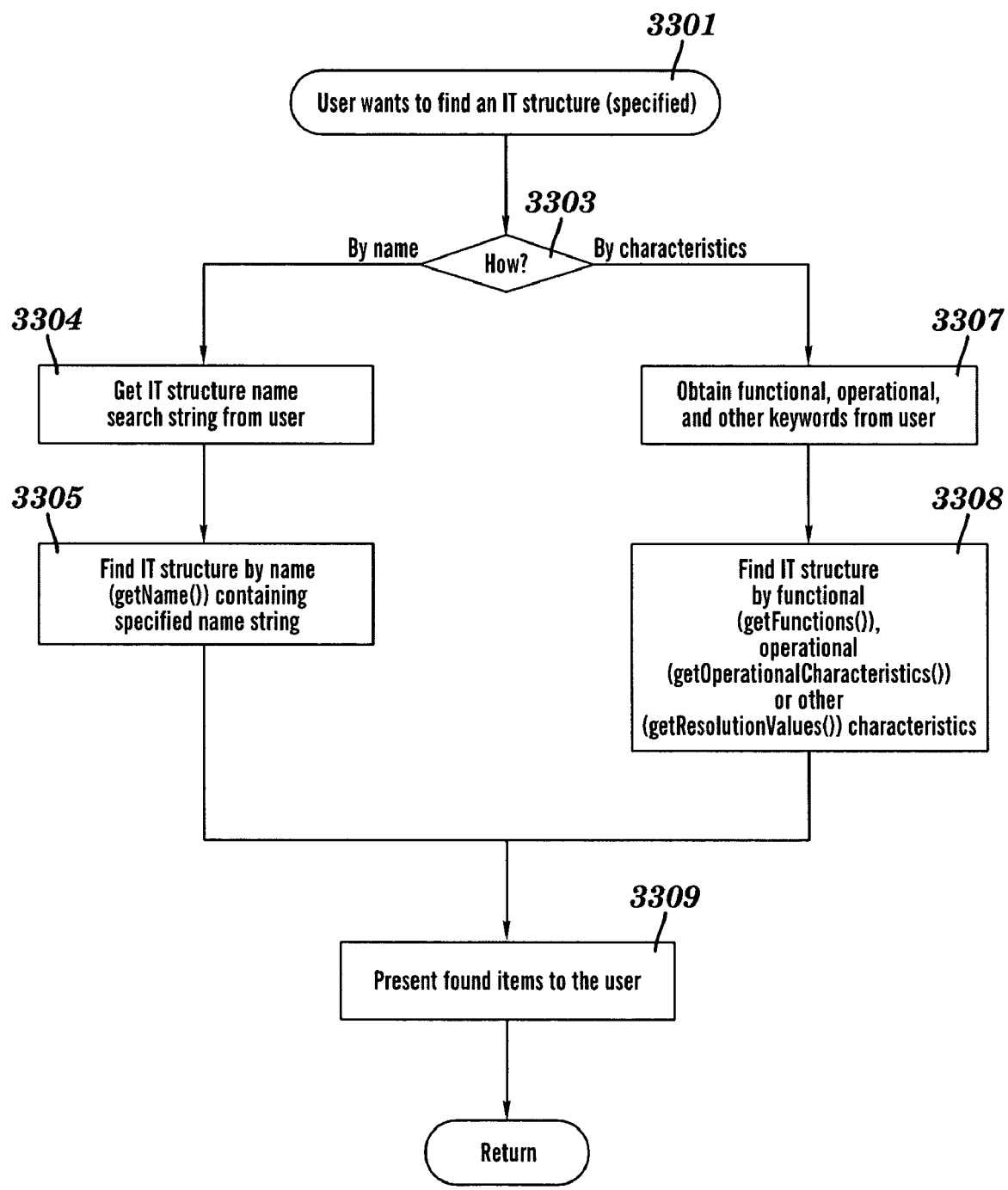
FIG. 25 is a flow chart depicting the functionality provided in ITED for searching for entities, in accordance with embodiments of the present invention.

FIG. 25 is a flow chart depicting the functionality provided in ITED for searching for entities, including IT structures, in accordance with embodiments of the present invention. The user initiates the search function from the ITED toolbar. The purpose of the search is to find one or more IT structures satisfying particular search criteria.

In step 3303, ITED determines the desired search approach: by name or by other characteristics.

If step 3303 determines that the IT structure class is to be found by name, then ITED performs steps 3304 and 3305. In step 3304, the specified IT structure name string is obtained from the user. In step 3305, the specified IT structure name string is used as the search argument against the set of IT structure subclasses. Then step 3309 is executed.

If step 3303 determines that the IT structure class is to be found by other characteristics, then ITED performs steps 3307 and 3308. In step 3307, the user is invited to specify the desired functional, operational, or other characteristics of the desired IT structures. In step 3308, the search for desired IT structure class(es) is performed based on the specified functional, operational, or other characteristics of the desired IT structures. Then step 3309 is executed.

In step 3309, the user is either notified that the desired search object is not found, or is presented with the set of search results.

3.2.6 Creating an IT Structure Class

A primitive IT structure class is created by editing the class source code.

Figure 26:
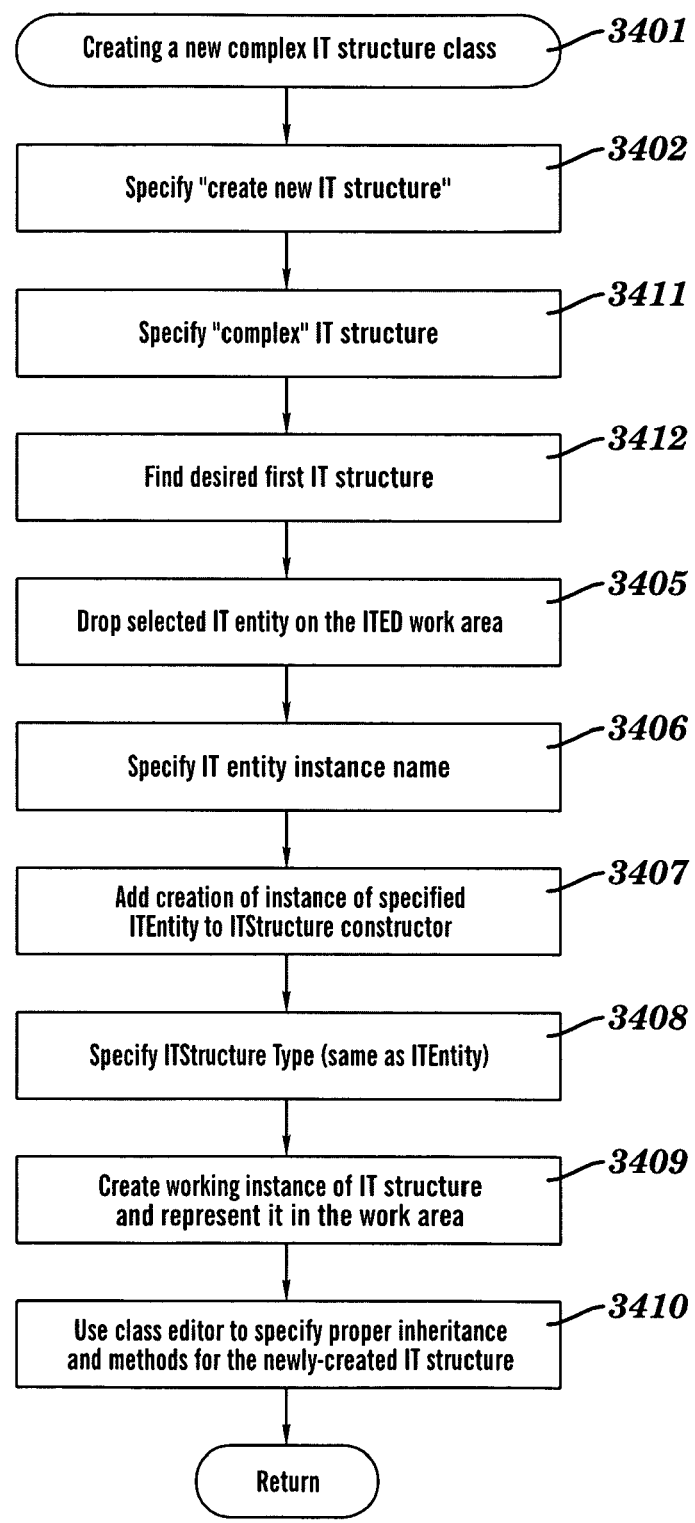
FIG. 26 is a flow chart depicting a process of creating a complex IT structure class, in accordance with embodiments of the present invention.

FIG. 26 is a flow chart depicting a process of creating a complex IT structure class, in accordance with embodiments of the present invention.

In step 3402, the user selects "create new IT structure" from the ITED toolbar.

In step 3411, the IT structure to be created is qualified as complex, and the process finds the desired first IT structure to become the element of the newly created IT structure composition in step 3412.

In step 3405, the first (and only, in the case of a primitive IT structure) element of the composition icon is then dropped onto the ITED work area, and its instance name is specified in step 3406.

In step 3407, ITED adds creation of an instance of the specified IT entity to the constructor of the IT structure being edited and creates a working instance of the target IT structure in step 3408, using the newly updated constructor, which causes the instance of the target IT structure to now include the specified IT entity.

In step 3409, the IT structure type is set to be the same as that of the IT entity corresponding to this IT structure.

In step 3410, the user can use the class editor to program the newly created IT structure's class inheritance and any desired methods.

Note that the class editor is any appropriate program source editor, permitting editing of classes and their methods. The class editor is invoked by ITED on request from the user as one of the views of an IT structure being edited.

3.2.7 Editing a Complex IT Structure Class

Once a complex IT structure is created, additional IT structures can be found using the method of finding them described supra in conjunction with FIG. 25 and added to the composition of the IT structure being edited by means of the addElement( ) method, which modifies the complex IT structure class.

Undesirable elements of IT structure composition may be removed by means of deleteElement( ) method.

Any error messages returned by addElement( ) or deleteElement( ) methods would be displayed to the user for corrective actions.

Similarly, establishRelationship( ) or removeRelationship( ) methods can be used to establish or remove relationships between two elements of the composition of an IT structure being edited.

For convenience, ITED may provide appropriate graphical representations of IT interfaces and IT relationships (e.g. connector lines) could be used to represent IT relationships (with, e.g., color of the line indicating the type of relationship) and connection points on IT structure icons, to which connector lines would adhere, could represent IT interfaces.

3.2.8 Editing an IT Structure's Function(s)

To modify an IT structure's function(s), the IT structure's function specification presents the user with a data entry panel associated with ITED, comprising a list of pairs of fields to be entered, each pair including: a character string identifying a function to be added; and a name of the method corresponding to this function to be invoked by the setFunctions( ) method of ITStructure when the above function identifier is passed to the setFunctions( ) method as a parameter.

If any functions were previously specified, the appropriate values are displayed in the data entry fields for potential modification or deletion.

Each pair of data entry fields is accompanied with a pair of "add/modify" and "delete" buttons, which can be pressed by the user to add or modify a function specification or to remove an existing function specification.

The user can follow the specification of function with programming of the logic appropriate to the specified function(s) within the named method(s) packaged as private methods within the IT structure being edited (e.g., rule editing).

In one embodiment, no cleanup of private IT structure methods is performed as a result of removal of a function of an IT structure. This is a manual process. In another embodiment, ITED may maintain metadata describing relationships between private IT structure methods and functions supported by the IT structure, and perform automatic cleanup of private methods of an IT structure as a result of removal of a function.

3.2.9 Editing IT Dependencies of an IT Structure

To modify an IT structure's dependencies, the IT dependency specification presents the user with a data entry panel associated with ITED, comprising a list of triplets of fields to be entered, each triplet including: an IT dependency identifier; IT dependency class (requiresPresenceOf or exclusiveWith) or a user-defined subclass of ITDependency class; and IT dependency subject (name of the class which this dependency addresses).

If any IT dependencies were previously specified, the appropriate values are displayed in the data entry fields for potential modification or deletion.

Each triplet of data entry fields is accompanied with a pair of "add/modify" and "delete" buttons, which can be pressed by the user to add or modify an IT dependency or to remove an existing IT dependency.

Addition of an IT dependency is translated into an addDependency( ) method invocation. Modification of an IT dependency is translated into a sequence of deleteDependency( ) and addDependency( ) method invocations (i.e., the target IT dependency is removed and then replaced with a new one). Deletion of an IT dependency is translated into a deleteDependency( ) method invocation.

In one embodiment, no cleanup of IT structure composition is performed as a result of IT dependency deletion. In particular, any IT entities or IT relationships added to IT structure when a particular IT dependency was specified are not removed; the removal is to be done manually. In another embodiment, metadata may be maintained, indicating automatic addition of an element of an IT structure composition to satisfy an IT dependency, with the intention of performing automatic removal of the element(s) added to satisfy the IT dependency, should that IT dependency be removed.

3.2.10 Editing Operational Characteristic Rules of an IT Structure Class

To modify operational characteristic rules of an IT structure class, the IT structure's operational characteristics specification presents the user with a data entry panel associated with ITED, comprising a list of triplets of fields to be entered, each triplet including: operational characteristic identifier; a name of the method corresponding to this operational characteristic to be invoked by the setOperationalCharacteristics( ) method of ITStructure when the above operational characteristic identifier is passed to the setOperationalCharacteristics( ) method as a parameter; and default value of this operational characteristic (optional).

If any operational characteristics were previously specified, the appropriate values are displayed in the data entry fields for potential modification or deletion.

Each triplet of data entry fields is accompanied with a pair of "add/modify" and "delete" buttons, which can be pressed by the user to add or modify an operational characteristic or to remove an existing operational characteristic.

The optional operational characteristic default value is translated into an invocation of setOperationalCharacteristics( ) method specifying this default value for the subject operational characteristic, invoked from the ITStructure constructor.

The user can follow the specification of an operational characteristic with programming of the logic appropriate to the specified operational characteristic modification within the named method packaged as a private method within the IT structure being edited.

In one embodiment, no cleanup of private IT structure methods is performed as a result of removal of an operational characteristic of an IT structure. This is a manual process. In another embodiment, ITED may maintain metadata describing relationships between private IT structure methods and operational characteristics supported by the IT structure, and perform automatic cleanup of private methods of an IT structure as a result of removal of an operational characteristic.

3.2.11 Editing Resolution Value Rules of an IT Structure Class

To modify resolution value rules of an IT structure class, the IT structure's resolution value specification is identical to that of operational characteristics, with the exception of the terminology (i.e., the data entry panel associated with ITED presented to the user identifies itself as "resolution value specification", rather than "operational characteristics specification") and method names (i.e., resolve( ) instead of setOperationalCharacteristics( )).

3.1.12 Specifying Functions, Operational Characteristics, or Resolution Values for IT Structure Composition Elements The user may specify function(s), operational characteristic(s), and/or resolution value(s) for IT structures included in the composition of the IT structure being edited. When invoked, these specification functions present the same user interfaces as those presented for modification of respective characteristics of the target IT structure. However, there are the following differences in ITED processing of user input:

No addition, removal, or modification of respective keywords is permitted—only one selection button is presented for each row of data entry lists, indicating that this characteristic is to be specified.

If a value field is associated with a characteristic (e.g., operational characteristic value), the value, if present, may be displayed and overridden by the user with the desired value.

No modifications are performed to the class source of IT structures for which characteristics values are being specified—instead, any characteristic value specifications are translated into invocations of appropriate methods of the IT structures for which characteristics are being set, and included in the constructor of the target IT structure (which will be re-instantiated upon completion of value specification).

3.2.13 Defining and Maintaining an IT Delivery Environment

The creation of a class for an IT delivery environment is identical to that of a complex IT structure, with the addition of manually edited ( ) and addElement( ) methods.

Once an IT delivery environment is instantiated as a real instance (i.e., a delivery environment exists in reality), it can be used as a target IT delivery environment for other IT structures. Each IT structure ready to be immersed in an IT delivery environment is added (using method addElement( )) to the composition of the IT delivery environment, and appropriate IT relationships are established between this IT structure and other IT structures in the IT delivery environment composition.

3.2.14 Specifying a Target IT Delivery Environment for an IT Structure

ITED provides the ability to specify a target IT delivery environment for an abstract or virtual IT structure even prior to this IT structure translation to a real IT structure. The user may be presented with a list of one or more IT delivery environment instances and can select one or more IT delivery environment instance from this list as target IT delivery environment(s) for the IT structure being developed. For each selected target IT delivery environment, ITED invokes the IT delivery environment's method verifyConformance( ) passing said method to the IT structure being edited as the parameter, and displays to the user any error messages returned by the verifyConformance( ) method of each IT delivery environment targeted so the appropriate corrective actions can be performed.

The preceding application of verifyConformance( ) of the IT structure for multiple IT delivery environment instances is different from ordinary software programming. A programming compiler assumes that the resulting program will conform to the target run-time environment. In contrast, an IT structure translator may not guarantee that; thus pre-translation and/or pre-delivery binding verification via verifyConformance( ) is provided for the developer. Moreover, since multiple target IT delivery environments may be specified, multiple pre-verifications may be performed to ensure portability of IT structure with respect to the multiple IT delivery environments.

Figure 27:
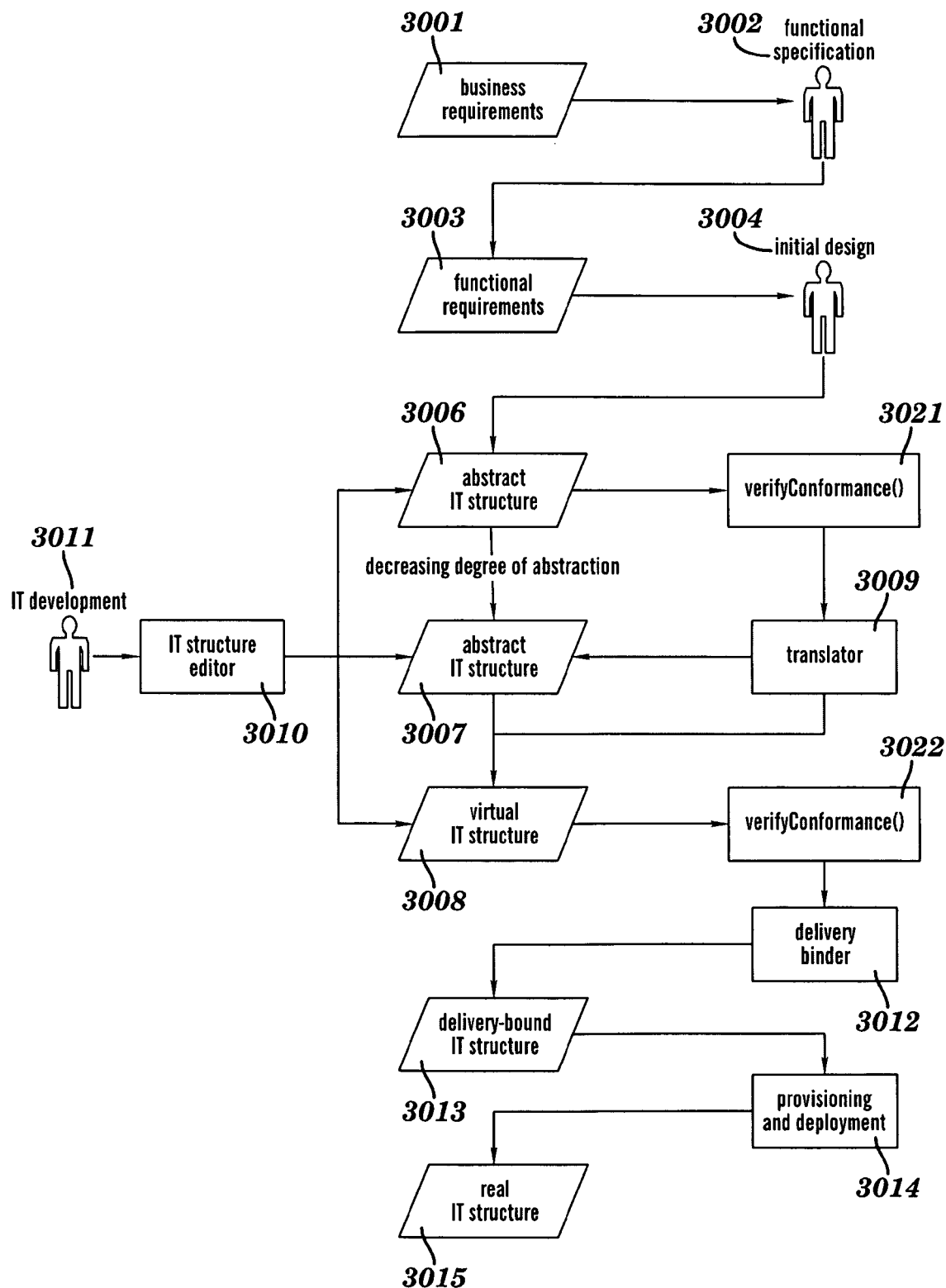
FIG. 27 is a chart depicting the IT development process of FIG. 21 with added verification of conformance of an IT structure to a delivery environment, in accordance with embodiments of the present invention.

FIG. 27 is a chart depicting the IT development process of FIG. 21 with added verification of conformance of an IT structure to an IT delivery environment via the verifyConformance( ) method, in accordance with embodiments of the present invention. In FIG. 27, the verifyConformance( ) method, which is described infra in Sec. 3.2.16, may be performed in step 3021, step 3022, or in both steps 3021 and 3022. In step 3021, verifyConformance( ) is performed on the abstract IT structure 3007 prior to the translation step 3009. In step 3022, verifyConformance( ) is performed on the virtual IT structure 3009 resulting from the translation step 3012 and prior to the delivery binding step 3012. Alternatively, verifyConformance( ) could be performed on an intermediate IT structure that exists during performance of the translation step 3009.

Accordingly, the verifyConformance( ) process of FIG. 27 comprises verifying conformance of an IT structure to at least one IT delivery environment, wherein the IT structure is selected from the group consisting of the abstract IT structure 3006, the virtual IT structure 3008, and an intermediate IT structure that exist during performance of said translating 3009 of the abstract IT structure 3006 into the virtual IT structure 3008. In one embodiment, the at least one IT delivery environments consists of a plurality of IT delivery environments. In one embodiment, the at least one IT delivery environment consists of one IT delivery environment. In one embodiment, the at least one IT delivery environment consists of the IT delivery environment in which the real IT structure 3015 is adapted to operate.

3.2.15 Compilation and Link-Edit

The term "compilation" (and associated with it, "compiler") hereinafter refer to any appropriate process of programming language program source translation, including compilation, translation (in the programming language sense), interpretation, or assembly, depending on the language used to embody IT entities.

Because IT entities are implemented using a programming language, in order to make use of their instances, source definitions of IT entities need to be compiled and, possibly, link-edited and loaded. This process is a function of the integrated development environment and is initiated by ITED whenever changes are made to a class being edited and prior to translation or any other part of IT development process involving the IT structure being edited. Compilation may result in programming language syntactic or semantic errors, or linkage editor errors—any error messages will be presented to the user for corrective actions, and any subsequent IT development process activities will be performed only upon successful completion of compilation and, if necessary, link-edit and load.

The preceding discussion of compilation and link-edit dealt with the described embodiment in which IT structures are represented as programming classes (e.g., Java), and rules are programming logic. In other embodiments (e.g., using a rule engine for rule specification and application), rules are not programming logic, and the IT structures may not be represented using a programming language. In such other embodiments, compilation and link-edit may not be necessary, and some other (or none at all) steps may be used to generate the results.

3.2.16 The verifyConformance( ) Method

Figure 28A:
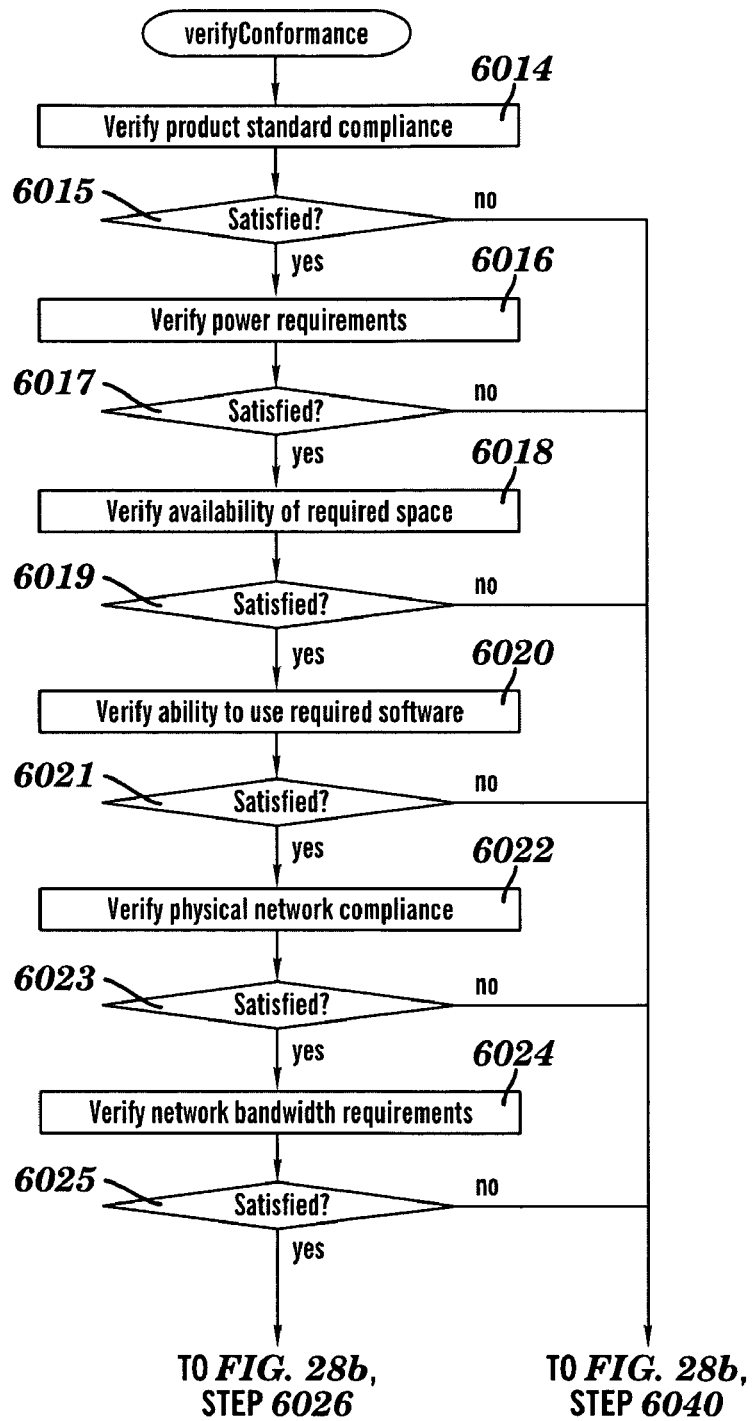
FIG. 28 is a flow chart depicting the verifyConformance( ) method of an exemplary IT delivery environment, in accordance with embodiments of the present invention.
Figure 28B:
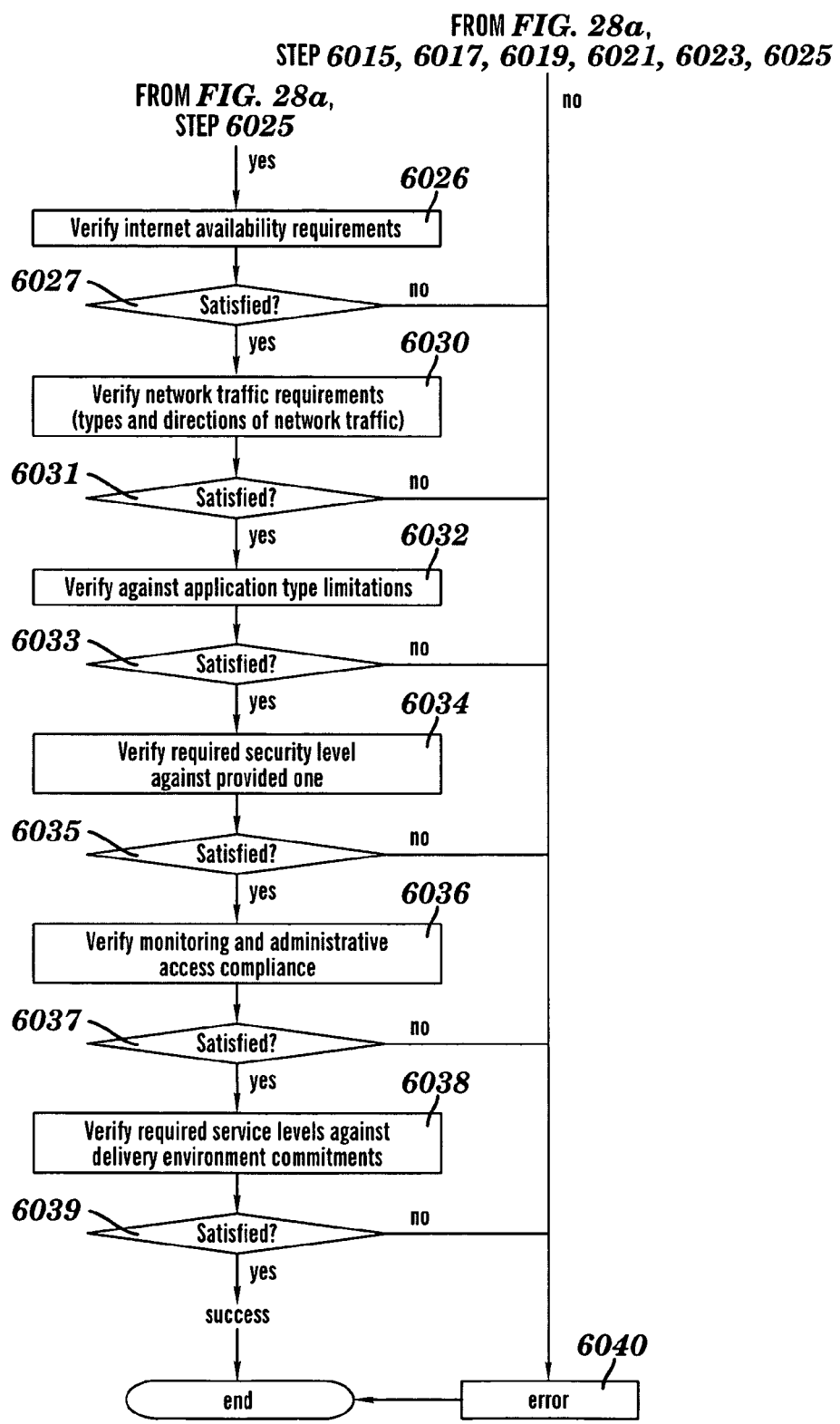

FIGS. 28a and 28b (collectively "FIG. 28") provides an overview of the verifyConformance( ) method of the described IT delivery environment, in accordance with embodiments of the present invention. The verifyConformance( ) method verifies compliance of the target IT structure to the factors relevant within the context of an IT delivery environment such as the preceding exemplary delivery environment.

A set of product standards may be established by a data center, such that for certain types of products only products included in the standard set may be used—e.g., operating systems may be restricted to UNIX, and Windows; e.g., UNIX hardware platforms may be restricted to RS/6000 model F50 or H50 and no other computer may be used to run UNIX. The process examines the IT structure primitive composition (as returned by the getPrimitiveComposition( ) method) and ensures that any non-abstract elements of the primitive composition represent products that are within the established set of standards for the IT delivery environment (step 6014). If the verification is successful (no violations found) (step 6015), the process continues at step 6016, otherwise, an error is indicated 6040 and the process terminates.

The process then proceeds to verify power requirements (step 6016) (i.e., to verify that power consumption requirements of the IT structure are compatible with the power capacity of the IT delivery environment). This may involve, inter alia:

1. Verifying that the total peak power consumption of the IT Structure does not exceed the spare electrical capacity of the Data Center. The power consumption determination is performed as a sum of power consumption of all devices comprising the IT structure primitive composition (as returned by the getPrimitiveComposition( ) method, the output of which is subset to hardware devices only). The power consumption of the IT structure is a sum of outputs of PeakPowerConsumption( ) method of each of the devices in the IT structure primitive composition.

2. If the High Availability is required, verify that the spare backup generator capacity does not exceed the total peak power consumption of the IT structure in power-saving mode (e.g., with monitors and other non-critical devices switched off). To perform this determination, the power consumption of the IT structure in power-saving mode is calculated using the same approach as described above, but including in the power consumption computation only the power consumption of critical (in the context of the IT structure) devices. A critical device is a device used by the normal operation of an IT structure, as opposed of any auxiliary activities, including but not limited to error handling, logging, tracing, accountability, monitoring, etc. For example, a printer attached to a computer used by a system programmer to print captured error logs is non-critical, a monitor attached to a computer running the application server, and used by a system programmer to start and stop the application server, is non-critical, while the computer running the application server is critical.

If the verification is successful (no violations found) (step 6017), the process continues at step 6018, otherwise, an error is indicated 6040 and the process terminates.

The process then proceeds to verify availability of required space (step 6018). This may involve verifying that the number of rack slots required by the IT Structure hardware devices (the device list is determined from the IF structure primitive composition, subset to devices, then the method isRackMounted( ) is used to determine whether the device is rack mounted, followed by the use of the requiredSpace( ) method of each device to determine the number of rack slots required to house the device, and/or the amount of floor space required to place the device on the raised floor) does not exceed the number of available rack slots in the Data Center. If the verification is successful (no violations found) (step 6019), the process continues at step 6020, otherwise, an error is indicated 6040 and the process terminates.

The process then proceeds to verify the ability of the IT structure to use required software and to ensure that no forbidden software is being introduced by the IT structure into the IT delivery environment (step 6020). The process iterates through the Data Center's list of the software packages that are not allowed for deployment in it, and verifies that the IT structure primitive composition does not contain any of these forbidden software packages (based on the set of software entities (class Program) returned by the getPrimitiveComposition( ) method). If the verification is successful (no violations found) (step 6021), the process continues at step 6022, otherwise, an error is indicated (step 6040) and the process terminates. Each of the software products required for use by the IT delivery environment is defined as an IT structure, which implies definitions of its dependencies and prerequisites. The process, in step 6020, verifies that the IT structure being checked for compliance with this IT delivery environment indeed satisfies all these dependencies and prerequisites, i.e., the primitive composition of the IT structure being verified (as obtained from the method getPrimitiveComposition( )) contains all the required elements to satisfy the dependencies and prerequisites of the IT delivery environment product set.

The process then proceeds to verify physical network compliance (step 6022). This may involve verifying that the IT structure uses only physical network interfaces explicitly supported by Data Center (e.g., if phone/modem connections are required, the phone lines must be available in the Data Center). This is performed by examining the CommunicationITRelationship entities in the list of IT relationships of the IT structure, as returned by the getPrimitiveRelationships( ) method, and examining the <connection type> property of each CommunicationITRelationship thus obtained. If the verification is successful (no violations found) (step 6023), the process continues at step 6024, otherwise, an error is indicated (step 6040) and the process terminates.

The process then proceeds to verify network bandwidth requirements (step 6024). This may involve verifying that the total peak network bandwidth requirement of the software elements of an IT primitive composition of the IT structure does not exceed the total spare network capacity of the Data Center (i.e., IT delivery environment). The total peak network bandwidth requirement of the IT structure is determined as a sum of peak network bandwidth requirements of entities of class Program in the IT structure primitive composition, as returned by method getPeakBandwidthRequirement( ) of each such entity. However, the list of programs contained in the IT structure primitive composition will be subset to only those programs that communicate externally, i.e., to external entities (as determined by the examination of CommunicationITRelationship objects obtained from getPrimitiveRelationships( ) method of the IT structure). For example, if there are four entities of class Program in the IT structure primitive composition, communicating externally, and having the peak bandwidth requirements of 1, 0.5, 2.5, and 4 Mbps, then the resulting total peak bandwidth requirement will be 8 Mbps. If the verification is successful (no violations found) (step 6025), the process continues at step 6026, otherwise, an error is indicated (step 6040) and the process terminates.

The process then proceeds to verify Internet availability requirements (step 6026) (i.e., Internet availability provided by the IT delivery environment to satisfy Internet connectivity requirements of the IT structure). This may involve:

1. If the Internet connectivity is required by the IT structure (as indicated by the presence of at least one CommunicationITRelationship entity in the IT structure set of primitive IT relationships (method getPrimitiveRelationships( ) that involves an external IT structure), verifying that the Data Center has at least one Internet hookup.

2. If the High Availability (as evidenced by getOperationalCharacteristics( ) method of the IT structure) is required and the Internet connectivity is required, verifying that the Data Center has at least two Internet hookups through different providers.

If the verification is successful (no violations found) (step 6027), the process continues at step 6030, otherwise, an error is indicated (step 6040) and the process terminates.

The process then proceeds to verify network traffic requirements (step 6030). This may involve:

1. If the Data Center (i.e., IT delivery environment) forbids certain protocols (UDP, ICMP, X), verifying that these protocols are not used by the IT Structure. The verification is performed by examining the properties of ConnectsTo IT interfaces comprising CommunicationITRelationship objects in the list obtained from the getPrimitiveRelationships( ) method.

2. If the Data Center (i.e., IT delivery environment) forbids incoming connections to certain ports, verifying that the IT Structure doesn't have interfaces on those ports that need to be accessed from outside the data center network (i.e., the IT structure does not comprise an interface on any port forbidden by the IT delivery environment from accessing external data flow into the IT delivery environment from outside of the IT delivery environment). Port usage is evidenced from properties of ConnectsTo IT interfaces comprising CommunicationITRelationship objects, contained in the set returned by getPrimitiveRelationships( ), subset to CommunicationITRelationship objects involving external IT structures.

3. If the Data Center (i.e., IT delivery environment) forbids outgoing connections to certain ports, verifying that the IT Structure doesn't have interfaces on these ports that need to access the interfaces outside the Data Center network (i.e., the IT structure does not comprise an interface on any port forbidden by the IT delivery environment from facilitating outward data flow from within the IT delivery environment to outside of the IT delivery environment). Port usage is evidenced from properties of ConnectsTo IT interfaces comprising CommunicationITRelationship objects contained in the set returned by getPrimitiveRelationships( ), subset to CommunicationITRelationship objects involving external IT structures.

If the verification is successful (no violations found) (step 6031), the process continues at step 6032, otherwise, an error is indicated (step 6040) and the process terminates.

The process then proceeds to verify against software application type limitations (step 6032). This may involve:

1. If the Data Center (i.e., IT delivery environment) policies forbid certain types of software applications, verifying that IT Structure does not include such software applications (e.g., Data Center policies may forbid using FTP servers for security reasons). This determination is performed by examining subclasses of Program objects contained in the IT structure primitive composition, as returned by the getPrimitiveComposition( ) method.

2. If the Data Center (i.e., IT delivery environment) policies forbid certain communication modes of applications, verifying that IT Structure does not include software applications running in that mode (e.g., Data Center may forbid originating SMTP emails from its hosts for fear of being blocked by anti-spamming engines if it is abused). This determination is performed by examining subclasses of ConnectsTo ITInterface comprising ITRelationships (obtained from getPrimitiveITRelationships( ) method) involving external IT structures, these ConnectsTo subclasses using port 25 (SMTP).

If the verification is successful (no violations found) (step 6033), the process continues at step 6034, otherwise, an error is indicated (step 6040) and the process terminates.

The process then proceeds to verify required security level against the provided one (step 6034). This may involve:

1. Verifying physical security requirements. This may be performed as a manual step of the method, involving comparison of security operational characteristics obtained from getOperationalCharacteristics( ) method of the IF structure to the actual physical security policy of the data center, or as an automated (program) comparison of security operational characteristics of the IT structure to the data center security policy represented as a set of operational characteristic expressions. If a manual activity is performed, the process continues upon manual entry of the result of the physical security check. For example, the IT structure being verified may include a wireless access point. This wireless access point must be protected against physical theft and tampering by being mounted inside a locked cabinet. The IT delivery environment then must have the ability to mount wireless access points inside a locked cabinet, as a part of its physical security policy. If the IT delivery environment has a less restrictive physical security policy for wireless access point mounting (e.g., wireless access points must be mounted within the ceiling space or at least 8' above the floor), then this may be insufficient to satisfy the more restrictive requirement of the IT structure, and therefore the check in step 6034 would fail.

2. Verifying anti-virus protection. This involves obtaining the list of objects of class Program from the IT structure primitive composition (as returned by the getPrimitiveComposition( ) method), and making sure that every object of class Program representing Windows OS has installed (the corresponding InstallationITRelationship object is present in the IT structure set of IT relationships as provided by the getPrimitiveRelationships( ) method) on it an object of class Program representing an Anti-Virus program (as evidenced by the appropriate subclass).

If the verification is successful (no violations found) (step 6035), the process continues at step 6036, otherwise, an error is indicated (step 6040) and the process terminates.

The process then proceeds to verify monitoring and administrative access compliance (step 6036). This may involve verifying that IT Structure has all of the necessary interfaces (network or other) to provide access to the IT structure by monitoring systems of the Data Center (i.e., IT delivery environment). A particular subclass of Manageable ITInterface may be required to be present in all IT structures deployed in this IT delivery environment, in which case the determination may be performed by examining the list of Manageable IT Interfaces as comprising the IT relationships returned by the getPrimitiveRelationships( ) method. For example, a separate network segment may be required by the IT delivery environment for administrative access and, in this step, verification could include a check for the presence of a NIC connecting to the administrative segment in the IT structure being verified.

If the verification is successful (no violations found) (step 6037), the process continues at step 6038, otherwise, an error is indicated (step 6040) and the process terminates.

The process then proceeds to verify required service levels against delivery environment commitments (step 6038). This may involve:

1. Verifying that the Data Center incident response time does not exceed the response time claimed in the IT Structure (as evidenced by the appropriate operational characteristic of the IT structure, contained in the list of operational characteristics returned by the getOperationalCharacteristics( ) method). For example, operational characteristic INCIDENT_RESPONSE_TIME(<time>) may be defined. The IT structure may have the INCIDENT_RESPONSE_TIME operational characteristic with the value of 5 min, indicating that an error incident must be handled no slower than 5 minutes from its occurrence. The IT delivery environment may have a standard policy of handling incidents, with the rule being that error incident handling will not exceed 30 minutes from the time of occurrence. In this case, the IT structure imposes a more stringent incident handling requirement than the IT delivery environment can provide and the verification test of step 6038 will accordingly fail.

2. Verifying that the expected monthly number of incidents in the IT Structure multiplied by Data Center incident response time does not exceed the maximum permitted monthly down time (as evidenced by the appropriate operational characteristic of the IT structure, contained in the list of operational characteristics returned by the getOperationalCharacteristics( ) method). For example, the IT structure being verified may have the operational characteristics AVAILABILITY(99.9%) and MAX_NUMBER_OF_INCIDENTS (5/month). The IT delivery environment has the operational characteristic INCIDENT_RESPONSE_TIME (5 min). Assuming that any incident equates to downtime (or unavailability), this means that the number of incidents per month cannot exceed 8 (i.e., (1.000-0.999)×30 days/month× 1440 minutes/day÷5 minutes/incident), and the IT structure complies with the IT delivery environment. If, however, the IT delivery environment had the INCIDENT_RESPONSE_TIME operational characteristic value of 30 minutes, then the IT structure being verified would not be able to maintain 99.9% availability and the maximum expected number of incidents of 5 per month, resulting in failure of the test of step 6038.

Thus, step 6038 verifies that the IT structure does not have incident response requirements that cannot be fulfilled by the IT delivery environment. If the verification of step 6038 is successful (i.e., no violations found) as determined in step 6039, the process terminates successfully (indicating that the IT structure is compliant with the IT delivery environment), otherwise, an error is indicated (step 6040) and the process terminates.

4.0 Computer System

Figure 20:
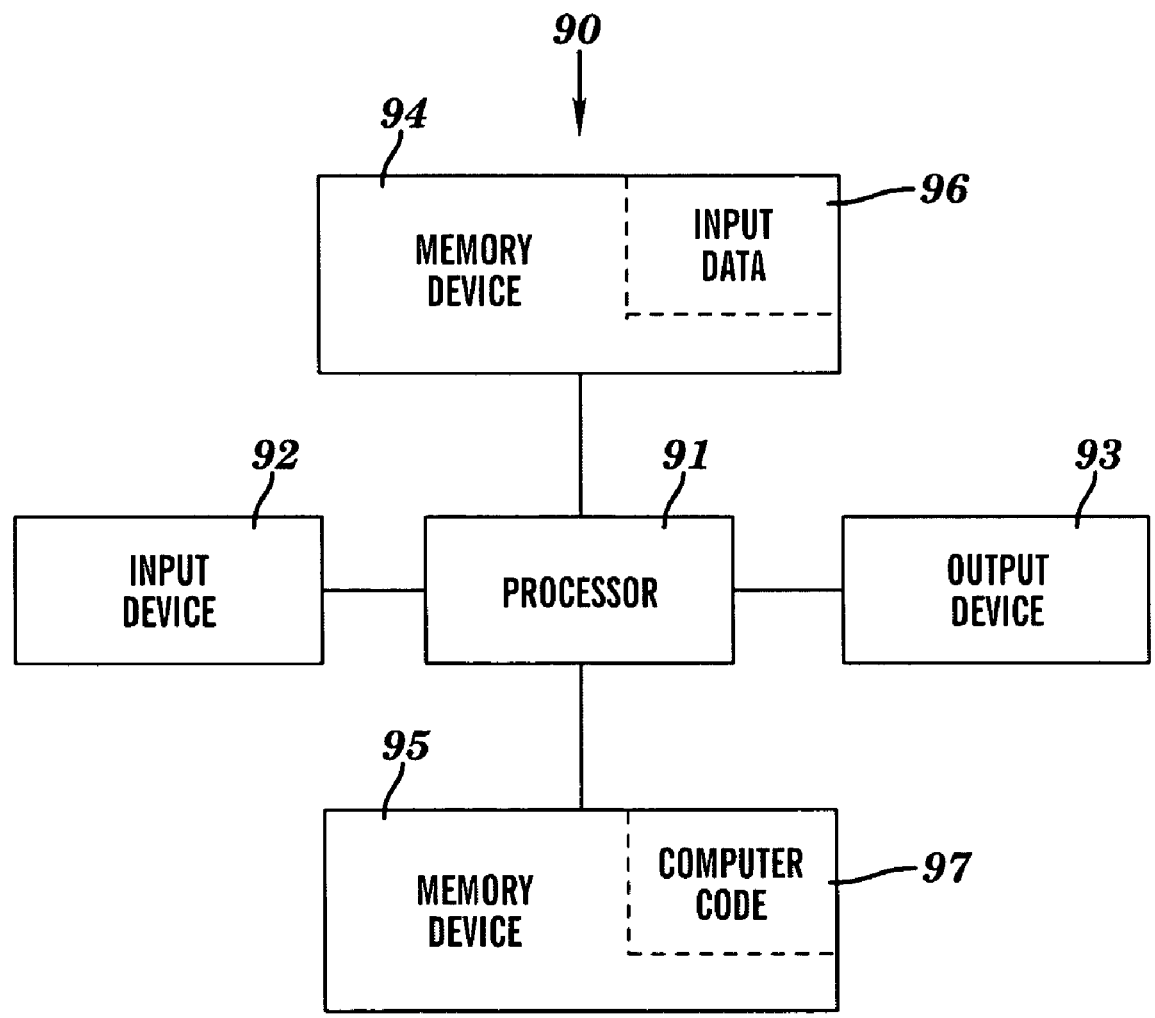
FIG. 20 illustrates a computer system used for implementing an IT Entity Model and associated processes, in accordance with embodiments of the present invention.

FIG. 20 illustrates a computer system 90 used for implementing a method performed in an Information Technology (IT) development environment, including any subset of the algorithms and methods described herein, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for implementing a method performed in an Information Technology (IT) development environment, including any subset of the algorithms and methods described herein. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 20) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention could be deployed, managed, serviced, etc. by a service provider who offers to implement a method performed in an Information Technology (IT) development environment, including any subset of the algorithms and methods described herein. Thus the present invention discloses a process for deploying or integrating computing infrastructure, comprising integrating computer-readable code into the computer system 90, wherein the code in combination with the computer system 90 is capable of implementing a method performed in an Information Technology (IT) development environment, including any subset of the algorithms and methods described herein.

In another embodiment, the invention provides a business method that performs the process steps of the invention on a subscription, advertising, and/or fee basis. That is, a service provider, such as a Solution Integrator, could offer to implement an IT Entity Model and associated processes and/or port IT structures, including any subset of the algorithms and methods described herein. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 20 shows the computer system 90 as a particular configuration of hardware and software, any configuration of hardware and software, as would be known to a person of ordinary skill in the art, may be utilized for the purposes stated supra in conjunction with the particular computer system 90 of FIG. 20. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method performed in an Information Technology (IT) development environment, said method comprising:
translating business requirements into functional requirements;
generating an abstract IT structure, said generating the abstract IT structure comprising translating the functional requirements into the abstract IT structure;
a processor of a computer system translating the abstract IT structure into a virtual IT structure;
said processor translating the virtual IT structure X into a delivery-bound virtual IT structure;
said processor deploying the delivery-bound IT virtual structure in an IT delivery environment, resulting in formation of a real IT structure that is adapted to operate in the IT delivery environment;
verifying conformance of an IT structure to at least one IT delivery environment, wherein the IT structure is selected from the group consisting of the abstract IT structure, the virtual IT structure, and an intermediate IT structure that exist during performance of said translating the abstract IT structure into the virtual IT structure, wherein the at least one IT delivery environments consists of the IT delivery environment in which the real IT structure is adapted to operate, and
wherein said verifying conformance comprises:
verifying compliance of software elements of the primitive composition of the IT structure by verifying that the IT structure does not comprise a software element that is forbidden from being used in the IT delivery environment, and by further verifying that each software element of the IT structure required for use in the IT delivery environment satisfies all dependencies of said each software element required by the IT delivery environment;
verifying software application type compliance of the IT structure by verifying that the IT structure does not comprise a software application type that is forbidden by the IT delivery environment; and
verifying network traffic compliance of the IT structure by verifying that: the IT structure does not use a protocol forbidden by the IT delivery environment, the IT structure does not comprise an interface on any port forbidden by the IT delivery environment from accessing external data flow into the IT delivery environment from outside of the IT delivery environment, and the IT structure does not comprise an interface on any port forbidden by the IT delivery environment from facilitating outward data flow from within the IT delivery environment to outside of the IT delivery environment.

2. The method of claim 1, wherein the IT development environment comprises an IT entity editor, and wherein said translating the functional requirements comprises translating the functional requirements into the abstract IT structure through use of the IT entity editor.

3. The method of claim 2, wherein said use of the IT entity editor for said translating the functional requirements into the abstract IT structure utilizes a library of IT structures.

4. The method of claim 1, wherein said translating the abstract IT structure into the virtual IT structure comprises satisfying a rule that specifies at least one operational characteristic descriptive of operation of the real IT structure in the IT delivery environment, such that the virtual IT structure resulting from said translating differs from the virtual IT structure that would have resulted from said translating if said satisfying said rule had not been performed.

5. The method of claim 1, wherein said translating the abstract IT structure into the virtual IT structure comprises satisfying a rule that specifies a functional characteristic of the virtual IT structure, such that the virtual IT structure resulting from said translating differs from the virtual IT structure that would have resulted from said translating if said satisfying said rule had not been performed.

6. The method of claim 5, wherein the abstract IT structure comprises a plurality of alternative functional characteristics, and wherein the functional characteristic of the virtual IT structure specified by said rule is one functional characteristic of the plurality of alternative functional characteristics comprised by the abstract IT structure.

7. The method of claim 1, wherein said translating the abstract IT structure into the virtual IT structure comprises satisfying a constraint imposed on the composition of the real IT structure that is adapted to operate in the IT delivery environment.

8. The method of claim 7, wherein said constraint is a threshold constraint imposed on an entity comprised by the real IT structure.

9. The method of claim 1, wherein the IT structure consists of the abstract IT structure.

10. The method of claim 1, wherein the IT structure consists of the virtual IT structure.

11. The method of claim 1, wherein the IT structure consists of the intermediate IT structure.

12. A process for supporting computer infrastructure, said process comprising providing at least one support service for at least one of creating, integrating, hosting, maintaining, and deploying computer-readable code in a computing system, wherein the code in combination with the computing system is configured to be executed by a processor of the computing system to perform a method in an Information Technology (IT) development environment, said method comprising:
translating business requirements into functional requirements;
generating an abstract IT structure, said generating the abstract IT structure comprising translating the functional requirements into the abstract IT structure;
translating the abstract IT structure into a virtual IT structure;
translating the virtual IT structure X into a delivery-bound virtual IT structure;
deploying the delivery-bound IT virtual structure in an IT delivery environment, resulting in formation of a real IT structure that is adapted to operate in the IT delivery environment;
verifying conformance of an IT structure to at least one IT delivery environment, wherein the IT structure is selected from the group consisting of the abstract IT structure, the virtual IT structure, and an intermediate IT structure that exist during performance of said translating the abstract IT structure into the virtual IT structure, wherein the at least one IT delivery environments consists of the IT delivery environment in which the real IT structure is adapted to operate, and
wherein said verifying conformance comprises:
verifying compliance of software elements of the primitive composition of the IT structure by verifying that the IT structure does not comprise a software element that is forbidden from being used in the IT delivery environment, and by further verifying that each software element of the IT structure required for use in the IT delivery environment satisfies all dependencies of said each software element required by the IT delivery environment;

verifying software application type compliance of the IT structure by verifying that the IT structure does not comprise a software application type that is forbidden by the IT delivery environment; and verifying network traffic compliance of the IT structure by verifying that: the IT structure does not use a protocol forbidden by the IT delivery environment, the IT structure does not comprise an interface on any port forbidden by the IT delivery environment from accessing external data flow into the IT delivery environment from outside of the IT delivery environment, and the IT structure does not comprise an interface on any port forbidden by the IT delivery environment from facilitating outward data flow from within the IT delivery environment to outside of the IT delivery environment.

13. The process of claim 12, wherein said translating the abstract IT structure into the virtual IT structure comprises satisfying a rule that specifies at least one operational characteristic descriptive of operation of the real IT structure in the IT delivery environment, such that the virtual IT structure resulting from said translating differs from the virtual IT structure that would have resulted from said translating if said satisfying said rule had not been performed.

14. The process of claim 12, wherein said translating the abstract IT structure into the virtual IT structure comprises satisfying a rule that specifies a functional characteristic of the virtual IT structure, such that the virtual IT structure resulting from said translating differs from the virtual IT structure that would have resulted from said translating if said satisfying said rule had not been performed.

15. The process of claim 12, wherein said translating the abstract IT structure into the virtual IT structure comprises satisfying a constraint imposed on the composition of the real IT structure that is adapted to operate in the IT delivery environment.

16. A computer program product, comprising a physically tangible computer readable storage device having a computer readable program code stored therein, said computer readable program code comprising an algorithm adapted to perform a method in an Information Technology (IT) development environment, said method comprising:

translating business requirements into functional requirements;

generating an abstract IT structure, said generating the abstract IT structure comprising translating the functional requirements into the abstract IT structure;

translating the abstract IT structure into a virtual IT structure;

translating the virtual IT structure X into a delivery-bound virtual IT structure;

deploying the delivery-bound IT virtual structure in an IT delivery environment, resulting in formation of a real IT structure that is adapted to operate in the IT delivery environment;

verifying conformance of an IT structure to at least one IT delivery environment, wherein the IT structure is selected from the group consisting of the abstract IT structure, the virtual IT structure, and an intermediate IT structure that exist during performance of said translating the abstract IT structure into the virtual IT structure, wherein the at least one IT delivery environments consists of the IT delivery environment in which the real IT structure is adapted to operate, and wherein said verifying conformance comprises:

verifying compliance of software elements of the primitive composition of the IT structure by verifying that the IT structure does not comprise a software element that is forbidden from being used in the IT delivery environment, and by further verifying that each software element of the IT structure required for use in the IT delivery environment satisfies all dependencies of said each software element required by the IT delivery environment;

verifying software application type compliance of the IT structure by verifying that the IT structure does not comprise a software application type that is forbidden by the IT delivery environment; and verifying network traffic compliance of the IT structure by verifying that: the IT structure does not use a protocol forbidden by the IT delivery environment, the IT structure does not comprise an interface on any port forbidden by the IT delivery environment from accessing external data flow into the IT delivery environment from outside of the IT delivery environment, and the IT structure does not comprise an interface on any port forbidden by the IT delivery environment from facilitating outward data flow from within the IT delivery environment to outside of the IT delivery environment.

17. The computer program product of claim 16, wherein said translating the abstract IT structure into the virtual IT structure comprises satisfying a rule that specifies at least one operational characteristic descriptive of operation of the real IT structure in the IT delivery environment, such that the virtual IT structure resulting from said translating differs from the virtual IT structure that would have resulted from said translating if said satisfying said rule had not been performed.

18. The computer program product of claim 16, wherein said translating the abstract IT structure into the virtual IT structure comprises satisfying a rule that specifies a functional characteristic of the virtual IT structure, such that the virtual IT structure resulting from said translating differs from the virtual IT structure that would have resulted from said translating if said satisfying said rule had not been performed.

19. The computer program product of claim 16, wherein said translating the abstract IT structure into the virtual IT structure comprises satisfying a constraint imposed on the composition of the real IT structure that is adapted to operate in the IT delivery environment.

20. A computer system comprising a processor and a computer readable memory unit coupled to the processor, said memory unit containing instructions that when executed by the processor perform a method in an Information Technology (IT) development environment, said method comprising:

translating business requirements into functional requirements;

generating an abstract IT structure, said generating the abstract IT structure comprising translating the functional requirements into the abstract IT structure;

a processor of a computer system translating the abstract IT structure into a virtual IT structure;

said processor translating the virtual IT structure X into a delivery-bound virtual IT structure;

said processor deploying the delivery-bound IT virtual structure in an IT delivery environment, resulting in formation of a real IT structure that is adapted to operate in the IT delivery environment;

verifying conformance of an IT structure to at least one IT delivery environment, wherein the IT structure is selected from the group consisting of the abstract IT structure, the virtual IT structure, and an intermediate IT structure that exist during performance of said translating the abstract IT structure into the virtual IT structure, wherein the at least one IT delivery environments consists of the IT delivery environment in which the real IT structure is adapted to operate, and wherein said verifying conformance comprises:

verifying compliance of software elements of the primitive composition of the IT structure by verifying that the IT structure does not comprise a software element that is forbidden from being used in the IT delivery environment, and by further verifying that each software element of the IT structure required for use in the IT delivery environment satisfies all dependencies of said each software element required by the IT delivery environment;

verifying software application type compliance of the IT structure by verifying that the IT structure does not comprise a software application type that is forbidden by the IT delivery environment; and verifying network traffic compliance of the IT structure by verifying that: the IT structure does not use a protocol forbidden by the IT delivery environment, the IT structure does not comprise an interface on any port forbidden by the IT delivery environment from accessing external data flow into the IT delivery environment from outside of the IT delivery environment, and the IT structure does not comprise an interface on any port forbidden by the IT delivery environment from facilitating outward data flow from within the IT delivery environment to outside of the IT delivery environment.

21. The computer system of claim 20, wherein said translating the abstract IT structure into the virtual IT structure comprises satisfying a rule that specifies at least one operational characteristic descriptive of operation of the real IT structure in the IT delivery environment, such that the virtual IT structure resulting from said translating differs from the virtual IT structure that would have resulted from said translating if said satisfying said rule had not been performed.

22. The computer system of claim 20, wherein said translating the abstract IT structure into the virtual IT structure comprises satisfying a rule that specifies a functional characteristic of the virtual IT structure, such that the virtual IT structure resulting from said translating differs from the virtual IT structure that would have resulted from said translating if said satisfying said rule had not been performed.

23. The computer system of claim 20, wherein said translating the abstract IT structure into the virtual IT structure comprises satisfying a constraint imposed on the composition of the real IT structure that is adapted to operate in the IT delivery environment.

\* \* \* \* \*